United States Patent [19]

Harigaya et al.

[11] Patent Number: 4,496,227

[45] Date of Patent: Jan. 29, 1985

[54] PHOTOGRAPHIC OPERATION CONTROL CIRCUIT FOR CAMERA

[75] Inventors: Isao Harigaya; Shuichi Tamura; Mutsuhide Matsuda, all of Kanagawa; Michio Hirohata, Inagi; Fumio Ito; Tetsuya Taguchi, both of Kawasaki, all of Japan

[73] Assignee: Canon Kabushiki Kaisha, Tokyo, Japan

[21] Appl. No.: 267,669

[22] Filed: May 27, 1981

Related U.S. Application Data

[62] Division of Ser. No. 105,659, Dec. 20, 1979, Pat. No. 4,458,996.

[30] Foreign Application Priority Data

Dec. 27, 1978 [JP] Japan ................................. 53-165878

[51] Int. Cl.³ ............................................. G03B 17/00
[52] U.S. Cl. ............................................. 354/289.12
[58] Field of Search ................ 354/25 R, 25 P, 25 A, 354/25 N, 268, 289

[56] References Cited

U.S. PATENT DOCUMENTS 4,247,187 1/1981 Tamura ................................. 354/25

Primary Examiner—Gene Z. Rubinson
Assistant Examiner—W. J. Brady
Attorney, Agent, or Firm—Toren, McGeady and Stanger

[57] ABSTRACT

In the camera disclosed, a control circuit responds to a focus detecting circuit to energize first display portions to produce a first mark representing the detected distance, and responds to a setting arrangement to energize other display portions to produce a second different mark representing a set distance. According to an embodiment, the control circuit displays a third mark when the first and second marks coincide.

10 Claims, 50 Drawing Figures

FIG.3

| MODE 0 | MODE 1 | MODE 2 | MODE 3 | INPUT TERMINAL SELECTED WHEN CH SW IS ON | INPUT TERMINAL SELECTED WHEN CH SW IS OFF | SIGNAL AT FC OUTPUT TERMINAL |
|---|---|---|---|---|---|---|
| 0 | 0 | 0 | 0 | | | |
| 1 | 0 | 0 | 0 | $I_{7-1}$ | $I_{7-1}$ | |
| 0 | 1 | 0 | 0 | $I_{7-2}$ | $I_{7-2}$ | |
| 1 | 1 | 0 | 0 | | | COUNT SIGNAL |
| 0 | 0 | 1 | 0 | | | |
| 1 | 0 | 1 | 0 | | | |
| 0 | 1 | 1 | 0 | | | |
| 1 | 1 | 1 | 0 | | | |
| 0 | 0 | 0 | 1 | | | |
| 1 | 0 | 0 | 1 | $I_{3-2}$ | $I_{6-2}$ | |
| 0 | 1 | 0 | 1 | $I_{2-2}$ | $I_{5-2}$ | |
| 1 | 1 | 0 | 1 | $I_{3-1}$ | $I_{6-1}$ | |
| 0 | 0 | 1 | 1 | | | |
| 1 | 0 | 1 | 1 | $I_{1-2}$ | $I_{4-2}$ | |
| 0 | 1 | 1 | 1 | $I_{2-1}$ | $I_{5-1}$ | |
| 1 | 1 | 1 | 1 | $I_{1-1}$ | $I_{4-1}$ | |

FIG.6

| SCAN OUTPUT | 21 | 22 | 23 | 24 | 25 | 26 | 27 |
|---|---|---|---|---|---|---|---|
| IC7 | 1 | 0 | 0 | 1 | 0 | 0 | 1 |
| IC8 | 0 | 0 | 0 | 0 | 1 | 0 | 0 |
| IC9 | 0 | 1 | 1 | 0 | 0 | 1 | 0 |

FIG.7

| IN-FOCUS DISTANCE | IMAGE POSITION ON SENSOR | DISPLAY ELEMENT |
|---|---|---|
| 10m | 21, 22, 23 | 7Seg6 |
| 7m | 22, 23, 24 | 7Seg5 |
| 5m | 23, 24, 25 | 7Seg4 |
| 2m | 24, 25, 26 | 7Seg3 |
| 1m | 25, 26, 27 | 7Seg2 |

FIG.8

| M_F | M_E | M_D | M_C | M_B | M_A | M_9 | M_8 | M_7 | M_6 | M_5 | M_4 | M_3 | M_2 | M_1 | M_0 |
|---|---|---|---|---|---|---|---|---|---|---|---|---|---|---|---|

YEAR    MONTH    DAY
HOUR    MINUTE    SECOND

FIG.9

| SET DISTANCE | $S_{15}$ | $S_{16}$ | $S_{17}$ |
|---|---|---|---|
| 10 m | OFF | ON | OFF |
| 7 m | ON | ON | OFF |
| 5 m | OFF | OFF | ON |
| 2 m | ON | OFF | ON |
| 1 m | OFF | ON | ON |

FIG.10

| FIG.10-1 | FIG.10-2 |
|---|---|
| FIG.10-3 | FIG.10-4 |

FIG.11

| FIG.11-1 | FIG.11-2 | FIG.11-3 |
|---|---|---|
| FIG.11-4 | FIG.11-5 | FIG.11-6 |

FIG.12

| FIG.12-1 | FIG.12-2 |
|---|---|

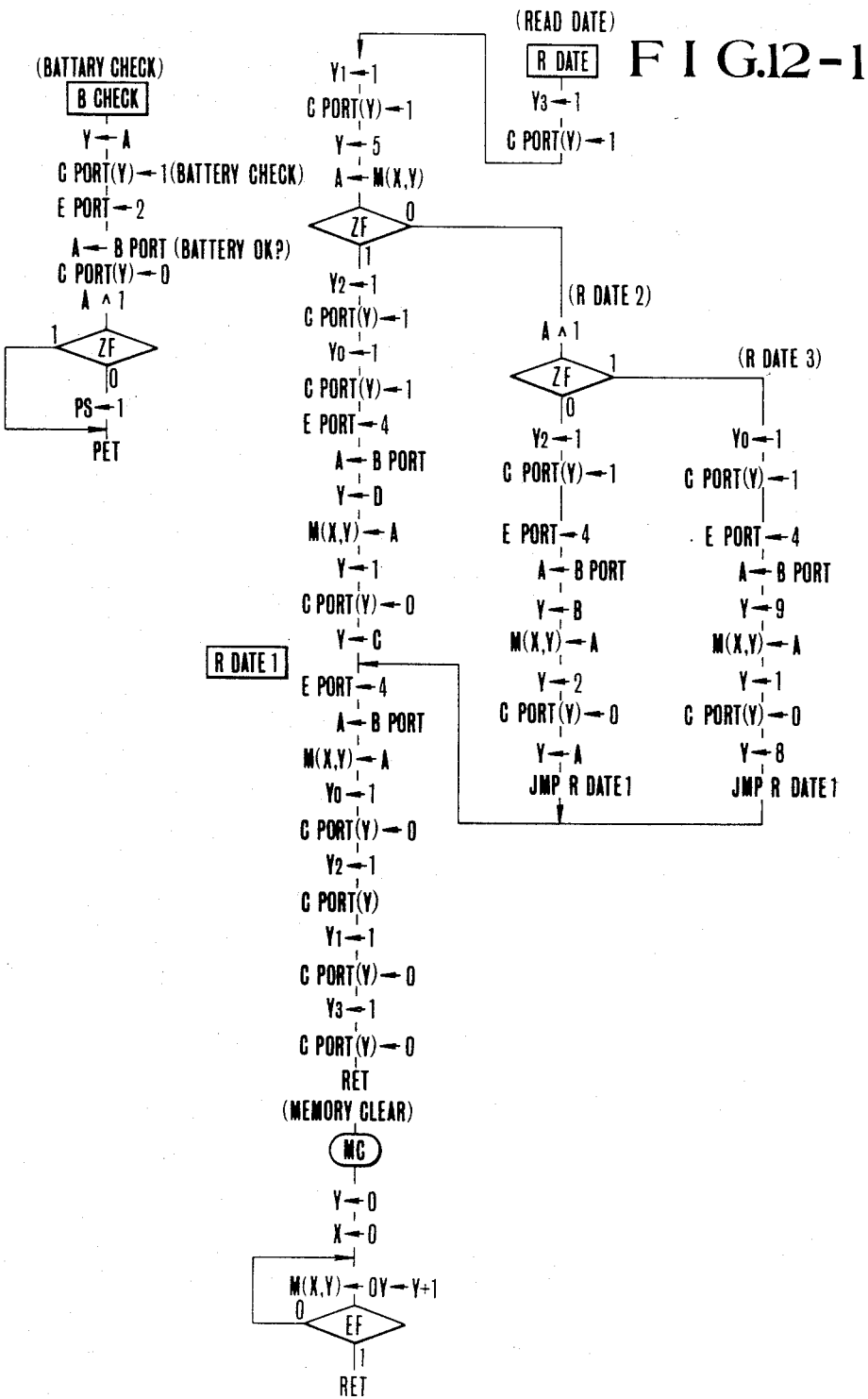

FIG. 21-2

| | | | | | |
|---|---|---|---|---|---|
| 1A | | BNZ | DT7 | E3 | 63 |
| 1B | | — | | | |
| 1C | DT1 | LV | 5 | | 65 |
| 1D | | ICM | | | 2E |
| 1E | | L | | | 0D |
| 1F | | CI | 3 | | D3 |
| 20 | | BNZ | DT3 | E3 | 24 |
| 21 | | — | | | |
| 22 | DT2 | LI | 0 | | 50 |
| 23 | | ST | | | 0A |
| 24 | DT3 | CAL | RDATE | 49 | 0A |
| 25 | | — | | | |
| 26 | | CAL | DDATE | 49 | 49 |
| 27 | | — | | | |
| 28 | | OTIE | 2 | | F2 |
| 29 | | INA | | | 14 |
| 2A | | TB | C | | 5C |
| 2B | | BNZ | DT3 | E3 | 24 |
| 2C | | — | | | |
| 2D | ST2 | OTIE | 8 | | F8 |
| 2E | | INA | | | 14 |
| 2F | | TB | 8 | | D8 |
| 30 | | BZ | ST3 | E3 | 75 |
| 31 | | — | | | |
| 32 | AF | TAY | | | 03 |
| 33 | | LI | 8 | | 58 |
| 34 | | ST | | | 0A |

FIG.21-1

| ADDRESS | LABEL | COMMAND | OPERAND | COMMAND | CODE |
|---|---|---|---|---|---|
| 000 | START | RC | | | 28 |
| 1 | | RP | | | 29 |
| 2 | | CCO | | | 13 |
| 3 | | LI | F | | 5F |
| 4 | | OTD | | | 12 |
| 5 | | CAL | MC | 49 | 42 |
| 6 | | — | | | |
| 7 | | CAL | BCHECK | 49 | 00 |
| 8 | | — | | | |
| 9 | | BP | WARN | E9 | 52 |
| A | | — | | | |
| B | ST | CAL | MC | 49 | 42 |
| C | | — | | | |
| D | | LY | 5 | | 65 |
| E | | LI | 2 | | 52 |
| F | | ST | | | 0A |
| 10 | ST1 | CCO | | | 13 |
| 11 | | LY | 6 | | 66 |
| 12 | | OTIE | 2 | | F2 |
| 13 | | INA | | | 14 |
| 14 | | TB | 8 | | D8 |
| 15 | | BZ | DT4 | E3 | 58 |
| 16 | | — | | | |
| 17 | DT | SM | 2 | | B2 |
| 18 | | L | | | 0D |
| 19 | | TB | 1 | | D1 |

FIG. 21-3

|  |  |  |  |  |
|---|---|---|---|---|
| 35 |  | LY | 8 | 68 |
| 36 | AF$_1$ | LD | 1 | 21 |
| 37 |  | STD | 2 | 26 |
| 38 |  | LD | 0 | 20 |
| 39 |  | STD | 1 | 25 |
| 3A |  | LI | F | 5F |
| 3B |  | OTD |  | 12 |
| 3C |  | TYA |  | 02 |
| 3D |  | OTE |  | 10 |
| 3E |  | INB |  | 15 |
| 3F |  | STD | 0 | 24 |
| 40 |  | TB | 4 | D$_4$ |
| 41 |  | BZ | AF$_6$ E$_3$ | 66 |
| 42 |  | — |  |  |
| 43 | AF$_2$ | LD | 1 | 21 |
| 44 |  | TB | 2 | D$_2$ |
| 45 |  | BZ | AF$_6$ E$_3$ | 66 |
| 46 |  | — |  |  |
| 47 | AF$_3$ | LD | 2 | 22 |
| 48 |  | TB | 1 | D$_1$ |
| 49 |  | BZ | AF$_6$ E$_3$ | 66 |
| 4A |  | — |  |  |
| 4B | AF$_4$ | L |  | 0D |
| 4C |  | TB | 8 | D$_8$ |
| 4D |  | BNZ | AF$_8$ E$_2$ | 6C |
| 4E |  | — |  |  |
| 4F | AF$_5$ | LI | B | 5B |

FIG.21-4

|  |  |  |  |  |  |
|---|---|---|---|---|---|
| 50 |  | JMP | AF8 | 40 | 6C |
| 51 |  | — |  |  |  |
| 52 | WARN | LI | A |  | 5A |
| 53 |  | STD | 3 |  | 27 |
| 54 |  | CAL | CAUTION | 49 | 64 |
| 55 |  | — |  |  |  |
| 56 |  | JMP | START | 40 | 00 |
| 57 |  | — |  |  |  |
| 58 | DT4 | TB | 4 |  | D4 |
| 59 |  | BZ | ST2 | E3 | 2D |
| 5A |  | — |  |  |  |
| 5B | DT5 | SM | 1 |  | B1 |
| 5C |  | L |  |  | 0D |
| 5D |  | TB | 2 |  | D2 |
| 5E |  | BZ | DT1 | E3 | 1C |
| 5F |  | — |  |  |  |
| 60 | DT6 | RM | 2 |  | C2 |
| 61 |  | JMP | DT3 | 40 | 24 |
| 62 |  | — |  |  |  |
| 63 | DT7 | RM | 1 |  | C1 |
| 64 |  | JMP | DT3 | 40 | 24 |
| 65 |  | — |  |  |  |
| 66 | AF6 | L |  |  | 0D |
| 67 |  | AI | 8 |  | 88 |
| 68 |  | LI | C |  | 5C |
| 69 |  | BC | AF8 | E5 | 6C |
| 6A |  | — |  |  |  |

FIG.21-5

| | | | | | |
|---|---|---|---|---|---|
| 6B | AF₇ | LI | F | | 5F |
| 6C | AF₈ | OTD | | | 12 |
| 6D | | ICY | | | 2C |
| 6E | | CY | F | | AF |
| 6F | | BNZ | AF₁ | E₂ | 36 |
| 70 | | — | | | |
| 71 | AF₉ | CAL | MC | 49 | 42 |
| 72 | | — | | | |
| 73 | | JMP | ST₂ | 40 | 2D |
| 74 | | — | | | |
| 75 | ST₃ | OTIE | 2 | | F₂ |
| 76 | | INA | | | 14 |
| 77 | | TB | 1 | | D₁ |
| 78 | | BZ | ST₁ | E₃ | 10 |
| 79 | | — | | | |
| 7A | ST₄ | CCO | | | 13 |
| 7B | | LY | 6 | | 66 |
| 7C | | SCO | | | 17 |
| 7D | | OTIE | 1 | | F₁ |
| 7E | | INB | | | 15 |
| 7F | | TB | 1 | | D₁ |
| 80 | | BZ | ST₉ | E₃ | 8C |
| 81 | | — | | | |
| 82 | ST₅ | LI | B | | 5B |
| 83 | ST₆ | LY | 8 | | 68 |
| 84 | ST₇ | STIC | | | 0B |
| 85 | | CY | E | | AE |

FIG. 21-6

| | | | | | |
|---|---|---|---|---|---|
| 86 | | BNZ | ST7 | E2 | 84 |
| 87 | | — | | | |
| 88 | ST8 | CAL | DISPLAY | 49 | 4D |
| 89 | | — | | | |
| 8A | | JMP | ST | 40 | 0B |
| 8B | | — | | | |
| 8C | ST9 | TB | 2 | | D2 |
| 8D | | BZ | ST11 | E3 | 92 |
| 8E | | — | | | |
| 8F | ST10 | LI | C | | 5C |
| 90 | | JMP | ST6 | 40 | 83 |
| 91 | | — | | | |
| 92 | ST11 | OTIE | 2 | | F2 |
| 93 | | INA | | | 14 |
| 94 | | TB | 2 | | D2 |
| 95 | | BZ | ST3 | E3 | 75 |
| 96 | | — | | | |
| 97 | ST12 | OTIE | 1 | | F1 |
| 98 | | INA | | | 14 |
| 99 | | TB | 8 | | D8 |
| 9A | | BZ | ST14 | E3 | A1 |
| 9B | | — | | | |
| 9C | ST13 | OTIE | 8 | | F8 |
| 9D | | INB | | | 15 |
| 9E | | TB | 8 | | D8 |
| 9F | | BZ | ST | E3 | 0B |
| A0 | | — | | | |

FIG. 21-7

| | | | | | |
|---|---|---|---|---|---|
| A1 | ST14 | OTIE | 1 | | F1 |
| A2 | | INA | | | 14 |
| A3 | | TB | 2 | | D2 |
| A4 | | BZ | ST16 | E3 | AA |
| A5 | | — | | | |
| A6 | ST15 | LI | 0 | | 50 |
| A7 | | STD | 3 | | 27 |
| A8 | | CAL | CAOTION | 49 | 64 |
| A9 | | — | | | |
| AA | ST16 | LY | 4 | | 64 |
| AB | | SCO | | | 17 |
| AC | ST17 | OTIE | 1 | | F1 |
| AD | | INB | | | 15 |
| AE | | TB | 8 | | D8 |
| AF | | BZ | ST20 | E3 | EC |
| B0 | | — | | | |
| B1 | ST18 | OTIE | 1 | | F1 |
| B2 | | INA | | | 14 |
| B3 | | TB | 8 | | D8 |
| B4 | | BZ | ST21 | E3 | B8 |
| B5 | | — | | | |
| B6 | ST19 | LY | 7 | | 67 |
| B7 | | SCO | | | 17 |
| B8 | ST21 | CAL | BCHECK | 49 | 00 |
| B9 | | — | | | |
| BA | | BP | WARN | E9 | 52 |
| BB | | — | | | |

FIG. 21-8

|  |  |  |  |  |  |
|---|---|---|---|---|---|
| BC | ST22 | OTIE | 1 |  | F1 |
| BD |  | INB |  |  | 15 |
| BE |  | RCO |  |  | 16 |
| BF |  | TB | 4 |  | D4 |
| C0 |  | BZ | WARN | E3 | 52 |
| C1 |  | — |  |  |  |
| C2 | ST23 | OTIE | 1 |  | F1 |
| C3 |  | INA |  |  | 14 |
| C4 |  | TB | 1 |  | D1 |
| C5 |  | BZ | ST25 | E3 | C9 |
| C6 |  | — |  |  |  |
| C7 | ST24 | CAL | DDATE | 49 | 49 |
| C8 |  | — |  |  |  |
| C9 | ST25 | LY | 9 |  | 69 |
| CA |  | SCO |  |  | 17 |
| CB |  | OTIE | 4 |  | F4 |
| CC |  | INA |  |  | 14 |
| CD |  | TB | 1 |  | D1 |
| CE |  | BZ | ST25 | E3 | C9 |
| CF |  | — |  |  |  |
| D0 | ST26 | RCO |  |  | 16 |
| D1 |  | LY | 1 |  | 61 |
| D2 |  | SCO |  |  | 17 |
| D3 |  | LY | 0 |  | 60 |
| D4 |  | SCO |  |  | 17 |
| D5 |  | LY | 8 |  | 68 |
| D6 | ST27 | SM | F |  | BF |

FIG. 21-9

| | | | | | |
|---|---|---|---|---|---|
| D7 | | ICY | | | 2C |
| D8 | | CY | E | | AE |
| D9 | | BNZ | ST27 | E2 | D6 |
| DA | | — | | | |
| DB | ST28 | LY | 1 | | 61 |
| DC | | RCO | | | 16 |
| DD | | OTIE | 4 | | F4 |
| DE | | INB | | | 15 |
| DF | | LY | B | | 6B |
| E0 | | ST | | | 0A |
| E1 | | LY | 0 | | 60 |
| E2 | | RCO | | | 16 |
| E3 | | LY | 1 | | 61 |
| E4 | | SCO | | | 17 |
| E5 | | OTIE | 4 | | F4 |
| E6 | | INB | | | 15 |
| E7 | | LY | C | | 6C |
| E8 | | ST | | | 0A |
| E9 | | LI | 0 | | 50 |
| EA | | JMP | ST8 | 40 | 88 |
| EB | | — | | | |
| EC | ST20 | LY | 5 | | 65 |
| ED | | LI | 0 | | 50 |
| EE | | ST | | | 0A |
| EF | | CAL | RDATE | 49 | 0A |
| F0 | | — | | | |
| F1 | | LY | 5 | | 65 |

FIG. 21-10

|  |  |  |  |  |  |
|---|---|---|---|---|---|
| F2 |  | LI | 1 |  | 51 |
| F3 |  | ST |  |  | 0A |
| F4 |  | CAL | RDATE | 49 | 0A |
| F5 |  | — |  |  |  |
| F6 |  | LY | 5 |  | 65 |
| F7 |  | LI | 2 |  | 52 |
| F8 |  | ST |  |  | 0A |
| F9 |  | CAL | RDATE | 49 | 0A |
| FA |  | — |  |  |  |
| FB |  | JMP | ST$_{17}$ | 40 | AC |
| FC |  | — |  |  |  |
| FD |  | NOP |  |  | 00 |
| FE |  | NOP |  |  | 00 |
| FF |  | NOP |  |  | 00 |
| 100 | BCHECK | LY |  |  | 6A |
| 101 |  | SCO |  |  | 17 |
| 102 |  | OTIE | 2 |  | F2 |
| 103 |  | INB |  |  | 15 |
| 104 |  | RCO |  |  | 16 |
| 105 |  | TB | 1 |  | D1 |
| 106 |  | BZ |  | E3 | 09 |
| 107 |  | — |  |  |  |
| 108 |  | SP |  |  | 2B |
| 109 |  | RET |  |  | 1F |
| 10A | RDATE | LY | 3 |  | 63 |
| 10B |  | SCO |  |  | 17 |
| 10C |  | LY | 1 |  | 61 |

FIG.21-11

|  |  |  |  |  |
|---|---|---|---|---|
| 10D |  | SCO |  | 17 |
| 10E |  | LY | 5 | 65 |
| 10F |  | L |  | 0D |
| 110 |  | BNZ | RDATE2 | E2 29 |
| 111 |  | — |  |  |
| 112 |  | LY | 2 | 62 |
| 113 |  | SCO |  | 17 |
| 114 |  | LY | 0 | 60 |
| 115 |  | SCO |  | 17 |
| 116 |  | OTIE | 4 | F4 |
| 117 |  | INB |  | 15 |
| 118 |  | LY | D | 6D |
| 119 |  | ST |  | 0A |
| 11A |  | LY | 1 | 61 |
| 11B |  | RCO |  | 16 |
| 11C |  | LY | C | 6C |
| 11D | RDATE1 | OTIE | 4 | F4 |
| 11E |  | INB |  | 15 |
| 11F |  | ST |  | 0A |
| 120 |  | LY | 0 | 60 |
| 121 |  | RCO |  | 16 |
| 122 |  | LY | 2 | 62 |
| 123 |  | RCO |  | 16 |
| 124 |  | LY | 1 | 61 |
| 125 |  | RCO |  | 16 |
| 126 |  | LY | 3 | 63 |
| 127 |  | RCO |  | 16 |

FIG. 21-12

| | | | | | |
|---|---|---|---|---|---|
| 128 | | RET | | | 1F |
| 129 | RDATE2 | TB | 1 | | D1 |
| 12A | | BZ | RDATE3 | E3 | 37 |
| 12B | | — | | | |
| 12C | | LY | 2 | | 62 |
| 12D | | SCO | | | 17 |
| 12E | | OTIE | 4 | | F4 |
| 12F | | INB | | | 15 |
| 130 | | LY | B | | 6B |
| 131 | | ST | | | 0A |
| 132 | | LY | 2 | | 62 |
| 133 | | RCO | | | 16 |
| 134 | | LY | A | | 6A |
| 135 | | JMP | RDATE1 | 41 | 1D |
| 136 | | — | | | |
| 137 | RDATE3 | LY | 0 | | 61 |
| 138 | | SCO | | | 17 |
| 139 | | OTIE | 4 | | F4 |
| 13A | | INB | | | 15 |
| 13B | | LY | 9 | | 69 |
| 13C | | ST | | | 0A |
| 13D | | LY | 1 | | 01 |
| 13E | | RCO | | | 16 |
| 13F | | LY | 8 | | 68 |
| 140 | | JMP | RDATE1 | 41 | 1D |
| 141 | | — | | | |
| 142 | MC | LY | 0 | | 60 |

FIG. 21-13

| | | | | | |
|---|---|---|---|---|---|
| 143 | | LX | 0 | | 30 |
| 144 | MC1 | RM | | | C0 |
| 145 | | ICY | | | 2C |
| 146 | | BNZ | MC1 | E2 | 44 |
| 147 | | — | | | |
| 148 | | RET | | | 1F |
| 149 | DDATE | LY | B | | |
| 14A | | SC0 | | | 17 |
| 14B | | INA | | | 14 |
| 14C | | RC0 | | | 16 |
| 14D | DISPLAY | STD | 0 | | 24 |
| 14E | | LY | 8 | | 68 |
| 14F | DDATE1 | LI | F | | 5F |
| 150 | | OTD | | | 12 |
| 151 | | TYA | | | 02 |
| 152 | | OTE | | | 10 |
| 153 | | OTMD | | | 11 |
| 154 | | LI | B | | 5B |
| 155 | DDATE2 | AI | 1 | | 81 |
| 156 | | BNC | DDATE2 | E4 | 55 |
| 157 | | — | | | |
| 158 | | ICY | | | 2C |
| 159 | | CY | E | | AE |
| 15A | | BNZ | DDATE1 | E2 | 4F |
| 15B | | — | | | |
| 15C | | LI | F | | 5F |
| 15D | | OTD | | | 12 |

FIG. 21-14

| | | | | |
|---|---|---|---|---|
| 15E | | LD | 0 | 20 |
| 15F | | AI | 1 | 81 |
| 160 | | BNC | DISPLAY | E4 | 4D |
| 161 | | — | | |
| 162 | | RC | | 28 |
| 163 | | RET | | 1F |
| 164 | CAUTION | LI | 0 | 50 |
| 165 | | STD | 0 | 24 |
| 166 | | STD | 1 | 25 |
| 167 | | STD | 2 | 26 |
| 168 | CAUTION1 | LD | 3 | 23 |
| 169 | | LY | 8 | 68 |
| 16A | | RCO | | 16 |
| 16B | | TB | 1 | D1 |
| 16C | | BZ | CAUTION2 | E3 | 6F |
| 16D | | — | | |
| 16E | | SCO | | 17 |
| 16F | CAUTION2 | LD | 2 | 22 |
| 170 | | LD | 2 | 22 |
| 171 | | AI | 1 | 81 |
| 172 | | STD | 2 | 26 |
| 173 | | BNC | CAUTION1 | E4 | 68 |
| 174 | | — | | |
| 175 | | LD | 1 | 21 |
| 176 | | AI | 1 | 81 |
| 177 | | STD | 1 | 25 |
| 178 | | BNC | CAUTION1 | E4 | 68 |

FIG. 21-15

| 179 |  | — |  |  |  |
|-----|--|------|---------|----|----|
| 17A |  | LD | 0 |  | 20 |
| 17B |  | AI | 1 |  | 81 |
| 17C |  | STD | 0 |  | 24 |
| 17D |  | BNC | CAUTION1 | E4 | 68 |
| 17E |  | — |  |  |  |
| 17F |  | LD | 3 |  | 23 |
| 180 |  | AI | 1 |  | 81 |
| 181 |  | STD | 3 |  | 27 |
| 182 |  | BNC | CAUTION1 | E4 | 68 |
| 183 |  | — |  |  |  |
| 184 |  | RCO |  |  | 16 |
| 185 |  | RET |  |  | 17 |

FIG.22-1

| OPERATION CODE | CODE | FLAG | STATEMENT | REMARK |
|---|---|---|---|---|
| L | 0D | ZF | A←M(X,Y) | LOAD THE DATA FROM THE PRESCRIBED MEMORY LOCATION BY X,Y REGISTER TO THE ACCUMULATOR |
| LD | 2n | ZF | A←M(0,n) | LOAD THE DATA FROM THE MEMORY LOCATION DIRECTLY PRESCRIBED BY n TO THE ACCUMULATOR |
| LI | 5n | ZF | A←n | LOAD n TO THE ACCUMULATOR |
| LY | 6n | | Y←n | LOAD n TO Y REGISTER |
| LX | 3n | | X←n | LOAD n TO X REGISTER |
| ST | 0A | | M(X,Y)←A | STORE THE DATA FROM THE ACCUMULATOR IN THE PRESCRIBED MEMORY LOCATION BY X,Y REGISTER. |
| STD | 2(4+n) | | M(0,n)←A | STORE THE DATA FROM THE ACCUMULATOR IN THE PRESCRIBED MEMORY LOCATION BY n. |
| TYA | 02 | ZF | A←Y | TRANSFER THE DATA FROM Y REGISTER TO THE ACCUMULATOR. |
| TAY | 03 | | Y←A | TRANSFER THE DATA FROM ACCUMULATOR TO Y REGISTER. |
| STIC | 0B | ZF | M(X,Y)←A, Y←Y+1 | AFTER THE DATA FROM THE ACCUMULATOR IS STORED IN THE MEMORY, Y IS INCREMENTED BY ONE. IF Y=0, ZF IS SET. |
| SCO | 17 | | C-PORT(Y)←0 | SET THE PRESCRIBED OUTPUT OF C-PORT BY Y REGISTER. |
| OTIE | Fn | | E-PORT←n | n IS READ OUT OF E-PORT. |
| INB | 15 | ZF | A←B PORT | DATA AT B-PORT IS READ-IN TO THE ACCUMULATOR. |
| RCO | 16 | | C-PORT(Y)←0 | REST THE PRESCRIBED OUTPUT OF C-PORT BY Y REGISTER. |
| TB | Dn | ZF | A∧n | AND IS TAKEN BETWEEN THE DATA FROM THE ACCUMULATOR AND THE DATA WITH 1 RAISED AT THE PRESCRIBED BIT BY n. IF THE AND RESULT IS 0, ZF IS SET. |

FIG.22-2

| | | | | |
|---|---|---|---|---|
| BZ | E3 mm | | PC(7~0)←mm IF ZF=1 | IF ZF IS SET, BRANCH TO mm IN THE SAME PAGE |
| SP | 2B | PS | PS←1 | SET PS |
| BNZ | E2 mm | | PC(7~0)mm IF ZF=0 | IF ZF IS RESET, BRANCH TO mm IN THE SAME PAGE |
| OTD | 12 | | D-PORT←A,PS | DATA FROM THE ACCUMULATOR IS READ OUT OF D-PORT. |
| OTE | 10 | | E-PORT←A | DATA FROM THE ACCUMULATOR IS READ OUT OF E-PORT. |
| OTMD | 11 | | D-PORT←M(X,Y) ,PS | DATA FROM THE MEMORY M(X,Y) AND PS ARE READ OUT OF D-PORT. |
| AI | 8n | CF,ZF | A←A+n | ADD n TO THE DATA TO THE DATA IN THE ACCUMULATOR |
| BNC | E4 mm | | PC(7~0)mm IF CF=0 | IF CF IS RESET, BRANCH TO mm IN THE SAME PAGE. |
| ICY | 2C | ZF | Y←Y+1 | INCREMENT THE DATA IN Y BY ONE |
| CY | An | ZF | Y←n | COMPARE THE DATA IN Y REGISTER WITH n UPON COINCIDENCE TO SET ZF. |
| RC | 28 | CF | CF←0 | RESET CF |
| RM | Cn | | M(X,Y)←M(X,Y) ∧n̄ | TAKE AND BETWEEN THE DATA IN THE PRESCRIBED MEMORY LOCATION BY X,Y REGISTER AND THE COMPLEMENTARY DATA OF n, LEAVING THE RESULT IN THE MEMORY. |
| RP | 29 | PS | PS←0 | RESET PS |
| CCO | 13 | | C-PORT(11~0)←0 | RESET ALL THE OUTPUT TERMINALS OF C-PORT. |

FIG.22-3

| | | | | |
|---|---|---|---|---|
| BP | E9 mm | | PC(7~0)←mm IF PS=1 | IF PS IS SET, BRANCH TO mm IN THE SAME PAGE. |
| JMP | 4n mm | | PC(10~8)←n PC(7~0)←mm | JUMP TO ADDRESS mm UNCONDITIONALLY. |
| INA | 14 | ZF | A←A PORT | DATA AT A-PORT IS READ-IN TO THE ACCUMULATOR. |
| SM | Bn | | M(X,Y)←M(X,Y) ∨ n | TAKE OR BETWEEN THE DATA IN THE PRESCRIBED MEMORY LOCATION BY X,Y REGISTER AND n, LEAVING THE RESULT IN THE MEMORY. |
| ICM | 2E | CF,ZF | M(X,Y)←M(X,Y)+2 | INCREMENT THE DATA IN THE MEMORY M(X,Y). |
| BC | E5 mm | | PC(7~0)←mm IF CF=1 | IF CF IS SET, BRANCH TO mm IN THE SAME PAGE |
| CI | 9n | CF,ZF | A+n̄+1 | COMPARE n WITH THE CONTENT OF THE ACCUMULATOR. IF n=A, THEN CF,ZF=1, WHEN n<A, THEN CF=1 |
| CAL | 4(8+n) mm | | STACK←PC+2 PC(10~8)←n PC(7~0)←mm | CALL FOR THE SUBROUTINE AT THE ADDRESS mm. |
| RET | 1F | | PC(10~0)←STACK | RETURN THE LOOP FROM THE SUBROUTINE |

PHOTOGRAPHIC OPERATION CONTROL CIRCUIT FOR CAMERA

This is a division of application Ser. No. 105,659, filed Dec. 20, 1979 now U.S. Pat. No. 4,458,996.

BACKGROUND OF THE INVENTION

1. Field of the Invention

This invention relates to a photographic operation control circuit for a camera.

2. Description of the Prior Art

In recent years the trend in the field of cameras is that various photographing functions are incorporated in cameras so as to enable fully automatic control in sequence of photographing operations such as exposure control, focal point detection, data printing and film winding up only by pushing down the release button prior to photographing. These conventional cameras, because of their employing the sequent control system in the electrical circuit form have a disadvantage that the complexity of circuitry structure is remarkably increased. Further, since the amount of consumption of electrical energy necessary to accomplish one cycle of exposure operation along with the above mentioned various portions of the camera is increased as compared with the ordinary camera, there is a high possibility of occurrence of faulty operation at a time on the way through the sequence of steps when the battery voltage falls below the satisfactory operating level. That is, as the light sensor, exposure determining means and the shutter cocking and film winding mechanism must be actuated in sequence, it is highly possible to happen that even when the battery voltage was at the satisfactory operating level before the actuation of the release button, the battery voltage is no longer satisfactory after the time of termination of the exposure control operation. In such a case, the following step of shutter cocking and film winding will be caused to stop before completing itself, thereby the camera cannot be made ready for the next exposure. The provision of so many functions in the camera gives rise to an additional problem that the mere transition from one step to another not always leads to assure the reliability and accuracy of actuation control. In more detail, taking an example of the focusing function, the initiation of an exposure before the focusing operation has been completed will result in photographs of unsharp images. On this account, the auto-focus cameras are generally provided with means responsive to the setting completion signal for permitting a transition to the subsequent step of making an exposure. In the case of a camera in which only the distance measuring operation is automatically performed, while the setting operation of the objective lens of the camera is adjusted manually, however, it is impossible to detect the completion of the actual setting of the objective lens so that when a release is actuated at a time during the focusing operation, as the exposure operation immediately follows, an image of out-of-focus will be recorded on the film. Again, with regard to the data printing function, when ever-varying data such as the time data from watch device in the digital form are selected for employment in printing, provision must be made for latching the presentation of the data for the period of actuation of the data recorder, or otherwise two or more successive different data would be recorded as overlapped one upon the other, thus ambiguous recording of data is effected. In this connection, it should be noted that as the data to be printed, it is desirable to make use of the data at the time of photographing, but not of the one occurring when the presentation of the data is latched. The camera having so many kind of function as mentioned above is required not only to display information of the exposure factors and value, but also to indicate various informations such as of a condition of in-focus and informations of data to be recorded so that the structure of the indicator is complicated.

SUMMARY OF THE INVENTION

An object of the present invention is to provide a camera having a great number of functions in which when a prescribed camera operation has been terminated, the battery is checked upon and if the voltage is below a level necessary to accomplish a subsequent operation a warning signal is provided, thereby the above mentioned conventional drawback is eliminated.

Another object of the present invention is to provide a camera in which a manually operated member such as distance setting ring for carrying out the distance setting operation is detected in manually operated state, and only when the distance setting operation by the member is finished, the exposure operation is carried out, thereby the above mentioned conventional drawback is eliminated.

Another object of the present invention is to provide a camera in which the time data from the watch is latched at the time when the shutter operation has been completed and during the data printing operation the data which occur when the exposure is taken are printed, thereby the conventional drawback is eliminated.

A further object of the present invention is to provide a sequence control circuit and a display circuit suited for sequence control and display operation of a camera having a great number of functions.

A furthermore object of the present invention is to provide a display circuit suited for focus adjustment.

These and other objects of the present invention will become more apparent from the following detailed description of embodiments thereof taken in conjunction with the accompanying drawings in which:

BRIEF DESCRIPTION OF THE DRAWINGS

FIG. 7 is a table showing a manner in which one of the display elements of FIG. 1 is selected for actuation depending upon the point of position of an object image on the sensor of FIG. 4 and the object distance.

FIG. 8 is a schematic view of the prescribed memory locations used in the micro-processor of FIG. 1.

FIG. 9 is a table showing the various combinations of states of three switches cooperative with the distance adjusting ring.

FIGS. 21-1 to 21-15 are tables showing a program stored in the micro-processor MN-1400 of FIG. 1.

FIGS. 22-1 to 22-3 show an instruction format for the program of FIG. 21.

DESCRIPTION OF THE PREFERRED EMBODIMENTS

Figure 1:
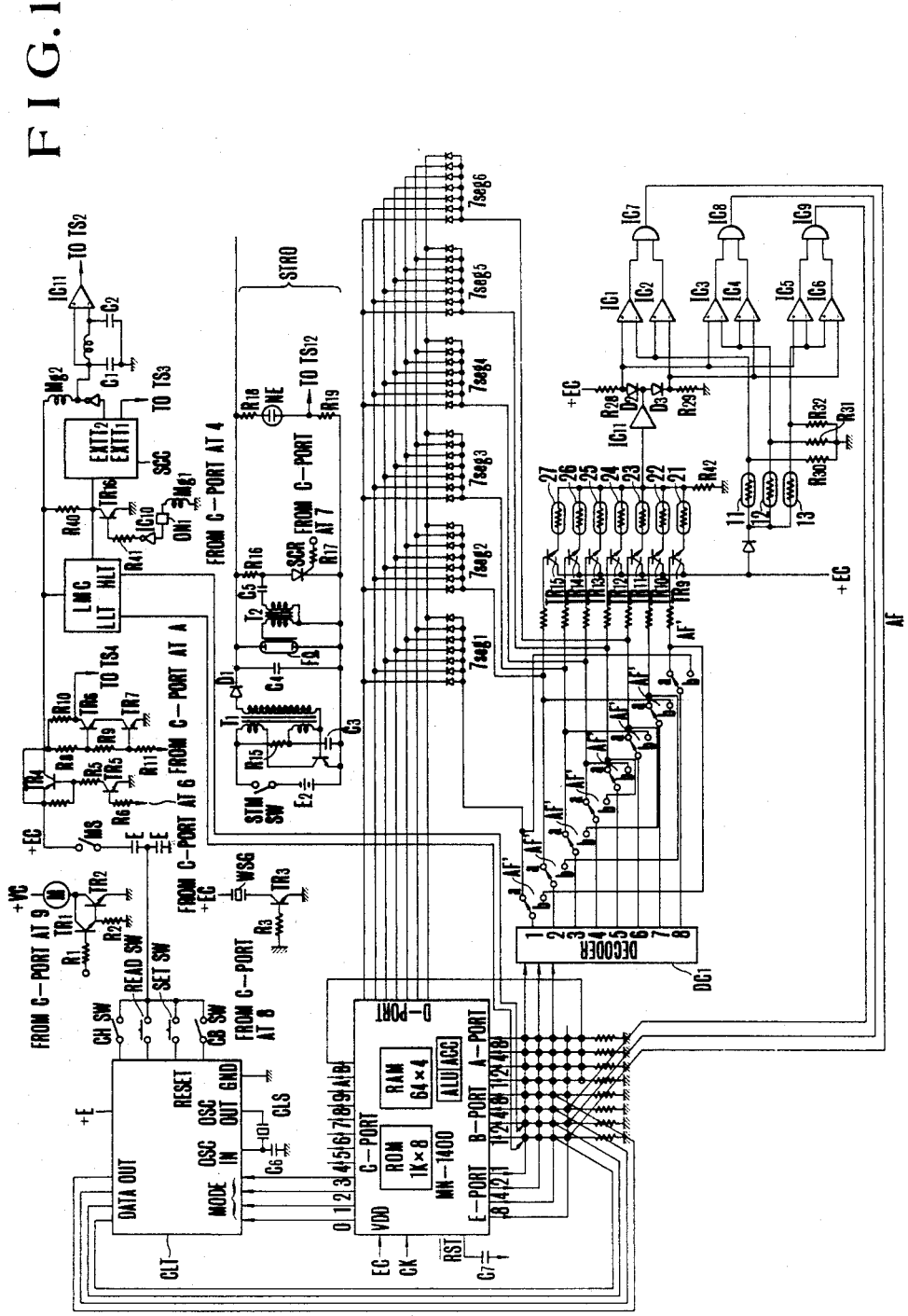
FIG. 1 is an electrical circuit diagram, partly in block form, of one embodiment of a camera according to the present invention.
Figure 13:
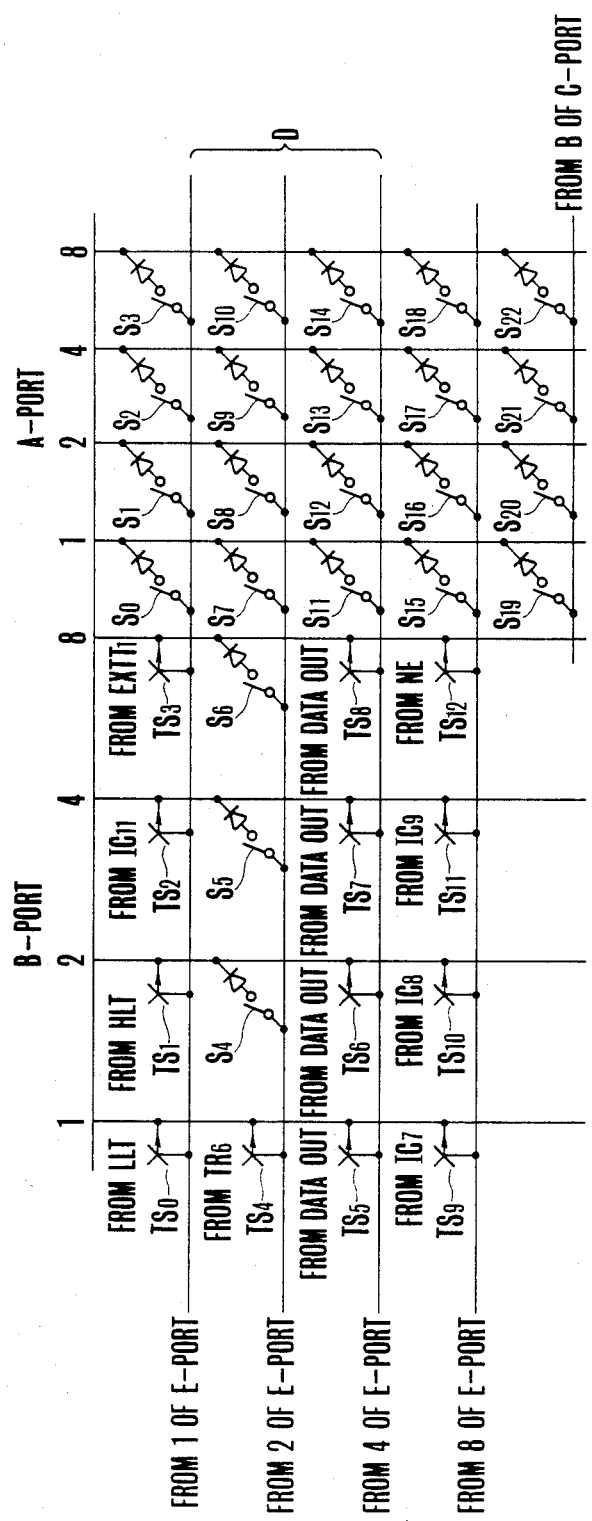
FIG. 13 shows the details of construction of the switch matrix of FIG. 1.

Referring to FIG. 1, there is shown one embodiment of a sequence control circuit for the various portions of the camera according to the present invention. This circuit includes a micro-processor MW-1400 having incorporated therein a Read Only Memory (ROM) for storing a program to be described later and a Random Access Memory (RAM) for storing data, use being made, in this instance, of MN-1400 from Matsushita Electronics Corporation. This micro-processor MN-1400 is provided with a 4-bit A-port and 4-bit B-port as the inputs thereof and with a C-port for production of independent twelve signals, a 4-bit E-port and a D-port as the outputs thereof. Connected to the A- and B-ports are the outputs of a matrix of switches S0 to S22 and TS0 to TS12, the arrangement of which is shown in FIG. 13. The switch S0 is turned on when in the data recording mode; S1 is ON when in self-timer; S2 cooperates with a date-or-time selection switch. CHSW to be described later for controlling the presentation of data from a watch chip to be described later in the form of either year, month and day, or hour, minute and second; S3 is operated when to flash mode; S7 and S8 are closed when the release button is depressed to the first and second strokes respectively; S9 cooperates with a read control switch READSW; S10 cooperates with a set switch SETSW; S11 is closed when each cycle of film winding operation has been completed; S15, S16 and S17 are actuated by a distance adjusting ring (FIG. 20) in such a manner that when at the object distance of 10 meters, S16 is ON; when at 7 meters, S15 and S16 are ON; when at 5 meters, S17 is ON; when at 2 meters, S15 and S17 are ON; and when at 1 meter, S16 and S17 are ON; S18 is an AF switch which is closed when in auto-focus mode; and S19–S22 constitute a film speed setting means. The switches TS0 to TS12 are all transistorized switches with TS0 connected to the output terminal LLT of a light measuring circuit LMC to be described later and arranged to be closed when the object brightness is low, TS1 connected to the output terminal HLT of the above described light measuring circuit LMC and arranged to be closed when the brightness is high, TS2 connected to the output terminal of a comparator IC11 to be described later, TS3 connected to the output terminal EXTT1 of a timing circuit SCC, TS4 receptive of a battery check signal and connected to the collector of a transistor TR6 which constitutes part of a battery checking circuit, TS5–TS8 connected to the data output terminals DATAOUT of the watch chip CLT to be described later so that the data from the watch chip are fed to the accumulator of the MN-1400, TS9–TS11 connected to AND gates IC7–IC9 of the AF circuit, and TS12 for inputting of signals of the charge-completion of the strobo connected to a point on connection between a neon tube NE constituting part of a flash lamp circuit to be described later, and a resistor R19. These switches S0 to S22 and TS0 to TS12 are selectively rendered effective by the output signals from the E-port which also selectively render operative display devices to be described later. E is an electrical power source or bettery connected through a main switch MS to the above described micro-processor MN-1400. When this main switch MS is thrown, the micro-processor MN-1400 starts to operate, and the sequence control is initiated based on the stored program. Transistors TR4 and TR5 and resistors R4, R5 and R6 form a battery holding circuit. The base of the transistor TR15 is connected to the MN-1400 at the output terminal 6 of the C-port. When the transistor TR5 is turned on by the output signal from the terminal 6 of the C-port, the power supply is held. TR7 is a transistor with its base connected to MN-1400 at the output terminal A of the C-port, constituting a battery checking circuit together with a transistor TR6 and resistors R8 to R11.

Figure 14:
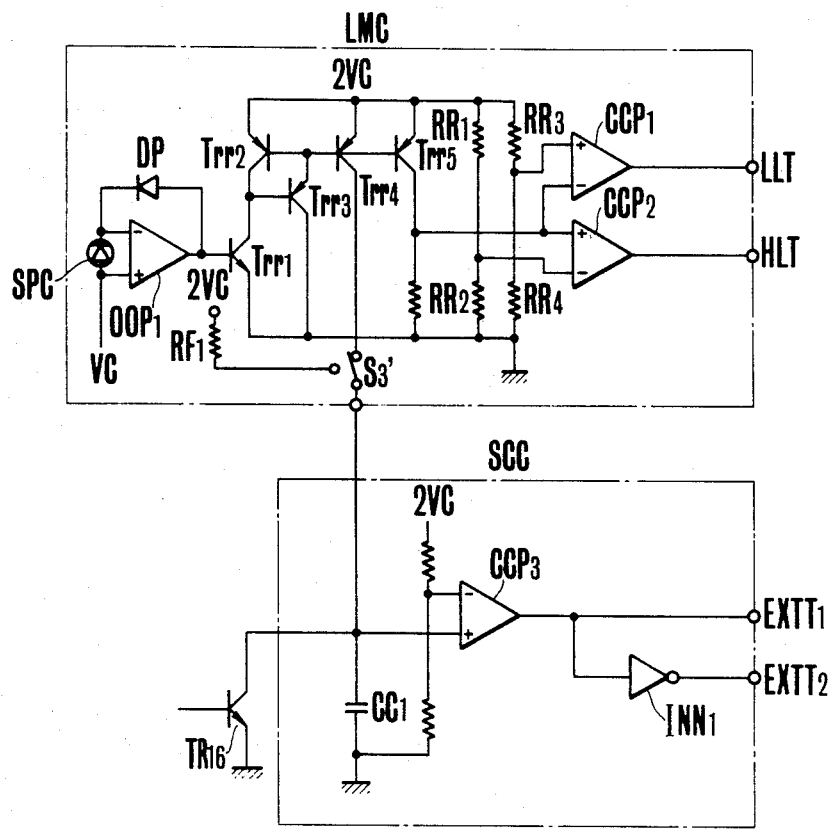
FIG. 14 shows an example of practical construction of the circuits LMC and SCC of FIG. 1.

A light measuring circuit LMC produces an output representative of the level of brightness of an object being photographed. When the object brightness exceeds the lower limit of a dynamic range of exposure control, a signal of high level (hereinafter abbreviated as binary "1") appears at the output terminal LLT of the circuit LMC, while when it exceeds the upper limit, a "1" signal appears at the output terminal HLT. When in flash mode, the circuit LMC responsive to the closure of the flash mode selection switch S3 produces an output with prescribed magnitude suited for flash photography. As shown in FIG. 14, the light measuring circuit LMC comprises an operational amplifier OOP1 with a photosensitive element SPC connected between the inputs and with a diode DP connected in the feedback network thereof, transistors Trr1 to Trr5, resistors RR1 to RR4 and RF1 and comparators CCP1 and CCP2. The above described transistors Trr1 to Trr4 have an elongation function to form a current with intensity corresponding to the object brightness based on the output of the operational amplifier OOP1. The circuit LMC further includes a mode selection switch S3' having two switched positions, in one of which the collector of the transistor Trr4 is connected to a timing condenser CC1 in the circuit SCC, thereby a proper exposure is to be made in daylight mode. When the S3 is turned on, the selection switch S3' is moved to the opposite position where the resistor RF1 is brought into connection with the timing condenser CC1, thereby a proper flash exposure is to be made with a shutter time suited therefor. The aforesaid resistors RR1 to RR4 and comparators CCP1 and CCP2 constitute a comparator circuit for producing a "1" output signal at the terminal LLT when at low brightness, and when at high brightness producing a "1" output signal at the terminal HLT.

Connected across the timing condenser CC1 is the collector-emitter path of a transistor TR16 acting as a count switch for actuating the timing circuit SCC, since the base of the transistor TR16 is connected through a resistor R41 and an inverter IC10 (FIG. 1) to the output terminal 4 of the C-port of the MN-1400, to which is also connected a one-shot circuit ON1 controlling actuation of an electromagnet Mg1 for performing release operation of the shutter. At the termination of duration of a time interval depending upon the output of the light metering circuit LMC, the timing circuit SCC produces a "1" output from one terminal EXTT1 and a low level output signal (hereinafter abbreviated as binary "0") from another terminal EXTT2. Responsive to the "0" output from the terminal EXTT2, an electromagnet Mg2 de-energizes itself to allow for movement of an iron armature (FIG. 15) away therefrom, thereby the shutter is closed. It is to be noted that the shutter adapted for use in this embodiment is of the type which also serves as the diaphragm so that as the time goes on the size of opening of the aperture is increased and upon excitation of the electromagnet Mg2 the operation starts to close. As shown in FIG. 14, the timing circuit SCC further includes a comparator CCP3 having an output connected directly to the terminal EXTT1 and also through an inverter INN1 to the terminal EXTT2. Whether or not the shutter has completed its operation is checked by means of a delay circuit comprising two condensers C1 and C2 and a coil L1 in combination with a comparator IC11.

Figure 15:
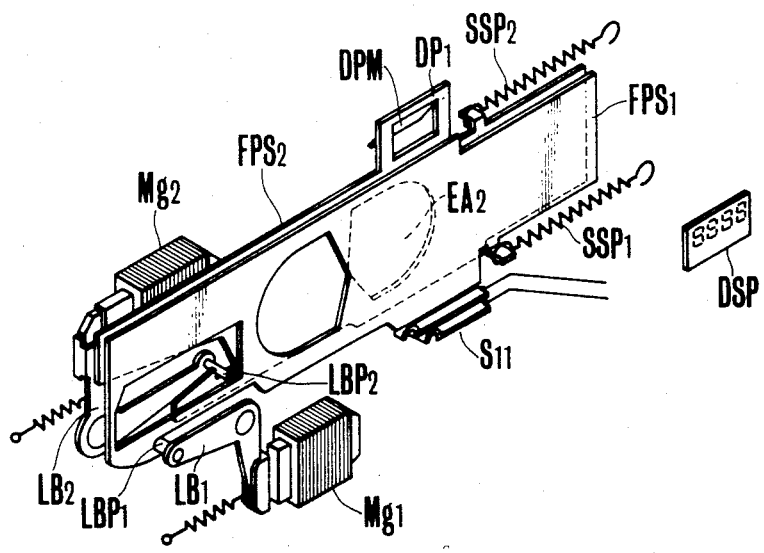
FIG. 15 is a perspective view of a shutter mechanism constituting part of the camera of the invention.

Referring to FIG. 15, there is shown the shutter mechanism comprising front and rear shutter blades FPS1 and FPS2 having respective orifices EA1 and EA2. In the cocked position, the front shutter blade FPS1 is latched by a pin LBP1 planted on a lever LB1 at one arm thereof, the opposite arm of which carries an armature cooperative with the electromagnet Mg1. When the electromagnet Mg1 is energized, the lever LB1 is driven against the force of a spring to turn in a counterclockwise direction, thereby the pin LBP1 is taken out of the path of movement of the front shutter blade FPS1. The rear shutter blade FPS2 is latched in the cocked position by a pin LBP2 engaging with the end portion of the blade. The pin LBP2 is planted on a lever LB2 at one arm thereof, the opposite arm of which carries an armature cooperative with the electromagent Mg2. When the electromagnet Mg2 is de-energized, the lever LB2 is driven by a spring to turn in a counterclockwise direction, thereby the shutter rear blade FPS2 is released from latching connection with the pin LBP2. SSP1 and SSP2 are drive springs for the front and rear blades respectively. A switch S11 is arranged adjacent the lower side of the front blade FPS1 to be closed when in the shutter cocked position.

Turning to FIG. 1, STR0 denotes a flash lamp circuit or apparatus including an electrical power source E2, a power switch STMSW, and a boosting circuit which comprises a resistor R15, a condenser C3, a transistor TR8 and a transformer T1. The output of the boosting circuit is connected through a rectifier diode D1 to a main condenser C4. The voltage on the main capacitor C4 appears across a flash lamp F1. This lamp F1 starts to fire in response to a trigger pulse from a circuit which comprises a transformer T2, a condenser C5 and a resistor R16. As a X-contact of the trigger circuit is used a thyristor SCR with its gating control input connected to the output terminal 7 of C-port of the MN-1400. Whether or not the main condenser C4 is fully charged is detected by a neon tube NE.

An electric motor M for film transportation is provided with a drive control circuit comprising transistors TR1 and TR2, and resistors R1 and R2, the base of the transistor TR1 being connected through the resistor R1 to the output terminal 9 of C-port of the MN-1400. Responsive to the signal from said output terminal, the transistor TR1 is turned on to supply the motor M with electrical power +VC.

A warning sound generating circuit comprises a transistor TR3, a resistor R3 and an oscillator WSG, the base of the transistor TR3 being connected to the output terminal 8 of C-port of the MN-1400. Responsive to the signal from the output terminal 8, the transistor TR3 is turned on, causing the oscillator WSG to produce sound for warning.

Figure 19:
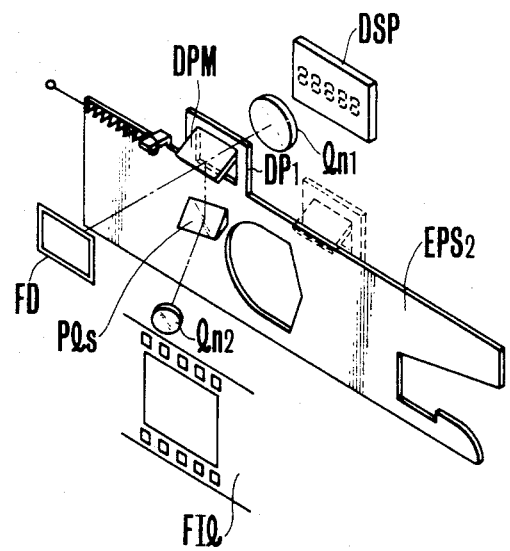
FIG. 19 is an exploded perspective view showing an example of construction and arrangement of an optical data recording system.

A display control circuit includes a decoder DC1 for decoding the outputs of E-port of the MN-1400 to selectively enable the prescribed one of six 7-segmented display devices 7Seg1 to 7Seg6 based on the character-control signal from the E-port. The seven segments of the enabled display device are selectively excited by control signals produced from the D-port to represent the digits 0 to 9 as well as symbols. The display devices 7Seg1 to 7Seg6 are positioned in a finder optical system (FIG. 19) to be visible in the field of view when in the cocked position. When the shutter is in the run down position, light from the display devices is directed to a film FIL in the marginal portion thereof. A data recording optical system (FIG. 19) is so arranged that when a watch chip CLT is read out by turning on a switch Read SW (FIG. 1), or when a setting switch SETSW is turned on, or when an AF switch is turned on, the data cannot be recorded.

Figure 16:
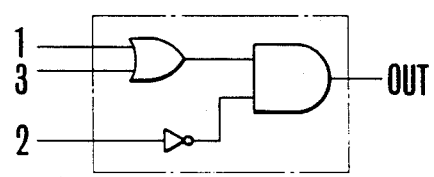
FIG. 16 is an electrical circuit diagram showing an example of a gate usuable as each of the gate circuits G1 to G5 of FIG. 2.
Figure 17:
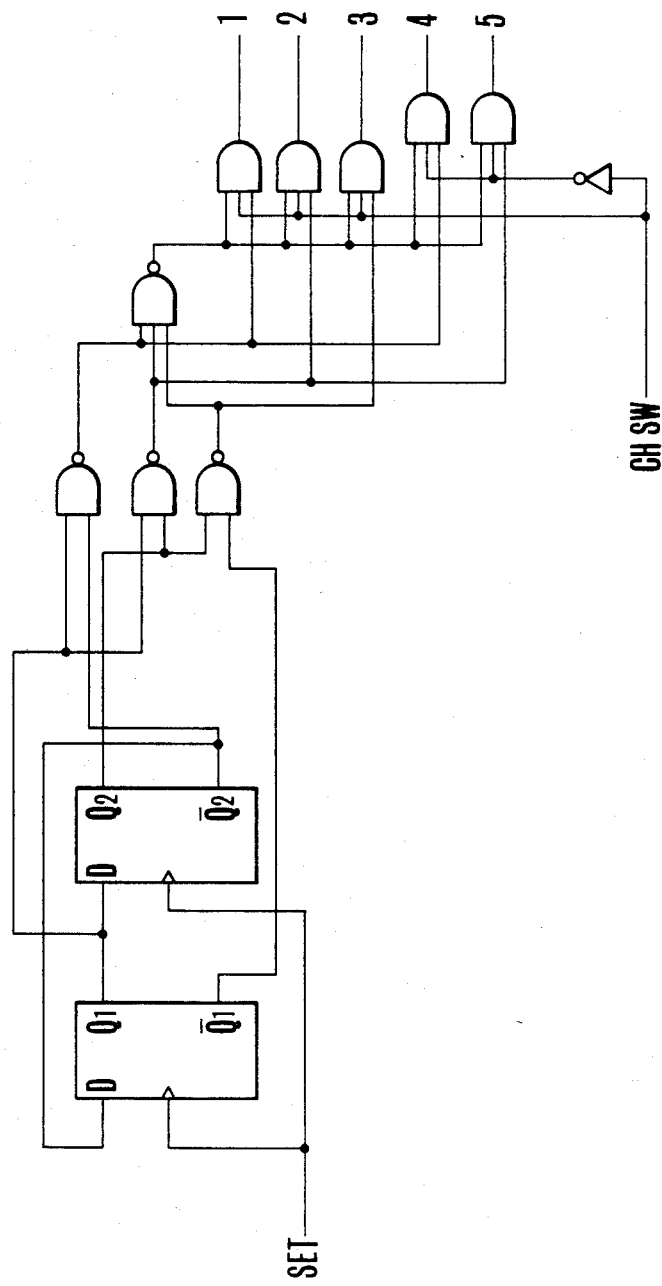
FIG. 17 shows an example of practical construction of the circuit SS of FIG. 2.

The watch chip CLT is provided with an external quartz crystal element CLS whose frequency is adjusted to 32768 Hz by a condenser C6, and has mode control input (MODE) connected to the respective output terminals 0 to 3 of C-port of the MN-1400. A date-and-time changeover switch CHSW and a back cover responsive switch CBSW are also associated therewith. As shown in greater detail in FIG. 2, the output of the aforesaid quartz oscillator is connected to an inverter whose output is connected to the input of the first of flip-flops F1 to F15 with the flip-flop F14 producing a pulse train of 2 Hz frequency and with the flip-flop F15 producing a pulse train of 1 Hz. The pulses from flip-flop F15 are counted by a "second" counter of 60-scale comprising two 4-bit counters D1 and D2 for the first and second places of a number in second respectively. Counters D3 and D4 are of the same construction as that of the D1 and D2 and form a "minute" counter of 60-scale, counting the numbers in the first and second places of data in minute. Counters D5 and D6 form an "hour" counter of 24-scale, counting the numbers in the first and second places of data in hour respectively. Counters D7 and D8 form a "day" counter of 30- or 31-scale, counting the numbers in the first and second places of data in day respectively. Counters D9 and D10 form a "month" counter of 12-scale, counting the numbers in the first and second places of data in month respectively. Counters D11 and D12 form a "year" counter of 100-scale, counting the numbers in the first and second places of data in two figures of year respectively. All the composite counters except the "second" counter are provided with respective input stage gates G1 to G5, the detail of each of which is shown in FIG. 16, comprising an OR gate having two inputs designated 1 and 3, and an output connected to one input of an AND gate, the other input of which is connected through an inverter to an input designated 2. So long as a "0" signal level appears at the input 2, the pulses supplied to the input 1 are passed through the gate to produce at the output OUT. When the reading switch ReadSW is turned on, the pulses of 2 Hz from the flip-flop F14 are allowed to pass through the gate to the one of the composite counters which is selected by the setting switch SETSW, thereby the content of that counter is rapidly changed to present a desired data. Each time the switch SETSW is depressed, a one-shot circuit SET produces one pulse. Responsive to every one pulse from the SET, a set sequence circuit SS shifts a "0" signal level from the output terminals 1 to 5. In more detail, with the change-over switch CHSW in ON state, when the switch SETSW is depressed once and released, the set sequence circuit SS produces a "0" output at the terminal 1. While the outputs at the other terminals 2 to 5 are all of "1". When the switch SETSW is depressed once more and released, the output at the terminal 1 is changed to "1" level, and the output at the terminal 2 to "0" level, while the other outputs remain unchanged. When the switch SETSW is depressed thrice and released, a "0" output is produced only from the terminal 3. Then, with the CHSW in OFF state, when the set switch SETSW is depressed once and released, a "0" output is produced only from the terminal 4, and when twice, only from the terminal 5. The details of the circuit SS is shown in FIG. 17. READ is a circuit for producing a "1" output when the reading switch READSW is ON. The output of this circuit is connected to one input of an AND gate ANDG1 having the other input connected to the output of the flip-flop F14 and having an output connected to the input terminal 3 of each of the gates G1 to G5. The circuit READ is constructed with inverters. It is to be understood that these circuits SET, READ and SS constitute a circuit for setting time data in the form of the numbers of pulses counted by the counters D3 to D12. The one of the counters which is to be set is called on depending upon the number of times of depression of the set-button, while all the counters except the selected one are cut off from the supply of pulses by the respective input stage gate circuits. The selected counter is supplied with the pulses of 2 Hz through the AND gate ANDG1 when the read switch is ON, thereby the data advances two steps per second. As soon as a desired data appears, the operator needs to release the reading button.

A multi-plexer enclosed within a block CMP has as the input terminals mode input terminals MODE0 to MODE3 and data input terminals I1-1 to I7-2 and further an input terminal CH which is connected to the above described Date-Time changeover switch CHSW, and as the output terminals a terminal FC and data output terminals DATAOUT. Of these input terminals the MODE0 to MODE3 are connected to the output terminals 0 to 3 of C-port of the MN-1400. Based on the input signal at the terminals MODE0 to MODE3 and the signal at the input terminal CH, as shown in FIG. 3, the data of the counters appearing at the input terminals I1-1 to I7-2 are selectively transmitted to produce at the output terminals DATAOUT.

Figure 18:
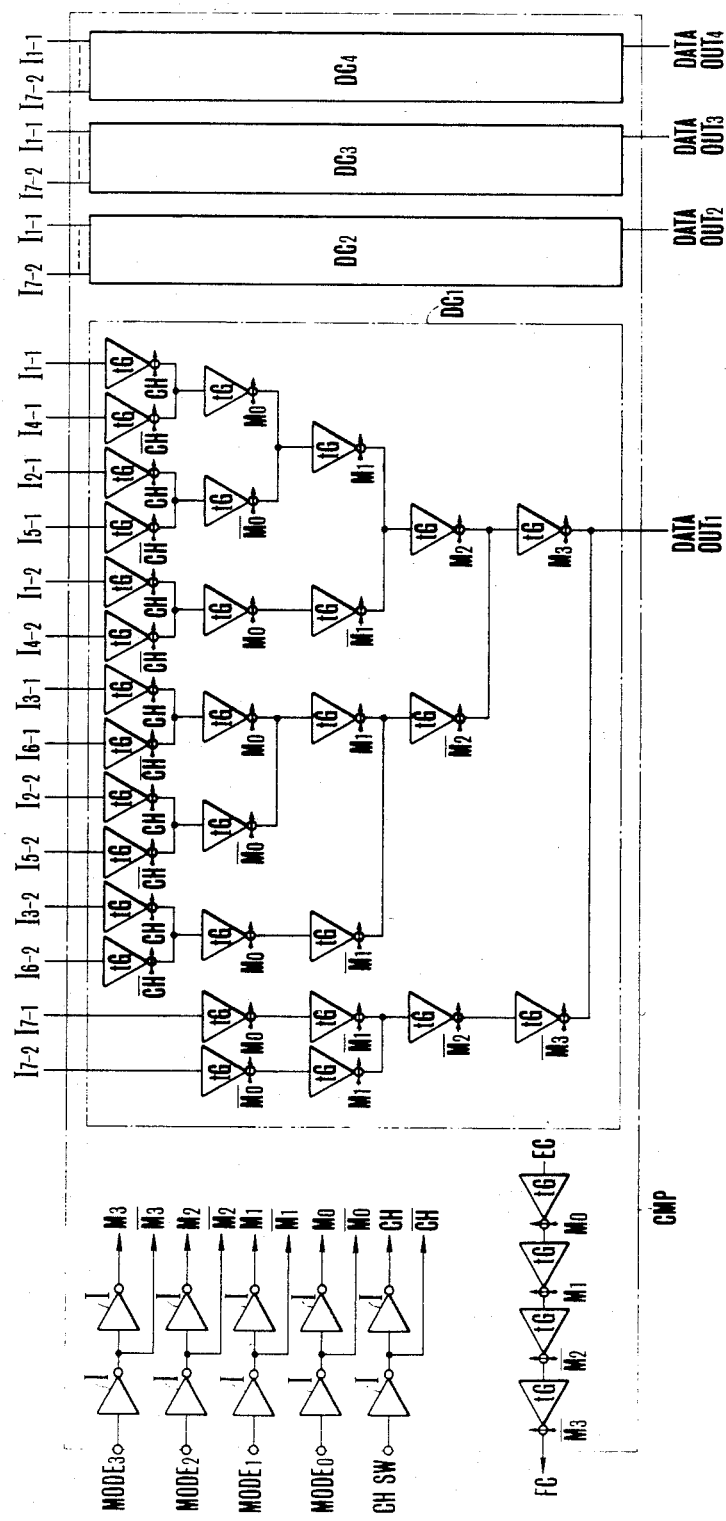
FIG. 18 shows an example of practical construction of the circuit CMP of FIG. 2.

FIG. 18 shows an example of the multi-plexer CMP where a reference character I denotes inverters responsive to the signals from the input terminals MODE0 to MODE3 and CHSW for producing signals M0 to M3 and CH and also their complementary signals $\overline{M0}$ to $\overline{M3}$, and $\overline{CH}$. Responsive to different combinations of these outputs, gating circuit DC1 to DC4 allocate channels through which the selected one of the above described counters D1 to D12 communicates with the output terminals DATAOUT thereof. It is to be noted that since the number of bits in each counter is four as has been indicated above, there are provided in each bit the corresponding number of gating circuits DC1 to DC4 of same construction. As shown in the block DC1, each gating circuit is constructed with a gate element tG which opens on when the outputs M0–M3, $\overline{M0}$–$\overline{M3}$, CH and $\overline{CH}$ take "1" level, and closes when the outputs take "0" level, thus cutting off the transmission of the input signals.

Figure 2:
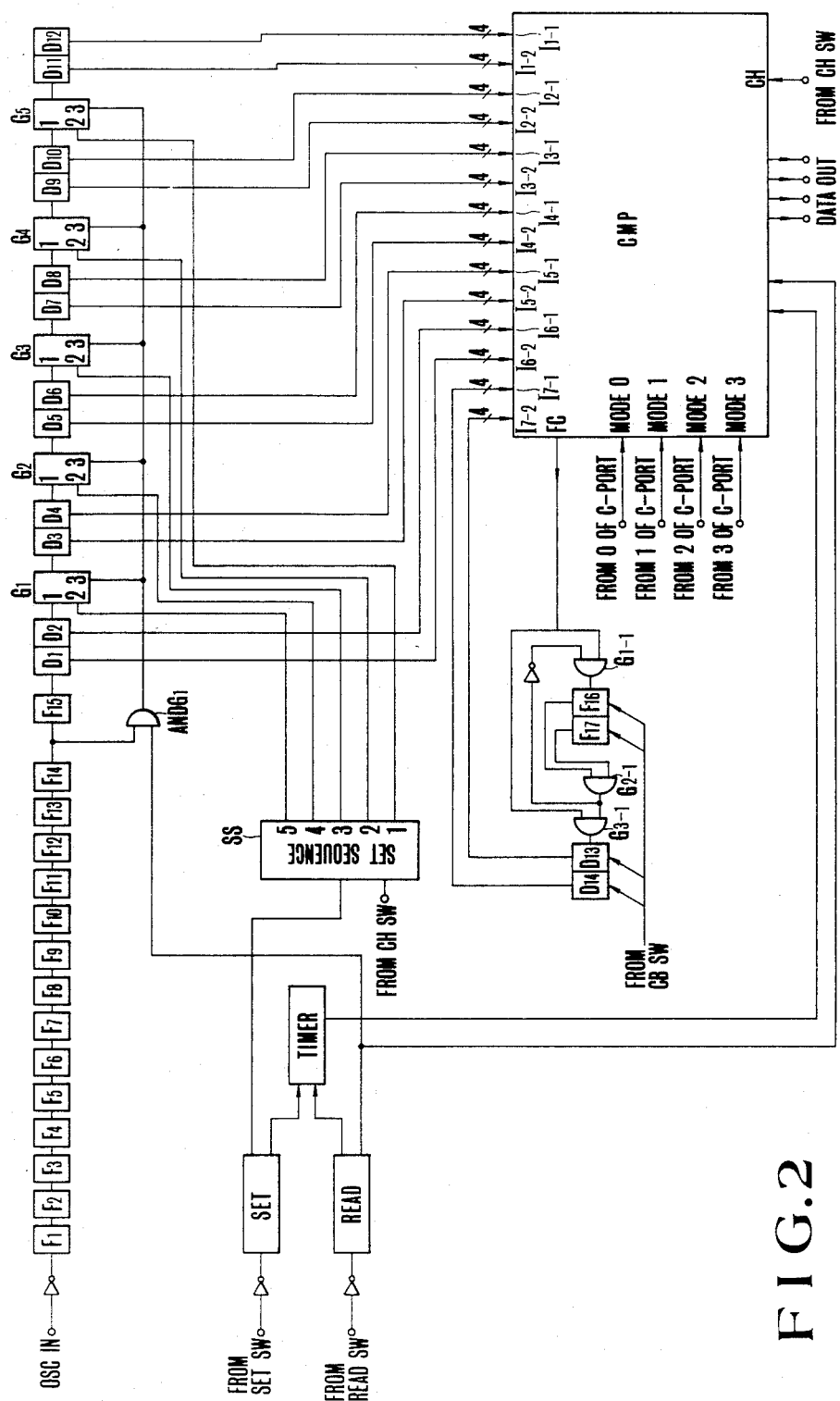
FIG. 2 shows an example of practical construction of the block CLT for a watch chip of FIG. 1.

Turning to FIG. 2, a film frame counting circuit includes a blank frame counting flip-flops F16 and F17 and net frame counters of 10-scale D13 and D14. The input of the flip-flop F16 is connected to the output of an AND gate G1-1 having one input connected to the output terminal FC of the above described multi-plexer CMP. After the film has been loaded, when the camera is cocked thrice, being ready for its first picture, three pulse signals are fed to the flip-flops F16 and F17 which then produce "1" outputs. G2-1 is an AND gate whose two inputs are connected to the respective outputs of the flip-flops F16 and F17 and whose output is connected to an inverter having an output connected to the other input of the gate G1-1, so that when the flip-flops F16 and F17 take "1" output level simultaneously, no more frame count signals from the terminal FC of the multi-plexer CMP are allowed to enter the flip-flops. The output of gate G2-1 is also connected to one input of an AND gate G3-1, and actuates the gate G3-1 by the output of the gate G2-1 so as to pass picture frame count signals from the terminal FC to the counter D13. The flip-flops F16 and F17 and counters D13 and D14 are reset when the back cover of the camera is closed.

Figures 4, 5:
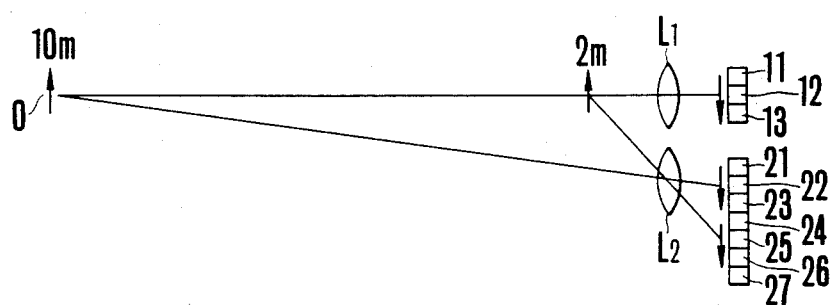
FIG. 4 is a schematic view of a focus detecting optical system with a sensor.
FIG. 5 shows a condition of outputs of the sensor elements of FIG. 4.

Turning again to FIG. 1, an auto-focus circuit AF includes a first row of sensor elements 11 to 13 and a second row of sensor elements 21 to 27 positioned behind lenses L1 and L2 respectively as shown in FIG. 4. Whilst an object image formed by the lens L1 on the first row remains stationary in position as the object distance is varied, another object image formed by the lens L2 on the second row changes its position as shown in FIG. 7. The sensor elements 21 to 27 are connected at one ends thereof through a resistor R42 to the ground and at the other ends to respective transistors TR9 to TR15 whose bases are connected through respective switches AF' to output terminals 2 to 8 of the decoder DC1 respectively. The transistors TR9 to TR15 are rendered conducting sequentially in this order, and therefore the sensor elements 21 to 27 are selectively one at a time and sequentially connected to the voltage source +EC, so that the voltage appearing across the resistor R42 is proportional to the output of the selected one of the sensor elements for actuation. This voltage is applied to an amplifier IC11. A resistor R28, a diode D2, a diode D3 and a resistor R29 are connected in series to each other in this order between the voltage source +EC and ground, the junction of the diodes D2 and D3 being connected to the output of the amplifier IC11. The sensor elements 11 to 13 are connected at one ends thereof to the voltage source +EC through a diode and at the other ends to ground through respective resistors R30 to R32 across which voltages proportional to the outputs of the sensor elements 11 to 13 appear. Comparators IC1 to IC6 constitute window comparators together with the resistors R28 and R29 and diodes D2 and D3. Of these the IC1 and IC2 are arranged to compare the output of the second sensor row wih the output of the sensor element 11 and only upon coincidence to produce "1" outputs simultaneously. The IC3 and IC4 are arranged to compare the output of the actuated sensor element in the second row with the output of the sensor element 12 and only upon coincidence to produce "1" outputs simultaneously. The IC5 and IC6 are arranged to compare the output of the actuated sensor elements in the second row with that of the sensor element 13 and only upon coincidence to produce "1" outputs simultaneously. The outputs of the comparators IC1 and IC2 are connected to respective inputs of an AND gate IC7, the outputs of the comparators IC3 and IC4 are connected to respective inputs of an AND gate IC8, and the outputs of comparators IC5 and IC6 are connected to respective inputs of an AND gate IC9.

Figures 1, 11:
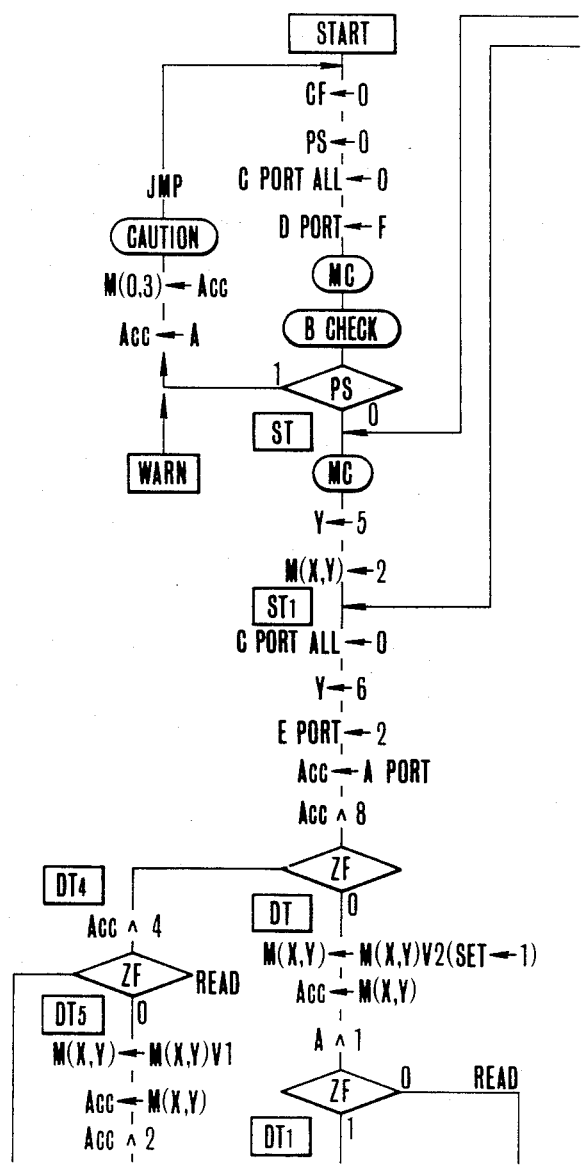
FIG. 11 is a micro flow chart showing a manner in which the various functions of the camera may be carried out in the form of instructions.
Figures 2, 11:
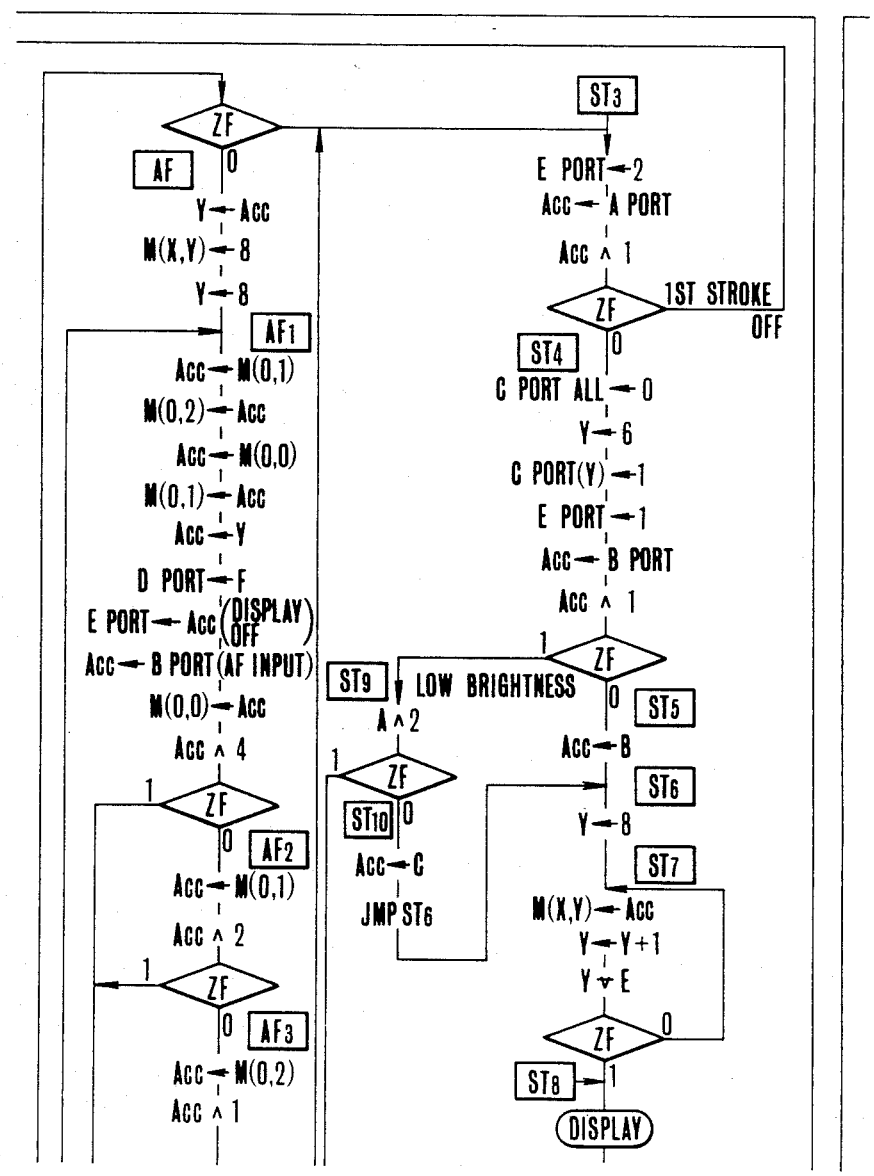
Figures 3, 11:
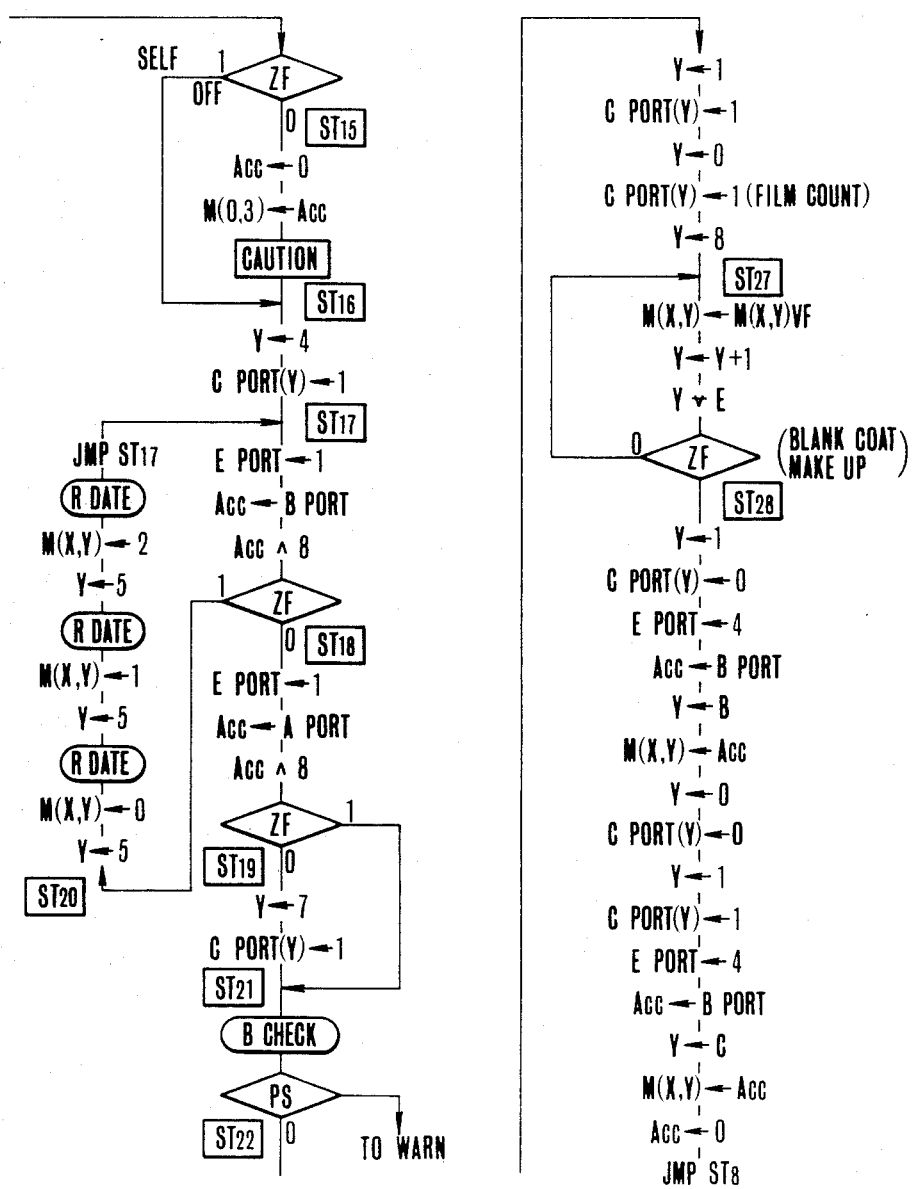
Figures 4, 11:
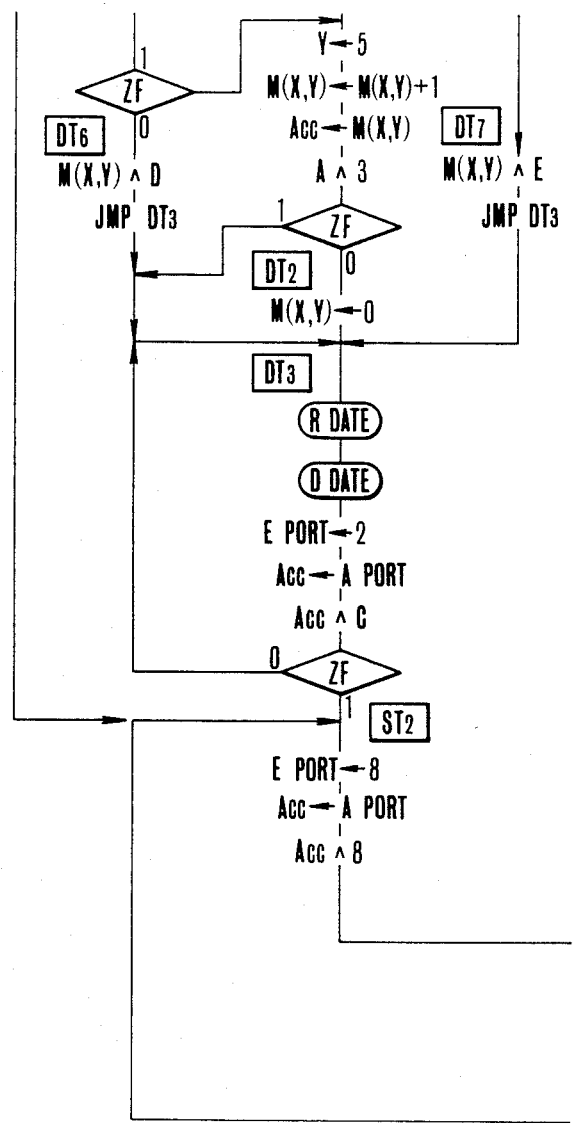
Figures 5, 11:
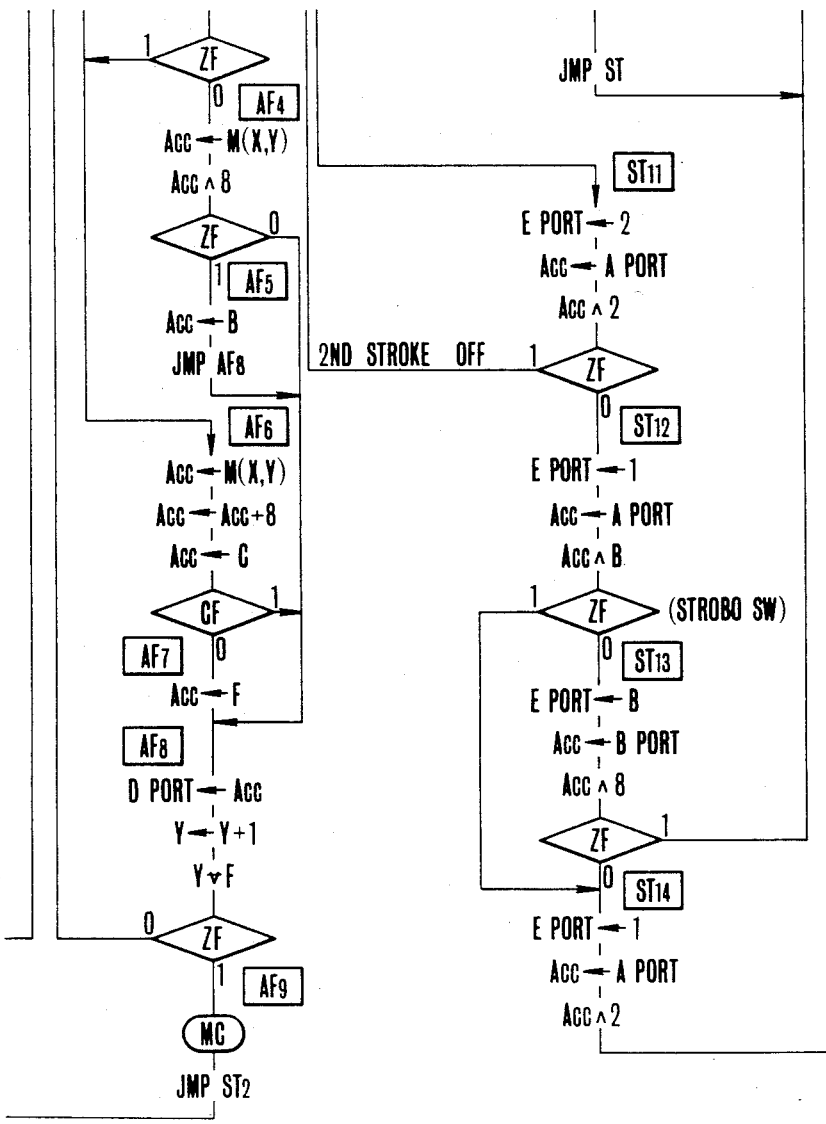
Figures 6, 11:
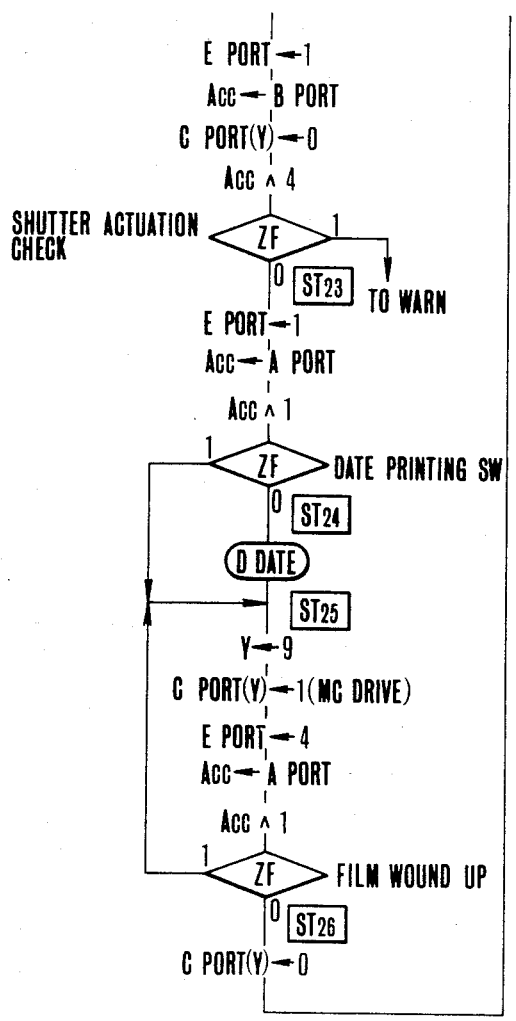
FIG. 6 is a table showing the various combinations of outputs of the AF circuit of FIG. 1.

In this arrangement, to measure the object distance, the second sensor row is first scanned in sequence to detect the three of the sensor elements 21 to 27 of which the outputs coincide with those of the sensor elements 11 to 13 respectively. Then, which succession of sensor elements admit of an image of the same object as that of which an image is formed on the first row of sensor elements 11 to 13 are determined in relative position. For example, let us assume that the object lies at a distance of 2 meters, an equivalent object image to that formed on the sensor elements 11 to 13 is formed on the sensor elements 24, 25 and 26 in the second row as shown in FIGS. 4 and 7. At this time, the outputs of the elements 24 to 26 coincide with those of the elements 11 to 13 as shown in FIG. 5. For this reason, when the scanning reaches the sensor elements 24, the IC7 produces a "1" output, while the other two IC8 and IC9 producing "0" outputs as shown in FIG. 6. In the next or sensor element 25 scanning step, the IC8 produces a "1" output, and in the next or sensor element 26 scanning step, the IC9 produces a "1" output. Thus, the AND gates IC7 to IC9 change their outputs to "1" level successively, indicating that the given object in line to the first lens L1 forms its image on the sensor elements 24 to 26. Therefore, the object distance is found to be 2 meters in reference to FIG. 7. Each of the switches AF' is arranged to be moved from its "a" position to its "b" position, when the switch AF is turned on. As shown in FIG. 8, the micro-processor MN-1400 contains sixteen memories M0 to M9 and MA to MF, each of which takes the form of 4 bits.

Figures 1, 10:
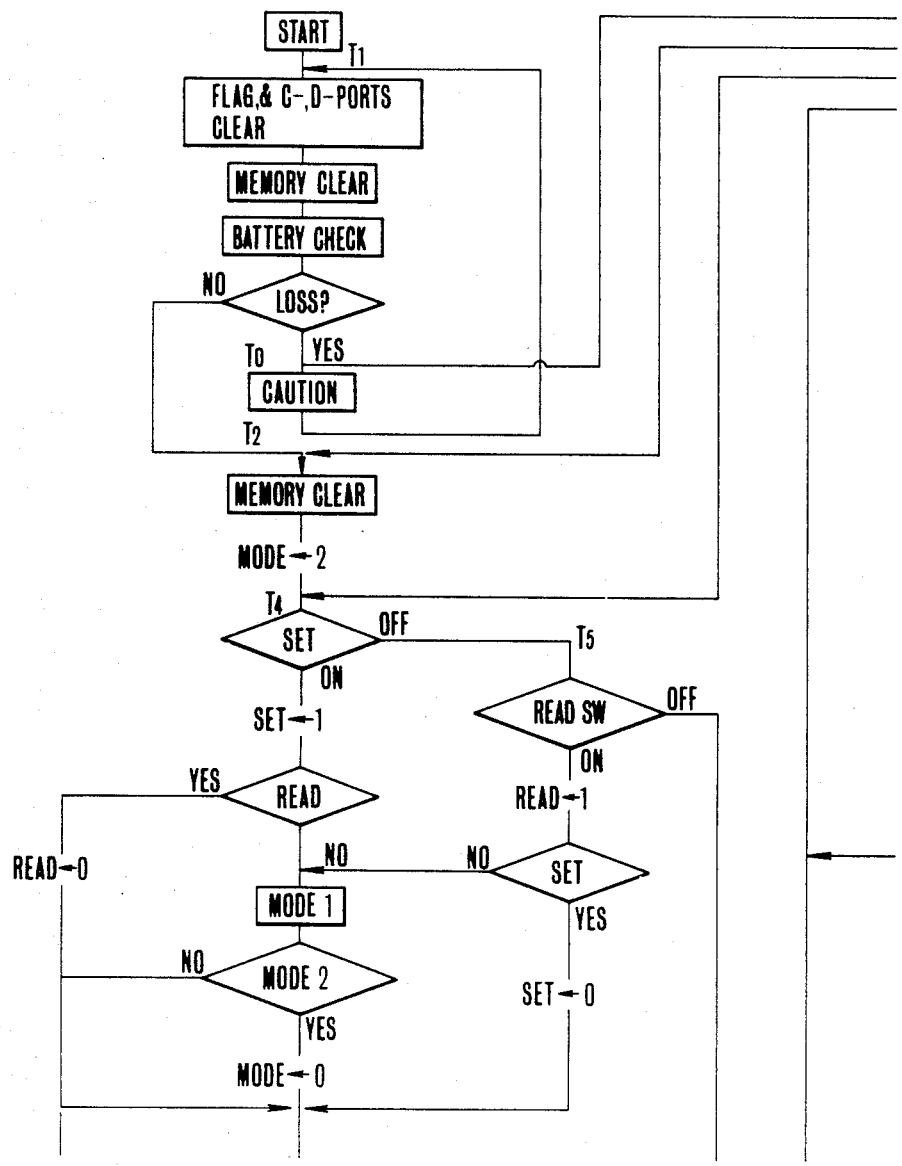
FIG. 10 is a micro flow chart showing a manner in which the invention may be operated.
Figures 2, 10:
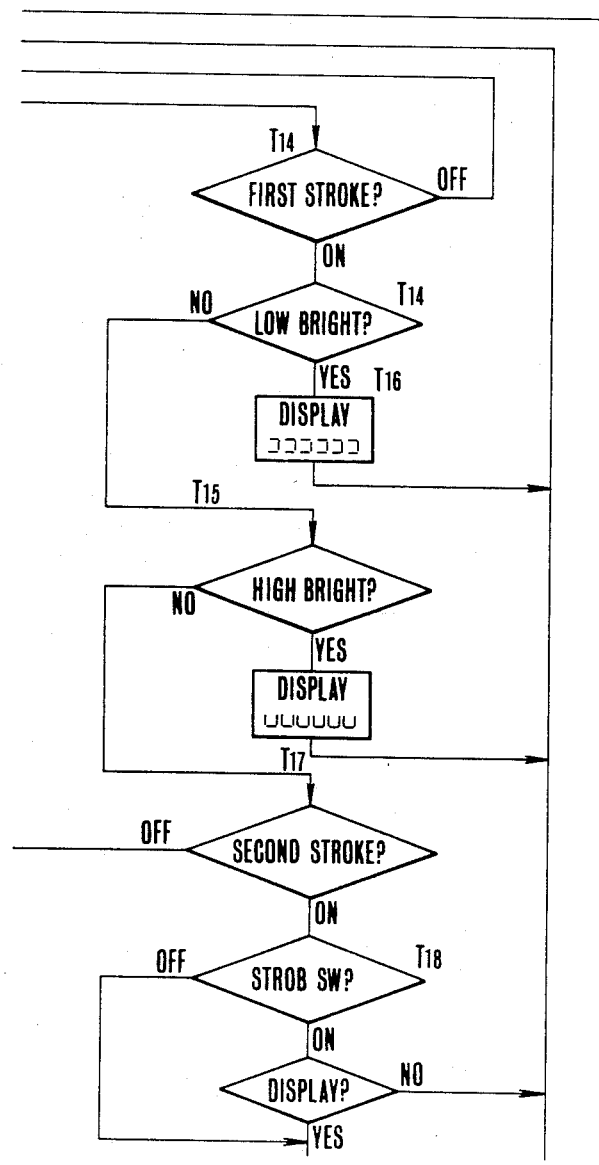
Figures 3, 10:
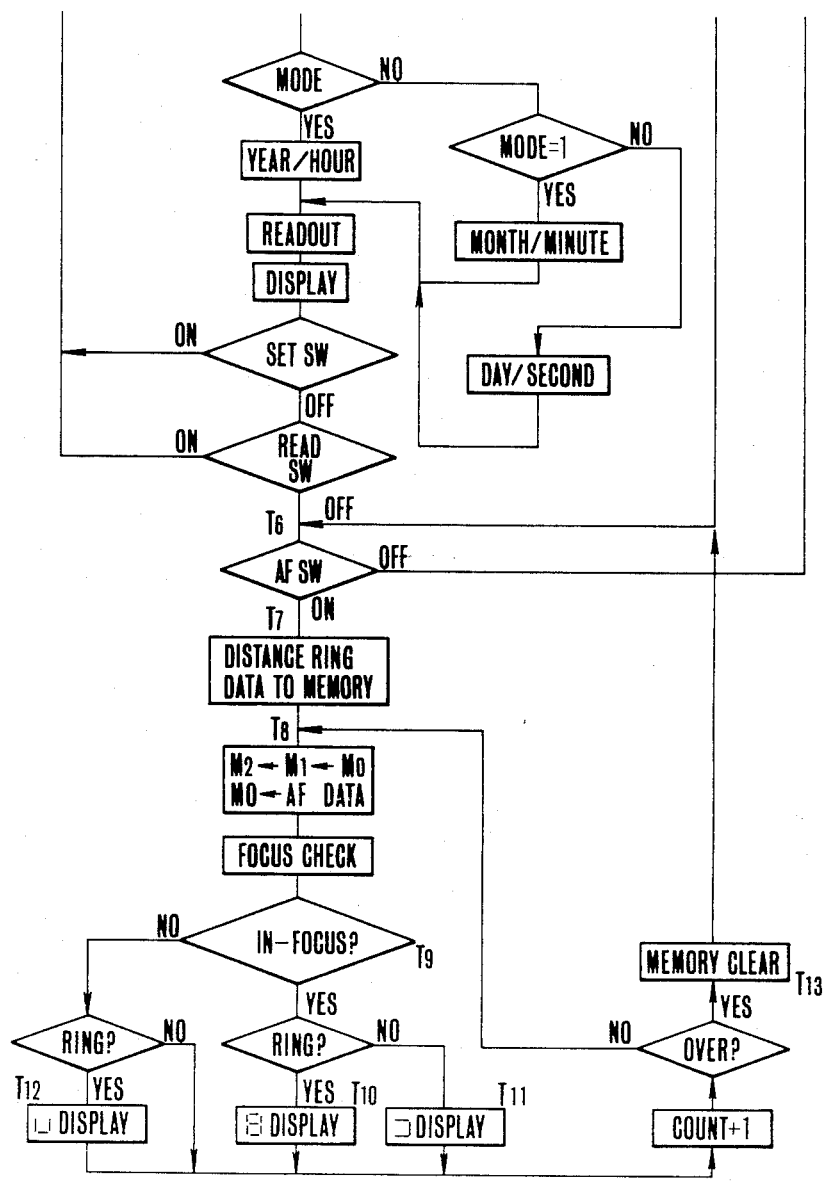
FIG. 3 is a table for relation of the inputs and outputs of the multi-plexer of FIG. 2.
Figures 4, 10:
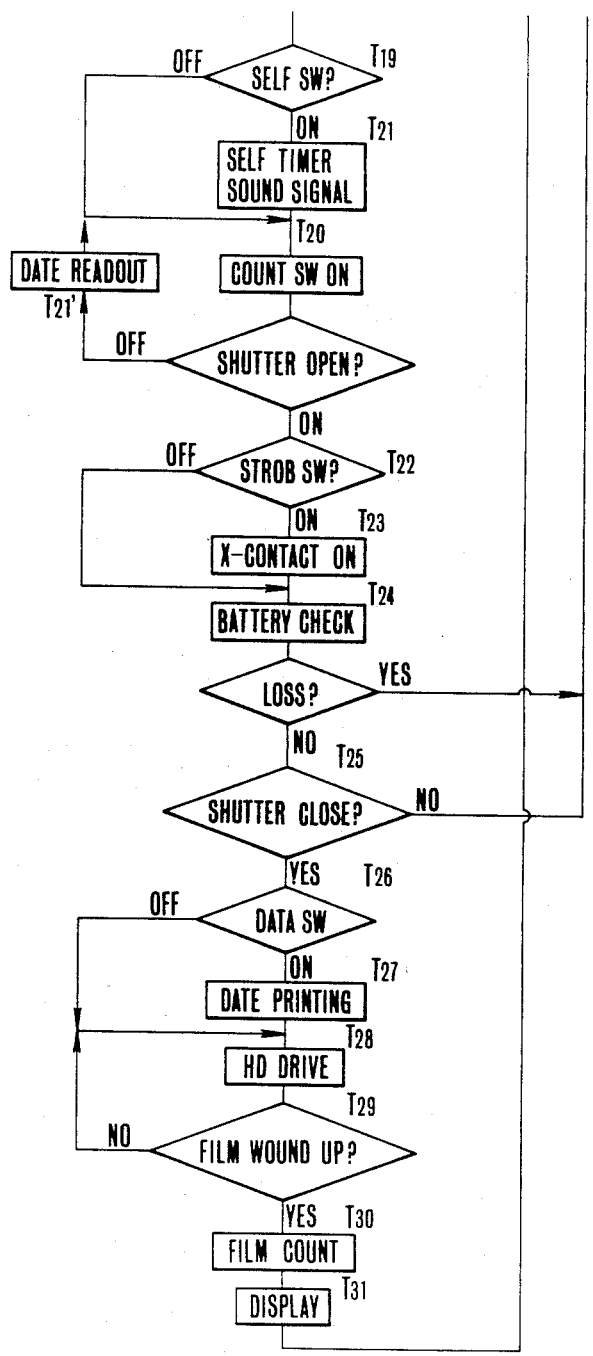

The operation of the camera of the invention is first outlined by reference to the micro flow chart of FIG. 10.

When the main switch MS now is turned on, the MN-1400 is supplied with electrical power and at the same time automatically cleared up, thereby the instruction counter is set to a START address (000). This also causes the carry flip-flop CF and the flag of a program status PS to be reset, and then the C- and D-ports of the MN-1400 to be reset. After that, the memory locations M0 to M9 and MA to MF to be used are cleared up, thus completing the initialization of the MN-1400. Then, the battery checking function for the battery E is performed by BCHECK subroutine.

This subroutine serves to produce a "1" output from the terminal A of C-port of MN-1400, by which the transistor TR7 (FIG. 1) is turned on to apply the actual voltage of the battery E across the voltage divider of resistors R8 and R9. When the battery voltage is above the satisfactory operating level, the transistor TR6 is turned on with production of a "0" output which causes the switching transistor TR4 (FIG. 13) of B-port to be set in non-conducting state. Thus, the PS of MN-1400 is set to "0". Conversely when the battery voltage falls below that level, the TR6 is turned off, causing the switching transistor TS4 (FIG. 13) of B-port to be set in conducting state and therefore causing the PS to be set in "1". Thus, the condition of the PS is determined based on the battery voltage. If the PS was "1" representing the loss in battery voltage, a CAUTION subroutine is carried out. If the PS was "0", a MEMORY CLEAR subroutine is carried out. The CAUTION subroutine serves to produce an output signal from the terminal 8 of C-port of MN-1400 which alternately takes "1" and "0" levels, causing the oscillation plate WSG to vibrate at a frequency of 2 Hz, thereby warning sound is heard. Therefore, if the voltage of the battery is insufficient, the ON and OFF control pulses of 0.5 sec. duration actuate the oscillation plate WSG, informing the operator of the fact that the battery is no longer usable. Ater that, the process is returned to the initial step by a command labelled T1, and repeats. If the battery E is sufficient, as has been mentioned above, the next step is taken where the MEMORY CLEAR subroutine is carried out to clear up the memory elements M0 to M9 and MA to MF. Then, the MN-1400 produces a "1" output at the terminal 2 of E-port, causing the conditions of the switches S9 and S10 to be read in an accumulator. Now assuming that the READ and SET switches S9 and S10 are OFF, a command labelled T6 reads the condition of the AF switch S18. If the AFSW is ON, a command labelled T7 performs a focus scanning operation. In other words, when the AFSW is ON, the conditions of the switches S15, S16 and S17 are read in the accumulator, as the focusing ring initially assumes a certain position, while the decoder DC1 is caused by the signal from the E-port of MN-1400 to produce a sequence of scanning control signals at the terminals 8 to 2 thereof. As the second row of sensor elements 21 to 27 are scanned, the scanning result is compared with the outputs of the sensor elements 11 to 13 with production of outputs of the gates IC7 to IC9 which are transferred to the memory elements. Then, the contents of the memory elements are shifted from the M0 to M1, and then from M1 to M2. As a result, the concurrent scanning signal is stored in the memory element M0, the just-preceding scanning signal in the memory element M2, and the last but two scanning signal in the memory element M3. When the specific image position on the second sensor row has been determined based on the content of the 3-figure memory (M0, M1, M2), that is, when the object distance has been measured, a command labelled T9 performs comparison of the thus measured object distance with that set in by the focusing ring and stored in the memory by the command T7. If coincidence is effected, a command labelled T10 performs display of a symbol " by the display device. If coincidence is not yet attained, a command labelled T11 performs display of a symbol "  "

by the display device. On the other hand, during the scanning operation, when those of the sensor elements in the second row on which an image of an image object at a distance corresponding to the setting of the focusing ring is to be formed has been recognized, a command labelled T12 performs display of a symbol "  " by the other display device for cooperation with the focusing ring, thereby how long distance the focusing ring is now set to is displayed. Thus, one cycle of scanning operation has been completed. Then, a command labelled T13 succeeds to clear up the memory elements, and the sequence of operations beginning with the command T6 repeats. When the switch AF remains ON, the next cycle of scanning operation is performed. Now assuming that, as the setting of the focusing ring attains the condition of in-focus, the symbol "  " is displayed, then when the AF switch is turned off, the command labelled T6 is followed by a command labelled T14 which reads the ON/OFF condition of the first-stroke responsive switch S7. If the release member was depressed to the first stroke, the command labelled T14 operates. If the first stroke was not effected, the sequence of operation beginning with the command labelled T4 repeats. Now assuming that the first stroke of release is actuated, the MN-1400 produces a "1" output at the terminal 6 of C-port, causing the transistor TR5 to be held in conducting state, and also causing the transistor TR4 to be turned on, thereby the light measuring circuit LMC is rendered operative with electrical power supply from the battery E. When the object brightness is extremely low, the circuit LMC produces a "1" output at the terminal LLT, thereby the switching transistor TS0 is turned on. Responsive to the advent of the signal from the TS0 through the B-port, the MN-1400 produces a display control signal at the D-port, thereby each of the display devices 7Seg1 to 7Seg6 is caused to display a symbol "  " representing the out-of-range low light value. When the brightness is extremely high, the circuit LMC produces a "1" output at the terminal HLT, causing the switching transistor TS1 to be turned on. This condition of TS1 is read through the B-port in the MN-1400, and a control signal produced at the D-port causes each of the display devices 7Seg1 to 7Seg6 to display a symbol "  ", representing the out-of-range high light value. When the light value sensed by the circuit LMC falls within the range, a command labelled T17 reads the second-stroke responsive switch S8 through the A-port in the MN-1400. If the switch S8 was ON, that is, if the release was actuated to the second stroke, a command labelled T18 operates. If the second stroke was not yet actuated, the command labelled T14 repeats. Now assuming that the second stroke was actuated, a command labelled T18 makes determination of whether the flash mode is selected, or not, depending upon the ON and OFF conditions of the STROB0 switch 53. As the switch S3 is read in the MN-1400 through the A-port, if the S3 was ON, that is, if the flash mode was selected, the switch TS12 is read. If the switch TS12 was ON, a command labelled T19 operates. If the switch TS12 was OFF, the command labelled T2 repeats. Since the switch TS12 is connected to the neon tube NE, and the neon tube NE is ON only when the charging of the main condenser is completed, it is only after the attainment of the voltage on the main condenser to the satisfactory firing level that the command labelled T19 is executed. If the switch S3 was OFF, the command labelled T19 immediately follows. The command labelled T19 reads the switch S1 through the A-port in the MN-1400. If the switch S1 was OFF, a command labelled T20 operates. If the switch S1 was ON, after the operation of a command labelled T21 has been completed, the command labelled T20 operates. Since the switch S1 is of the self-timer, if the camera was set in the self-timer mode, as has been mentioned above, the command labelled T21 is followed by the command labelled T20. If not in self-timer mode, it is without the recourse to the command labelled T21 that the command T20 succeeds. The command labelled T21 serves to produce alternating "1's" and "0's" from the output terminal 8 of C-port of the MN-1400 each in a time interval of 0.5 second, which causes the oscillation plate WSG to generate warning sound for a period of 8 seconds likewise as in the out-of-range light value warning information. Thus, self-timer exposures are to be made in a 8-second delay during which time the operator can be aware of. In the next step of programmed loop, the command labelled T20 operates on the output terminal 4 of C-port of the MN-1400 to produce a "1" output by which an electromagnet Mg1 is actuated to initiate a release of the shutter, and the transistor TR16 is turned off to initiate a timing operation of the circuit SCC. At the termination of duration of a time interval dependent upon the output of the circuit LMC, the timing circuit SCC produces outputs at the terminals EXTT1 and EXTT2, by which an electromagnet Mg2 is actuated to initiate a closing operation of the shutter. Thus, a correct exposure value is derived on one hand. On the other hand, the signal at the output terminal EXTT1 of the timing circuit SCC is read in the MN-1400 by means of the switch TS2. If no signal was present at the output terminal EXTT1, that is, if the exposure is under progress, a command labelled T21 operates on the watch chip CLT to move ever-varying time data from the counter thereof through the switches TS5 to TS8 to the MN-1400 through the B-port and to store it in the memory thereof. Upon production of the signals at the output terminals EXTT1 and EXTT2 of the timing circuit SCC, a command labelled T22 is executed to read the switch S3 again. If the switch S3 was ON, that is, if the camera was set in flash mode, a command labelled T23 is executed and then followed by a command labelled T24. If the switch S3 was OFF, the command labelled T22 is immediately followed by the command labelled T24. The command labelled T23 serves to produce a "1" output from the terminal 7 of C-port of the MN-1400 at which the thyristor SCR is turned on to trigger the discharge tube FL. Thus, the flash lamp FL is fired. In the case of flash photography it is after the firing has been completed that the command labelled T24 is executed. In the case of daylight photography, it is soon after the closing operation of the shutter starts that the command labelled T24 is executed. This command labelled T24 checks whether the battery voltage is above the satisfactory operating level as has been mentioned above. If the battery voltage was lowered below that level, a command labelled T3 is executed, and performs warning. If it was above that level, a command labelled T25 is executed. It is understood that as either the firing of the flash lamp FL, or the driving of the shutter for closing movement consumes a large amount of electrical energy in the battery, the incorporation of a battery check at this step of the sequence of operations insures that the occurrence of faulty operation resulting from the otherwise overlooked battery voltage drop below the level can be avoided in the steps that follows. now assuming that the battery voltage is sufficiently high, the command labelled T25 applies the signal from the comparator IC11 to the MN-1400, where a check is made to determine whether the operation of the shutter is normal. If the shutter operation was abnormal, the command labelled T3 is executed to perform warning. If the shutter operation was normal, a command labelled T26 is executed. Now assuming that the normal operation is effected, then the command labelled T26 reads the data recording control switch S0 in the MN-1400 through the A-port thereof. If this switch S0 was ON, a command labelled T27 preceding a command labelled T28 is executed. If it was OFF, the command labelled T28 is immediately executed. The command labelled T27 is application of the watch data stored in the memory of the MN-1400 by the command labelled T21 to the display devices 7Seg1 to 7Seg6 through the D-port, thereby the watch data is displayed in the luminous form and printed on the film. When in the data printing mode, therefore, the termination of a data printing is followed by the command labelled T28. When out of data printing mode, the command labelled T28 is immediately executed. This command serves to produce a "1" output from the terminal 9 of C-port of the MN-1400 at which the transistor TR1 and TR2 are turned on to energize the motor M. Motion of the motor is transmitted to a film transport mechanism. Whilst the film is being advanced, a command labelled T29 reads the switch S11 in the MN-1400. When one cycle of film winding operation has been completed to turn on the switch S11, the motor M gets stopped from further rotation. Then, a command labelled T30 is executed. This command operates on the film frame counter in the watch chip CLT so that the content of the counter advances by one count. Then, a command labelled T31 reads out the content of the frame counter by means of the display devices 7Seg1 to 7Seg6. From this step is returned the programmed loop to that of the command labelled T2. Thus, such sequence of operations repeats to make the next exposure. It is noted that the light measuring circuit LMC, when in flash mode, also automatically forms an exposure value suited for flash photography, and therefore the size of diaphragm aperature and shutter time are controlled in accordance with the exposure value to effect a correct flash exposure.

Next explanation will be given to the practice in which the camera of the invention operates by reference to the micro flow charts of FIGS. 11 and 12 and the program of FIGS. 21-1 to 21-15 stored in the Read Only Memory of the micro-processor MN-1400. A list of operation codes used in the instructions of FIGS. 21-1 to 21-15 are given along with comments on performance of the operations in Tables of FIGS. 22-1 to 22-3.

Before embarking on the description of the various modes of operation of the camera, each of the subroutines used in the program embodying the present invention is explained in greater detail below.

Battery Check Subroutine (BCHECK)

This subroutine is stored in addresses coded No. 100 to No. 109 (FIG. 21-10). The address No. 100 is first executed to perform an operation for which the code is LY representing load of the n from an immediate field to a Y register. Since the data code for this address No. 100 is 6A, the n of the immediate field is A in hexadecimal (base 16) notation. Therefore, the command LY when carried out loads the A into the Y register. Then, the next address No. 101 is executed to carry out a command SCO, causing the one of the output terminals of C-port which is prescribed by the content of the Y register to be set. Since the Y register now contains A, the micro-processor MN-1400 produces a "1" signal at the output terminal A of C-port thereof. Therefore, the transistor TR7 is turned on to apply the voltage of the battery E across the series-connected resistors R8 and R9. If the actual voltage of the battery is above the predetermined level, a voltage at the connection point between the resistors R8 and R9 actuates the transistor TR6 for conduction with production of a "0" potential at the collector thereof. Conversely when the battery is so used up to produce a voltage lower than the predetermined level, the transistor TR6 is rendered non-conducting to cause change of the collector potential to "1" level.

After the command SCO from the address No. 101 has been carried out in such a manner, the instruction at the address No. 102 is next carried out. The command OTIE from the address No. 102 is an output command for reading the n from the immediate field n to the E-port. Since the data code is F2, and therefore the number n is 2, the MN-1400 is caused to produce a "1" signal at the output terminal 2 of E-port. Therefore, the output line of the terminal 2 of E-port is fed with the "1" signal so that the "1" signal is applied to the collector of the transistor forming the switch TS4. Since the base of the transistor TR4 is connected to the collector of the transistor TR6, the transistor switch TS4 becomes ON when the battery voltage is above the predetermined level, and OFF when the battery voltage is lower than the predetermined level.

The address No. 103 is then executed to carry out an input command INB for reading the data from the B-port into the accumulator. Since the performance of the preceding operation has resulted in the selection of the switches TS4, S4, S5 and S6 for connection with the input terminals of B-port, the conditions of these switches TS4 and S4 to S6 are read in the accumulator. As has been mentioned above, when the battery voltage is higher than the predetermined level, the transistor of the switch TS4 remains in OFF state so that the input terminal 1 of B-port is fed with "0". Thus, the accumulator now contains [0000]. Conversely when the battery voltage is lower than the predetermined level, the content of the accumulator will be [0001].

The address No. 104 is then executed to carry out a command RCO. This command resets the one of the output terminals of C-port which is prescribed by the content of the Y register. Since the performance of the operation LY of address No. 100 has resulted in the storage of A in the Y register, the output terminal A of C-port of MN-1400 is changed to "0" level at which the transistor TR7 is turned off, thus completing one cycle of battery checking operation.

After the command RCO from the address No. 104 has been carried out, a command TB from the address No. 105 is carried out. This command TB raises the data of the immediate field by "1" and then takes AND between the resultant immediate field data and the content of the accumulator. Since the data code is D1, the immediate data is the number 1. Therefore, the command TB operates on the least significant bit to raise it to 1, and this number in the form of [0001] is taken AND of with the content of the accumulator. In this step, the content of the accumulator is either [0000] or [0001], depending upon the battery voltage which was checked by the command INB from the address No. 103. When the AND result is "0", the command TB also serves to set a zero flag ZF. When not "0", the zero flag ZF is reset. Thus, the command TB when carried out sets the zero flag ZF to "1" for the higher battery voltage than the predetermined level, and resets it to "0" for the lower battery voltage than the predetermined level.

If the zero flag ZF was "1", a branch command from the next address No. 106 reads the next instruction from the address referred to by the data code. If the zero flag ZF was "0", the next address is executed. Since the data code at this time is 09, if the zero flag ZF was set to "1" as resulted by ths performance of the operation TB for the address No. 105, a command RET from the prescribed address No. 109 is carried out. If the zero flag ZF was "0", a command SP from the address No. 108 is carried out. When the battery voltage is higher than the predetermined level, therefore, the command RET from the address No. 109 terminates the sequence of the instructions of the battery check subroutine.

It is noted that the command SP from the address No. 108 when carried out sets a program status PS to "1", and therefore that when the battery voltage is lower than the predetermined level, the status PS is set to "1", and when the battery voltage is higher than the predetermined level, the status PS is "0".

Read Date Subroutine (RDATE)

Figures 2, 12:
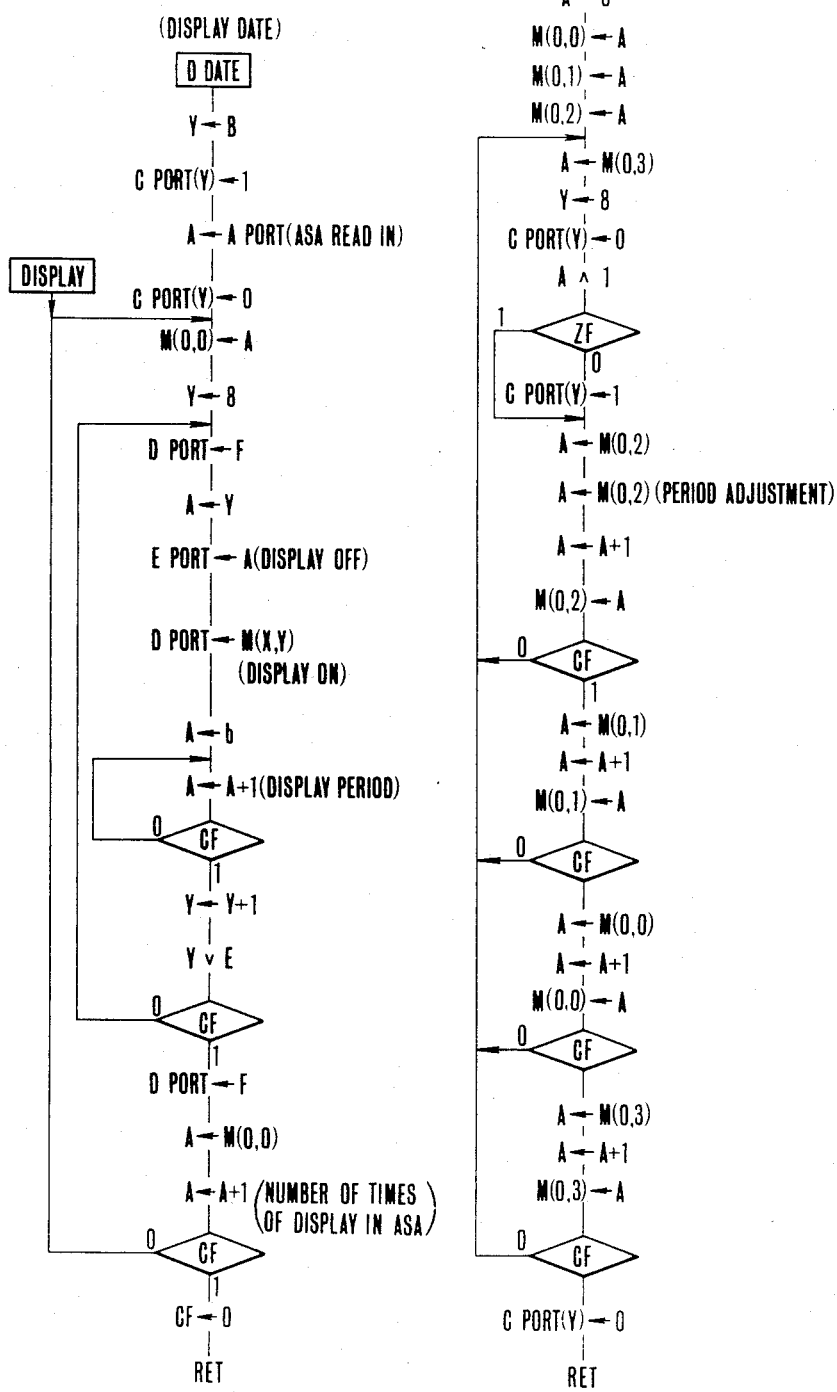
FIG. 12 is a micro flow chart showing a subroutine used in FIG. 11.

This subroutine is stored in addresses No. 10A to No. 141 (FIG. 21-10 to FIG. 21-12). The address No. 10A is first executed to carry out a command LY for, as has been mentioned above, loading the number n of the immediate field to the Y register. Since the data code from the address No. 10A is 63, the number 3 is loaded to the Y register. Then a command SCO from the address 10B is carried out in a similar manner to that described in connection with BCHECK subroutine to set the one of the outputs of C-port which is prescribed by the content of the Y register. Since the Y register now contains the number 3, the MN-1400 of FIG. 1 produces a "1" signal at the output terminal 3 of C-port thereof. Then, the addresses No. 10C and No. 10D are executed in sequence to carry out commands LY and SCO. Thus, a second "1" signal is produced at the output terminal 1 of C-port of the MN-1400.

After that, a command LY from the address 10E is carried out. Since the data code from this address is 65, the number 5 is loaded to the Y register. Then, a command L from the address No. 10F is carried out to load the number from the prescribed memory location by the contents of a X and the Y registers to the accumulator. Since the content of the Y register is 5, the memory location M5 is assigned to load its content to the accumulator. Then, a branch command BNZ from the address No. 110 is carried out. If the zero flag ZF was reset, there occurs a jump to the first of a sequence of instructions labelled RDATE2, so that the next instruction at the address No. 129 is carried out. If the zero flag ZF was set, the next consecutive address No. 112 is executed to determine what to do next depending upon the content of the memory location M5 which was moved to the accumulator. Now suppose that the content of the memory location M5 was [0000], that is, the number 0, then when the address No. 10F was executed, this number 0 was loaded to the accumulator, and the zero flag ZF was set. Then, a command LY from the address No. 112 is carried out to load the number 2 to the Y register and is followed by a command SCO from the next address No. 113 which when carried out causes the production of a third "1" signal at the output terminal 2 of C-port of MN-1400. In a similar manner to that described above, the sequential execution of the addresses No. 114 and No. 115 results in the production of a fourth "1" signal from the output terminal 0 of C-port of MN-1400. Thus, the four "1" signals have been produced at the respective output terminals 0, 1, 2 and 3 of C-port of MN-1400.

The next address No. 116 is then executed to carry out an output command OTIE for reading the number 4 from the immediate field to the E-port of MN-1400 with the result that a "1" signal is produced at the output terminal 4 of E-port. Responsive to this signal, the transistor switches TS5, TS6, TS7 and TS8 are selectively turned on so that the output terminals OUTDATA of the watch chip CLT are connected with the input terminals of B-port of MN-1400. Since, on the other hand, the output terminals 0, 1, 2 and 3 of C-port of MN-1400 are "1" level which also appear at the input control terminals MODE0 to MODE3 of the multiplexer of FIG. 2 respectively, then the input terminals I1-1 of the multi-plexer CMP are allocated to the output terminals DATAOUT, thereby the 4-bit counter D12 is selected to be read in the MN-1400, as will be understood from the table of FIG. 3. Since the counter D12 is adapted to hold the number in the (10) or second place of the number in year in binary coded decimal form, the performance of the command OTIE from the address No. 116 results in reading this number or the second significant digit of the number in year to the B-port of MN-1400. Then, the next address No. 117 is executed to carry out an input command INB for reading the number from the B-port to the accumulator. Then, a command LY from the address No. 118 is carried out to load D to the Y register, and is then followed by a command ST from the next address No.119. This command ST causes the number from the accumulator to be stored in the prescribed memory location by the contents of the X and Y registers. Since the Y register now contains the D, the prescribed memory location is found to be the MD of FIG. 8 where the most significant digit of the last two-figure number in year is thus stored.

The next address No. 11A is then executed to carry out a command LY for loading the number 1 to the Y register. Then a command RCO from the address No. 11B is carried out to reset the one of the output terminals of C-port which is prescribed by the content of the Y register. Since the Y register now contains the number 1, the "1" signal which as so far appeared at the output terminal 1 of C-port of MN-1400 disappears, while the other three "1" signals continue to appear at the output terminals 0, 2, and 3. Therefore, the binary conditions of the input terminals MODE0 to MODE3 of the multi-plexer CMP in the watch chip CLT (FIG. 2) are [1011] which implies the selection of the counter D11 to be read in according to the table of FIG. 3, as the four input terminals I1-2 are allocated to the output terminals DATAOUT. Then a load command LY from the next address No. 11C operates on the number corresponding to the C in base 16. Then an output command OTIE from the next address No. 11D is carried out to read the number 4 as an operand from the E-port, causing the transistor switches TS5 to TS8 to be turned on, and therefore causing the content of the D11 to be transferred to the B-port and MN-1400. Then, in a similar manner to that described in connection with the address No. 107 to No. 109, the content of the D11 is stored in the memory location MC by carrying out the commands INB and ST from the addresses No. 10E and No. 10F. Since the second-mentioned counter D11 holds the least significant digit of the number in year, the memory location MC stores the number in the (1) or first place of the number in year. Thus, the content of the "year" counter D12, D11 is stored in the memory location MD and MC.

After that the remaining addresses No. 120 to No. 127 are executed in sequence, so that all the output terminals 0 to 3 of C-port of MN-1400 are reset one by one each in a similar manner to that described in connection with the before-mentioned commands LY and RCO by carrying out commands LY0, RCO; LY2, RCO; LY1, RCO; and LY3, RCO. Then, a return command RET from the last address No. 128 when carried out causes the loop to return to the main routine, thus completing one cycle of date, in this instance, year, reading operation.

If the zero flag ZF was reset at the time of execution of the address No. 110, that is, if the content of the memory location M5 which had been transferred to the accumulator was other than [0000], or the number 0, the branch command from the address No. 110 reads the next instruction from the address No. 129 referred to by the operand RDATE2 from the same address. The command TB from the address No. 129 is to take AND between the content of the accumulator and the number of the immediate field. Since the number from the immediate field of the command TB is 1 or [0001], AND is taken between this [0001] and the content of the accumulator. Now suppose that the content of the accumulator was, for example, the number 1, namely [0001], the performance of operation TB results in the production of [0001]. Thus, the zero flag ZF remains in the reset state. After the resetting of the zero flag ZF has been told in such a manner, the next address No. 12A is executed to carry out a branch command BZ. If the zero flag ZF was in set state, this command Bz reads the next instruction from the address referred to by the operand RDATE3. If the zero flag ZF was in reset state, that command BZ causes the instruction at the address that follows the address No. 12A, in this instance, address No. 12C to be carried out. By this command LY2, the number 2 in base 16 as the operand is loaded to the Y register. Then a command SCO from the address No. 12D is carried out to set the one of the output terminals of C-port of MN-1400 which is prescribed by the content of the Y register. Since the Y register now contains the number 2, the output terminal 2 of C-port of MN-1400 is "1" level. Then a command OTIE4 from the address No. 12E is carried out to cause the production of a "1" signal at the output terminal 4 of E-port of MN-1400. Therefore, the transistor switches TS5 to TS8 are selected to be turned on so that the content of the output terminals DATAOUT of the watch chip CLT is made transferable to the input terminals of B-port of MN-1400. Then, an input command INB from the address No. 12F is carried out to read the number from the B-port into the accumulator.

It is noted here that as has been mentioned above, the performance of the operations 10A, 10B, 10C, 10D, 12C and 12D has resulted in producing the three "1" signals at the output terminals 1, 2 and 3 of C-port of MN-1400, and therefore that the binary conditions of the input terminals MODE0 to MODE3 of the multi-plexer CMP of FIG. 2 are found to be [0111] which implies the selection of the counter D10 for connection to the output terminals DATAOUT. Thus, the performance of the operation INB at the address No. 12F results in reading the number from the counter D10 into the accumulator, as the content of the counter D10 is applied through the transistor switches TS5 to TS8 to the B-port of the MN-1400. Since the counter D10 holds the number in the (10) or second place of the two-figure number in month, the number 0, or 1 is loaded to the accumulator.

A command LY, B from the address No. 130 is then carried out to load a digital value corresponding to the number B in base 16 as the operand to the Y register likewise as in the operation LY. Then, a command ST from the address No. 131 is carried out to store the number from the accumulator, that is, the (10)s-information of month in the memory at the prescribed memory location by the content of the Y register, that is, at the memory location MB of FIG. 8. After that, commands LY, 2 and RCO from the addresses No. 132 and No. 133 are carried out to load a digital value corresponding to the number 2 in base 16 to the Y register and to reset the output terminal 2 of C-port of MN-1400. Then, a command LY, A from the address No. 134 is carried out to load a digital value corresponding to the number A in base 16 to the Y register. Then, the next address 135 is executed to carry out a command JMP, RDATE1. This command JMP is a jump to the address referred to by the branch name RDATF1 described in the operand column, in this instance, address No. 1D, so that after the digital value corresponding to the number A in base 16 has been loaded to the Y register, a command OTIE, 4 from the address No. 11D is carried out. This command causes the selection of transistor switches TS5 to TS8 of FIG. 1. The next command INB when carried out causes the signal from the output terminals DATAOUT of the watch chip CLT to be applied through the switches TS5 to TS8 to the B-port of MN-1400. It is noted here that as has been described above, the MN-1400 produces "1" signals at the output terminals 1 and 3 of C-port thereof by the commands from the addresses No. 10A, No. 10B, No. 10C and No. 10D, and therefore that the input terminals MODE1 and MODE3 of the multi-plexer of FIG. 2 are fed with the "1" signals to select the counter D9 for connection with the output terminals DATAOUT. As a result, the command INB from the address reads the number from the counter D9 into the accumulator of MN-1400. Since the counter D9 holds the (1)s-place information of month, the least significant digit of the number in month is loaded to the accumulator. After that, a command ST from the address No. 11F is carried out to store the number from the accumulator in the prescribed memory location by the content of the Y register. Since, as has been mentioned above, the digital value corresponding to the number A in base 16 has been loaded to the Y register by the command LY, A from the address No. 134, the content of the accumulator, that is, the least significant digit of the number in month is stored in the memory location MA. After that, commands from the addresses No. 120 to No. 128 are carried out to reset the output terminals 0 to 3 of C-port of MN-1400, thus returning it to the main routine and completing the second cycle of date reading operation. It is to be understood that when the content of the memory location M5 is the number 1 in base 16, or [0001], the most and least significant digits of the number in month are stored in the memory locations MB and MA respectively.

If the data stored in the memory location M5 is the number 2 in base 16, or [0010], the command BNZ, RDATE2 from the address No. 110 reads the next instruction from the address No. 129, and the command TB, 1 is carried out. As has been mentioned above, AND is taken between the content [0010] of the accumulator which was transferred from the memory location M5 and [0001] to produce [0000], so that by the command BZ,RDATE3 from the address 12A, a command from the address referred to by the branch name RDATE3 described in the label column, in this instance, address No. 137 is caused to proceed. Therefore, when the content of the memory location M5 is the number 2, the commands from the addresses No. 10A to No. 110 are followed by those from the addresses No. 129 and No. 12A, and then by a sequence of commands from the addresses beginning with the address No. 137. Therefore, after the "1" signals are produced at the output terminals 1 and 3 of C-port of MN-1400 by the commands from the addresses No. 10A to No. 10D, commands LY, 0 and SCO from the addresses No. 137 and No. 138 are carried out to cause the production of a "1" signal from the output terminal 0 of C-port of MN-1400. Then, commands OTIE, 4 and INB from the addresses No. 139 and No. 13A are carried out to load the data from the output terminals DATAOUT of the watch chip CLT through the transistor switches TS5 to TS8 to the accumulator of MN-1400. It is noted here that as has been mentioned above, the output terminals 0, 1 and 3 of C-port of MN-1400 are "1" level, and therefore that responsive to the "1" signals at the input terminals MODE0, MODE1 and MODE3, the multiplexer of FIG. 2 selects the counter D8 for allocation to the output terminals DATAOUT according to the table of FIG. 3. Thus, the data from the register D8 is read into the accumulator. Since the counter D8 is adapted to hold the (10)-place information of day, the performance of the operation INB results in loading the number in the second place of the number in month to the accumulator. Then, commands LY, 9 and ST from the addresses No. 13B and No. 13C that follow are carried out. In a similar manner to that described in connection with the foregoing commands LY and ST, a digital value corresponding to the number 9 in base 16 is loaded to the Y register, and then the number from the accumulator is stored in the prescribed memory location by that number 9, that is, in the memory location M9 where the most significant digit of the two-figure number in day is stored. This is followed by the performance of commands LY, 1 and RCO from the addresses No. 13D and No. 13E to reset the output terminal 1 of C-port of MN-1400.

The address No. 13F is then executed to carry out a command LY, 8, causing a digital value corresponding to the number 8 in base 16 to be loaded to the Y register. Upon execution of the next address No. 140 to carry out a command JMP, RDATE1 there occurs a jump to the address 11D with which the sequence of instructions branch-named RDATE1 begins. The commands OTIE, 4 and INB read the data from the output terminals DATAOUT of the watch chip CLT in the accumulator of MN-1400. Since the performance of the commands from the addresses No. 10A, No. 10B, No. 137 and No. 138 has resulted in the production of the two "1" signals at the output terminals 0 and 3 of C-port, the multiplexer CMP of FIG. 2 responsive to these "1" signals at the input terminals MODE0 and MODE3 selects the counter D7 for allocation to the output terminals DATAOUT. The performance of the above described operations OTIE, 4 and INB results in reading the number from the counter D7 into the accumulator of MN-1400. Since the counter D7 holds the (1)-place information of day, the least significant digit of the number in day is read in the accumulator. Then, a command ST from the address No. 11F is carried out to store the number from the accumulator in the prescribed memory location by the number 8 loaded in the Y register, in this instance, M8. Thus, the most and least significant digits of the number in day are stored in the memory locations M9 and M8 respectively, as the number stored in the memory location M5 is 2 in base 16. After that, the addresses No. 120 to No. 128 are executed in sequence to reset all the output terminals 0 to 3 of C-port, thus returning the loop to the main routine, and completing the third cycle of data reading operation.

The foregoing description of the RDATE subroutine is valid when the date-time selection switch CHSW is ON. When this switch CHSW is OFF, it occurs that, instead of storing the numbers from the counters D12 and D11 in the memory locations MD and MC, the most and least significant digits of the number in hour from the counters D6 and D5 are stored in the memory locations MD and MC respectively, those of the number in minute from the counters D4 and D3 in the memory locations MB and MA respectively, and those of the number in second from the counter D2 and D1 in the memory locations M9 and M8 respectively.

Display Date Subroutine (DDATE)

This subroutine is stored in the Read Only Memory (ROM) of the MN-1400 at addresses No. 149 to No. 163 (FIGS. 21-13 to 21-14). A command LY, B from the address No. 149 is first carried out to load a digital value corresponding to the number B in base 16 to the Y register. Then, a command SCO from the address No. 14A is carried out in a similar manner to that described above to cause a "1" signal to be produced at the prescribed output terminal B of C-port of MN-1400 by the number B loaded in the Y register. Therefore, the switches S19 to S22 of FIG. 13 are selected for connection with the A-port of MN-1400. Since the binary conditions of the switches S19 to S22 are related to the value of film speed set therein, then when a command INA from the address No. 14B is carried out, the binary coded digital value from the A-port of MN-1400 is read into the accumulator. Then, a command RCO from the address No. 14C is carried out to reset the prescribed output terminal B of C-port by the Y register. Then, a command STD,0 from the address No. 14D is carried out to store the number from the accumulator in the memory location prescribed by the value of operand. Therefore, the film speed information is stored in the memory location M0 of FIG. 8.

The address No. 14E is then executed to carry out a command LY,8, so that a digital value corresponding to the number 8 in base 16 is loaded to the Y register. A command LI,F from the address No. 14F follows it so that a digital value corresponding to the number F in base 16 is loaded to the accumulator. Then, commands OTD and TYA from the addresses No. 150 and No. 151 are carried out to direct the number from the accumulator to the output terminals of D-port and the digital value corresponding to the number F in base 16 is output from D-port to transfer the number from the Y register to the accumulator. Since the content of Y register was 8, the number 8 in base 16 is transferred to the accumulator. Then, a command OTE from the address No. 152 is carried out to direct the number from the accumulator to the E-port so that a "1" signal is produced at the output terminal 8 of E-port of MN-1400 of FIG. 1. Since the output line of the terminal 8 of E-port is cut off from the decoder DC1 (FIG. 1), the decoder DC1 produces a "1" signal at the output terminal 1 thereof which is applied to the character-control input of the first display or read out device 7Seg1. Since, on the other hand, the digital signal corresponding to the number F in base 16 from the D-port functions as a 'blank' display control signal incapable of exciting any of the seven segments of the read out device so that the first device 7Seg1 presents nothing.

The address No. 153 is then executed to carry out a command OTMD for reading out the data of the prescribed memory location by the Y register through the D-port of MN-1400. Since, as has been mentioned above, the number 8 in base 16 was loaded in the Y register, the content of the memory location M8 is read out. Since the data representing the least significant digit of the number in day was stored in the memory location M8 by the above described RDATE subroutine, the first read out device Seg1 presents the display of the least significant digit of the number in day.

The address No. 154 is then executed to carry out a command LI,B for loading a number as one operand to the accumulator. In this instance, the number B in base 16 is loaded to the accumulator. Then, an add command AI,1 from the address No. 155 is carried out to add the number 1 as the other operand to the number B in the accumulator, leaving the result B+1=C in the accumulator. Then, a branch command BNC,DDATE2 from the address No. 156 is carried out. If the carry flag CF was reset, the next instruction at the address referred to by the branch name is to be carried out. If other than that, the next consecutive address is to be executed. Since the content of the accumulator was the number C as the result of performance of adding operation AI, no carry was produced so that the carry flag CF was reset. Therefore, the command BNC reads the instruction from the address whose label is given by the branch name in the operand column. In this instance, the address No. 155 labelled DDATE2 is executed again. Such procedure repeats itself until a carry is produced. Since the above described accumulator has four bits, after the content of the accumulator has attained the number F, or a binary word [1111], when the command AI,1 is carried out, the carry is now produced. In this step, therefore, the branch command BNC from the address No. 156 is followed by a command ICY from the address No. 158. It is to be understood that the instruction for the command ICY at the address No. 158 does not start out until the sequence of the instructions at the address No. 155 and No. 156 repeats five times. If so, since the command ICY is an increment command for adding unity to the content of the Y register, the number 8 of the Y register is incremented by one to the number 9 in base 16. Then, commands CY,E and BNZ,DDATE1 from the addresses No. 159 and No. 15A are carried out. The command CY serves to take exclusive OR, that is, comparison, between the content of the Y register and the number as the operand, and upon coincidence therebetween causes the zero flag ZF to be set. Therefore, the number 9 in the Y register is compared with the number E to permit the zero flag ZF to remain reset. Then, the next command BNZ reads the next instruction from the address No. 14F whose label is given by the branch name DDATE1 in the operand column, thus completing a first cycle of display operation for the first-place information of day, and starting out again the sequence of instructions beginning at the address No. 14F.

By the commands LI,F; OTD, the number F in base 16 is produced at the D-port of MN-1400 to cause stoppage of the first read out device 7Seg1 from further presentation of the least significant digit of the number in day. Then, by the next command TYA from the address No. 151, the data from the Y register is transferred to the accumulator. Since the number 9 in base 16 was stored in the Y register by the command ICY from the address No. 158 in the above described cycle of operation, the number now stored in the accumulator by the command TYA is 9. Then, by the command OTE from the address No. 152, the two "1" signals are produced at the output terminals 1 and 8 of E-port of MN-1400. The decoder DC1 emits signal "1" from the output terminals 2, and the second read out device 7Seg2 is selected to be driven. By the command OTMD from the address No. 153, the content of the prescribed memory location by the Y register is read out by the device 7Seg2. Since, as has been mentioned above, the Y register contains the number 9, the memory location M9 is read out by the command OTMD. Since the memory location M9 stores the most significant digit of the number in day during the above described RDATE subroutine, the second 7-segment device presents the display of the (10)-place information of day. Then, in a similar manner to that described in connection with the display of the (1)-place information of day, the remaining commands terminating at the address No. 157 are carried out during which the display of the (10)-place information continues to appear. Then, by the command ICY from the address No. 158, the content of the Y register is incremented by one to a number A. Then, the commands CY,E; BNZ,DDATE1 from the addresses No. 159 and No. 15A are again carried out to compare the number A in base 16 stored in the Y register with a number E in base 16. Then, the sequence of instructions beginning at the address No. 14F are carried out once more again.

After the presentation of the display of the number in day has been terminated, when the command OTE from the address No. 152 is carried out, the MN-1400 produces two "1" signals at the output terminals 8 and 2 of E-port thereof which are decoded by the decoder DC1 to produce a "1" signal at the output terminal 3 thereof, thus the third read out device 7Seg3 is driven. Then, when the command OTMD from the address No. 153 is carried out, the memory location MA is called for, so that the least significant digit of the number in month stored in the memory location MA is read out of the driven device 7Seg3. Then, the content of the Y register is incremented by one again to a number B in base 16, and the process beginning with the instruction at the address No. 14F repeats, thus completing a third cycle of display operation of the least significant digit of the number in month.

Since, at this time, the content of the Y register is B, when the commands OTE;OTMD from the addresses No. 152 and No. 153 are carried out, the MN-1400 produces three "1" signals at the output terminals 8, 2 and 1 and then the memory location MB is read out. Responsive to the "1" signals, the decoder DC1 produces a "1" signal at the output terminal 4 which is applied to the character control input of the fourth read out device 7Seg4, while the seven segments of the device 7Seg4 are selectively excited to display the most significant digit of the number in month. Then, unity is added to the content of the Y register with the resultant content being a number C in base 16, and the process beginning with the instruction at the address No. 14F repeats for the fifth time. Thus, the presentation of the display of the most significant digit of the number in month is terminated.

Since the Y register now contains the number C, when the commands OTE;OTMD from the addresses No. 152 and No. 153 are carried out, the decoder DC1 produces a "1" signal at the output terminal 5 which selects the fifth read out device 7Seg5 for display operation, while the memory location MC is read out to present the display of the least significant digit of the number in year. Then, unity is again added to the content of the Y register with the resultant content being a number D in base 16, and the process beginning with the instruction at the address No. 14F starts out again. Thus, the presentation of the display is terminated.

Since the Y register now contains the number D, when the command OTE;OTMD from the addresses No. 152 and No. 153 are carried out, the decoder DC1 produces a "1" signal at the output terminal 6 which selects the sixth read out device 7Seg6, while the memory location MD is read out to present the display of the second significant digit of the number in year. Then, the content of the Y register is incremented by one to a number E in base 16. Therefore, the zero flag ZF is set by the command CY,E;BNZ,DDATE1 from the addresses No. 159 and No. 15A that follow. Then, a command LI,F from the address No. 15C is carried out to load a number F in base 16 to the accumulator as has been mentioned above. By the command OTD from the next address No. 15D, the number F from the accumulator is caused to appear at the D-port of MN-1400 and therefore applied to the sixth read out device 7Seg6. As has been mentioned above, the number F in base 16 stands for "blank" display, thus the display of the second significant digit of the number in year is not longer presented. During the foregoing operation, the six read out devices 7Seg1 to 7Seg6 are serially selected to be driven, while simultaneously the data in the "dates" counters are serially displayed from the least significant digit of the number in day to the second significant digit of the number in year.

The address 15E is then executed to carry out a command LD,0 for loading the content of the prescribed memory location by the operand into the accumulator. Therefore, the content of the memory location M0 is loaded to the accumulator. Since the film speed information was stored in the memory location M0 by the command STD,0 from the address No. 14D, then when a command AI,1 from the address No. 15F is carried out, a number as the operand is added to a number corresponding to the film speed in the accumulator. Then, a command BNC,DISPLAY from the address No. 160 is carried out. Therefore, likewise the above described branch command, if a carry is produced to set the carry flag, the next address No. 162 is executed to carry out a command RC. If not, the sequence of the instructions beginning at the address No. 14D labelled by the branch name DISPLAY follows. Since the content of the accumulator now takes a value corresponding to the preset value of film speed, let us assume that the preset value of film speed is, for example, ASA400 for which the number F in base 16 was loaded in the accumulator, then when the command AI,1 from the address No. 15F is carried out, the carry is produced. Therefore, after the read out devices 7Seg1 to 7Seg6 have displayed the sequence of the data from day to year only once, a command RC from the address No. 162 is successively carried out. If not, the sequence of the instructions beginning at the address No. 14D labelled by the branch name DISPLAY repeats for the second time with the result that the data from the least significant digit of the number in day to the second significant digit of the number in year are displayed again. Therefore, the process for displaying the sequence of the data from day to year repeats a number of times depending upon the preset value of film speed until the carry is produced by the command from the address No. 15F. If the carry was produced, the command RC from the address No. 162 is carried out to reset the carry flag CF. Then, the next command RET from the address No. 163 is carried out, thus returning the loop to the main routine, and completing the DDATE subroutine. It will be appreciated that according to the DDATE subroutine, a number of cycles of serial presentation of the displays of the data from the least significant digit of the number in day, or second to the most significant digit of the last two-figure number in year, or hour are repeated depending upon the preset value of film speed.

Caution Subroutine (CAUTION)

This subroutine is stored in addresses No. 164 to No. 185 (FIGS. 21-14 and 21-15). This subroutine starts out first with a command LI,0 from the address No. 164 for loading a value of the operand into the accumulator as has been mentioned above. Therefore, the accumulator now contains the number 0. Then, three consecutive commands STD from the addresses No. 165 to No. 167 are carried out to store a number 0 from the accumulator in each of the memory locations M0, M1 and M2. Then, a command LD,3 from the address No. 168 is carried out to load the content of the prescribed memory location M3 by the operand into the accumulator. Now assuming that the content of the M3 is the number 0, the performance of the command from the address No. 168 results in the load of the number 0 to the accumulator. Then a command LY,8 from the address No. 169 is carried out to load the number 8 as the operand into the Y register, and is followed by a command RCO from the address No. 16A. Therefore, the output terminal of C-port prescribed by the Y register is reset to "0" level. Then, a command TB,1 from the address No. 16B is carried out to take AND between the content of the accumulator and the operand. If the result is "0", the zero flip-flop ZF is set. Since the content of the accumulator is now 0, and the operand of the instruction TB at the address No. 16B is 1, AND is taken between [0000] and [0001] to produce [0000], that is, a number 0. Therefore, the ZF is set, and a command BZ, CAUTION2 from the address No. 16C reads the next instruction from the address No. 16F referred to by the label CAUTION2. This command LD is a load command for loading the content of the prescribed memory location by the operand into the accumulator. Therefore, the content of the memory location M2, that is, the number 0 is loaded to the accumulator. Then, a load command from the address No. 170 is again carried out, and is followed by a command AI,1 from the address No. 171. This command is an add command causing a value of the operand to be added to the content of the accumulator. Therefore, the content of the accumulator, that is, the number 0 and the number 1 as the operand are added, leaving a number 1 in the accumulator. Then, a command STD,2 from the address No. 170 is carried out to store the number 1 from the accumulator in the memory location M2. Then, a command BNC,CAUTION1 from the address No. 173 is carried out. Likewise the above described branch command, if the carry flip-flop was 0, this command BNC causes a jump to the address No. 168 labelled CAUTION1, and at the same time, since the content of the accumulator is 1, after the execution of the address No. 173, the command from the address No. 168 is carried out again. Therefore, the process beginning with the instruction at the address No. 168 and terminating at the instruction at the address No. 173 repeats a number of times until the performance of the command BNC,CAUTION1 from the address No. 173 results in the detection of 1 in the carry flip-flop. As has been mentioned above, since unity was added to the content of the accumulator by the commands LD,2; AI,1; STD,2 from the addresses No. 170 to No. 172, when the number of repetition of the above described process has reached fifteen, the content of the accumulator becomes equal to the number F in base 16. Then, when this process is repeated once more, the carry flip-flop CF is set to "1". After the sequence of the instruction at the addresses No. 168 to No. 173 has been repeated 16 times, a command LD,1 from the address No. 175 is carried out to load the content of the memory M1 into the accumulator. Since the number stored in the memory location M1 by the command from the address No. 166 is 0, the accumulator now contains the number 0. Then, commands AI,1; STD,1; BNC,CAUTION1 from the addresses No. 176 to No. 178 are carried out to add unity to the content of the accumulator, store the number from the accumulator in the memory location M1, make a check whether the carry flip-flop CF is in 1 condition, and, if not, execute the address referred to by the label CAUTION1. Since the content of the accumulator is now 0, the CF is in 0 condition, the command from the address No. 178 is followed by the command from the address No. 168 labelled CAUTION1 again. Thus, the sequence of the instructions at the addresses No. 168 to No. 170 is repeated until the performance of the command BNC,CAUTION1 from the address No. 173 results in the setting of the carry flip-flop to 1. If the carry flip-flop CF is set to "1", the commands from the addresses No. 175 to No. 178 are carried out again. Therefore, the commands LD,1; AI,1; STD,1; BNC,CAUTION1 are carried out again. If the performance of the command BNC from the address No. 178 does not result in the detection of the setting of the carry flip-flop to 1, the sequence of the instruction at the addresses No. 168 to No. 178 is repeated until the CF is set to 1. After the sequence of the instructions at the addresses No. 168 to No. 178 has been repeated to detect 1 of the CF, commands LD,0; AI,1; STD,0; BNC,CAUTION1 from the addresses No. 17A to No. 17D are carried out to load the number, or 1 from the memory location M0 to the accumulator, and unity to the content of the accumulator, store the added number from the accumulator in the memory location M0, make a check whether the carry flip-flop is in 1 condition, and if not, execute the address No. 168 labelled CAUTION1 again. Therefore, the sequence of the instructions at the addresses No. 168 to No. 17D is repeated until the setting of the flip-flop CF to 1 is detected by the command BNC for the address No. 17D. When the 1 of the CF is detected by the command BNC from the address No. 17D, a command LD,3 from the address No. 17F is carried out to load the content of the memory M3 into the accumulator. Now assuming that the number stored in the memory location M3 is 0, the number 0 is transferred to the accumulator. Then, the next command AI,1 from the address No. 180 is carried out to add unity to the accumulator, leaving the number 1 in the accumulator. By a command from the address No. 181, the content of the accumulator is transferred to the memory location M3. Then, a command BNC,CAUTION1 from the address No. 182 is carried out to check the condition of the carry flip-flop. Since, as has been mentioned above, the number loaded in the accumulator by the command from the address No. 180 is 1, the carry flip-flop CF is in 0 condition, the command from the address No. 182 causes the command from the address No. 168 to be carried out again. It is noted that it takes about 0.5 second to perform the sequence of the instructions at the addresses No. 168 to No. 182. After the period of 0.5 second has passed, the sequence of the instructions from the address No. 168 to the address No. 182 repeats for the second time. Since, in this stage, the content of the memory location M3 is 1, the performance of the command TB,1 from the address No. 16B results in resetting the zero flip-flop ZF. Then, a command BZ,CAUTION2 from the address 16C makes a check to determine whether the ZF is in reset state. Therefore, when the content of the memory location M3 was 1, a command SCO from the address 16E is carried out and then followed by a sequence of instructions beginning at the address No. 16F. The command SCO from the address No. 16E causes the prescribed output terminal of C-port by the Y register to be set. Since the number 8 was loaded into the Y register by the command LY,8 from the address No. 169, the MN-1400 of FIG. 1 is caused by that command SCO to produce a "1" signal at the output terminal 8 of C-port thereof, which actuates the transistor TR3 for conduction, thereby the oscillator plate WSG is rendered operative to generate warning sound. After the start of production of warning sound, the sequence of the instructions beginning at the address No. 16F are carried out. When the period of 0.5 second defined by the sequence of the instructions from the address No. 168 to the address No. 182 has passed, the instruction at the address No. 168 is again executed. During this second period, the number stored in the memory location M3 by the commands from the addresses No. 17F to No. 181 was 2 so that the zero flip-flop ZF was set by the command TB,1 from the address No. 16B. Therefore, by the command BZ from the address No. 16C, the instructions at the addresses labelled CAUTION2 are executed. Thus, the performance of the sequence of the instructions at the addresses No. 168 to No. 182 after the termination of duration of 0.5 second during which the oscillation plate continued to operate results in producing no warning sound. It is to be understood that according to the CAUTION subroutine, the oscillation plate WSG is caused to intermittently operate in a time interval of 0.5 second. Then, when 8 cycles of warning operation have been performed, that is, when the sequence of the instructions at the addresses No. 168 to No. 182 has repeated 16 times, the number stored in the memory location M3 reaches 16. Therefore, the performance of the command from the address No. 180 results in setting the carry flip-flop CF. This is read in by the command BNC from the address No. 182. Therefore, when the eight warning sound signals have been produced successively in 8 seconds, a command RCO from the address No. 184 is carried out to cause the production of "0" at the output terminal 8 of C-port of the MN-1400, thus completing the caution subroutine. Upon execution of the next instruction RET at the address No. 185, the loop is returned to the main routine.

Memory Clear Subroutine (MEMORYCLEAR)

This subroutine is stored in the addresses No. 142 to No. 148 (FIGS. 21-12 and 21-13). This subroutine starts out with first execution of the address No. 142 to carry out a command LY,0 causing load of 0 to the Y register. Then a command LY,0 from the address No. 143 is carried out to cause a number given in the operand column to be loaded to a X register. Therefore, 0 is loaded to the X register. Then a command RM from the address No. 144 is carried out to reset the prescribed memory location by the X and Y registers, in this instance, M0. Then, a command ICY from the address No. 145 is carried out to add unity to the content of the Y register with the resultant content of the Y register being 1. By this command, it is also resulted that if the content of the Y register is 0, the ZF is set, and that if other than 0, it is reset. Therefore, the next command BNZ,MC1 causes the instruction at the address No. 144 labelled MC1 to be carried out again. Since, as has been mentioned above, the Y register was incremented by one to the number 1 during the operation whose code ICY resides in the address No. 145, the memory location M1 is reset. Such procedure repeats itself until the set condition of the ZF is checked by the command from the address No. 146. Therefore, each time one memory location is reset, unity is added to the content of the Y register. Thus, the memory locations M0 to MF are reset in sequence. After the memory location MF has been reset, the next command ICY causes the content of the Y register to be returned from the number F to 0, at which the ZF is set. Upon check of the set condition of the ZF by the next command BNZ, a command RET from the address No. 148 is carried out to return the loop to the main routine, thus completing the clear subroutine.

The operation of the camera of the invention will be next explained with respect to the various modes.

(1) Ordinary Mode

The operator will first turn on the main switch MS of FIG. 1, thereby the central processing unit (CPU) of the micro-processor MN-1400 is supplied with the voltage +EC from the battery E, and is automatically cleared up to reset the instruction counter and to execute the address No. 000 labelled START (FIG. 21-1) written in the ROM. A command RC from the address No. 000 when carried out resets the carry flip-flop CF and is then followed by the next command RP to reset the program status PS. Then a command CCO from the address No. 2 is carried out to reset all the output terminals of C-port of MN-1400, thereby a 0 signal is produced at each of the output terminals 0 to B of C-port. Thus, the initialization of the CPU is effected by the commands from the addresses 0 to 2. Then, a command LI,F from the address No. 3 is carried out to load the number F in base 16 to the accumulator. Then, the next command OTD causes the appearance of the content of the accumulator at the D-port of MN-1400. Thus, a digital signal corresponding to the number F in base 16 is applied from the D-port to the read out devices 7Seg1 to 7Seg6. However, since the digital signal corresponding to the number F in base 16 functions as the 'blank' signal, all the devices 7Seg1 to 7Seg6 remain idle.

A command CAL,MC from the address No. 5 is then carried out to call for the above described memory clear subroutine stored in the address beginning with the address No. 142 labelled MC. Thus, the memory locations M0 to M9 and MA to MF are all reset and the loop is returned to the main routine.

A command CAL,BCHECK from the address No. 7 is then carried out to call for the battery check subroutine at the addresses No. 100 to No. 109 labelled BCHECK. When the actual voltage of the battery E is higher than the satisfactory operating level, the status PS becomes 0. When it is lower than that level, the PS is set to 1.

After a check has been made to determine whether the PS is in 1 condition in such a manner, if so, a command BP from the address No. 9 reads the next instruction at the address labelled WARN. If not, the next address is executed.

Now assuming that the battery voltage is lower than the predetermined level, then a command LI,A from the address No. 52 is carried out to load the number A in base 16 to the accumulator. Then, this number from the accumulator is stored in the memory location M3 by a command STD,3 from the address No. 53. Then, a command CAL,CAUTION from the address No. 54 is carried out to call for the above described caution subroutine at the addresses beginning with the address No. 164 labelled CAUTION. Thus, the oscillation plate WSG is intermittently actuated with the period of 0.5 second to produce warning sound informing the operator of the fact that the battery E must be replaced by new one. It should be noted that since the number A had been stored in the memory location M3 during the operations whose codes reside in the addresses No. 52 and No. 53 before the caution subroutine was called for, when the sequence of the instructions at the addresses No. 168 to No. 182 was repeated 6 times, the 1 condition of the CF is checked by the command BNC from the address No. 182, and the loop is returned to the main routine. In other words, three cycles of warning operation are performed in three seconds. Then, a command JMP,START from the address No. 56 of the main routine is carried out so that there occurs a jump to the address referred to by the label unconditionally. Thus, the address No. 000 labelled START is executed again to start a second cycle of caution subroutine calling operation.

Alternatey assuming that the battery voltage is higher than the predetermined level, the command BP,WARN from the address No. 9 is followed by a command CAL,MC from the address No. B to call for the above described memory clear subroutine. After the all memory locations have been cleared up, a command LY from the address No. D is carried out to load the number 5 in base 16 into the Y register. Then the number 2 is loaded into the accumulator by the next command LI,2. Then, a command ST from the address No. F is carried out to store the number 2 from the accumulator in the prescribed memory location M5 by the Y register. Then a command CCO from the address No. 10 is carried out to reset all the output terminals of C-port of MN-1400. Then the number 6 in base 16 is loaded to the Y register by a command LY,6 from the address No. 11. The next command OTIE,2 from the address No. 12 causes the number given in the operand column to be produced at the E-port of MN-1400, and therefore causes the production of a "1" signal at the output terminal 2 of E-port of MN-1400. Then, a command INA from the address is carried out to read the binary conditions of the switches S7 to S10 (FIG. 13) from the A-port in the accumulator. During an operation whose code TB,8 resides in the next address No. 014, if the switch S10 was ON, the zero flip-flop ZF is reset. If OFF, it is set. Therefore, if ON, the data read in the accumulator was [1, (0 or 1), (0 or 1), (0 or 1)], so that upon performance of the operation TB,8, AND is taken with [1000] to produce "1" at which the ZF is reset. Since this switch S10 cooperates with the set switch SET SW, when the SET switch is depressed, the ZF is reset. Then, a command BZ,DT4 from the address No. 015 is carried out so that if the SET switch is ON, the next address is executed. If OFF, an address referred to by the operand labelled DT4.

Now assuming that the SET switch is OFF, then a command TB,4 from the address No. 58 referred to by the operand DT4 mentioned above is carried out to take AND between the number 4 and the content of the accumulator, causing the result to control the resetting and setting operation of the ZF. Thus, if the switch S9 was ON, the ZF is reset. If OFF, the ZF is set. Since this switch S9 cooperates with the READ switch READ SW, when the READ switch was ON, the ZF is reset. Then, a command BZ,ST2 from the address No. 59 is carried out so that if the ZF was set, an address referred to by the operand labelled ST2 is carried out. If the ZF was reset, the next address No. 5B is executed.

Assuming again that the READ switch is OFF, then the address No. 2D labelled ST2 is executed to carry out a command OTIE,8 so that "1" is produced at the output terminal 8 of E-port of MN-1400. By the next command INA from the address No. 2E, the data from the A-port is read into the accumulator. Since as has been mentioned above the output terminal 8 of E-port is "1" level, the switches S15 to S18 are selected with their binary conditions read in the accumulator. Then, a command TB,8 from the address No. 2F is carried out to determine which of the setting and resetting positions the ZF is to take depending upon the ON and OFF conditions of the switch S18. If the switch S18 was ON, the ZF is reset. Since this switch S18 is an AF switch, when the AF switch was ON, the ZF is reset. Then, the next address 30 is executed to carry out a command BZ,ST3 for making a check to determine whether the ZF is set. If so, an address referred to by the operand labelled ST3 is executed. If not, the next address No. 32 is executed to carry out a comand TAY.

Assuming again that the AF switch S18 is OFF, then a command OTIE,2 from the address No. 75 labelled ST3 is carried out to cause the MN-1400 to produce "1" level at the output terminal 2 of E-port thereof at which the switches S7 to S10 are selected to provide information. By the next command INA from the address No. 76, the information from the switches S7 to S10 is read in the accumulator. Then, a command TB,1 from the address No. 77 is carried out either to reset the ZF when the switch S7 is ON, or to set it when OFF. Since this switch S7 is to be ON by the first stroke of depression of the shutter button, when the release to the first stroke was not yet actuated, the ZF is set, causing the next command BZ,ST1 from the address No. 78 to be followed by a command from an address referred to by the operand ST1. When the release has been actuated to the first stroke, the next address No. 7A is executed to carry out a command CC0.

Assuming again that the release button remains untouched, then the address referred to by the operand ST1, that is, address No. 10 is executed again. Therefore, so long as the release button is left unacted, the thus described process repeats.

At a time during the course of repetition of the process when the release button is depressed to the first stroke, the switch S7 is turned on so that the command from the address No. 78 is followed by the command CC0 from the address No. 7A to reset all the output terminals of C-port of MN-1400. Then, command LY,6 from the address No. 7B is carried out to load the number 6 to the Y register. By the next command SC0 from the address No. 7C, therefore, at the prescribed output terminal 6 of C-port of MN-1400 by the Y register there is produced "1" by which the transistor TR5 of FIG. 1 is turned on which then turns on the transistor TR4 to feed the light measuring circuit LMC with electrical power from the battery E. Thus, the circuit LMC is rendered operative to start a first cycle of light measuring operation.

A command OTIE,1 from the address No. 7D is then carried out to cause the production of "1" at the output terminal 1 of E-port of MN-1400 at which the transistor switches TS0 to TS3 are selected to provide information. By the next command INB from the address No. 7E, the information from the B-port of MN-1400 is read into the accumulator. Since the base of the transistor switch TS0 is connected to the low brightness responsive output terminal LLT of the light measuring circuit LMC, when the object brightness is lower than the lower limit of the dynamic range of exposure control, the output terminal LLT is "1" level at which the switch TS0 is rendered conducting. Thus, the information read in the accumulator is [0001]. Then, a command TB,1 from the address No. 7F is carried out to take AND between the content of the accumulator, in this instance, [0001] and a number as the operand, in this instance, [0001]. Therefore, the ZF is reset. Then, a command BZ,ST9 from the address No. 80 is followed by a command LI,B from the address No. 82 to load a number B in base 16 into the accumulator. Then, a command Ly,8 from the address No. 83 is carried out to load 8 into the Y register. Then a command STIC from the address No. 84 is carried out to store the number from the accumulator in the prescribed memory location by the Y register, in this instance, M8, and to increment the Y register by one with the resultant content of the Y register being 9. Since the setting of the ZF is controlled by the attainment of the content of the Y register to 0, the ZF remains reset as yet. Then a command CY,E from the address No. 85 is carried out to compare the content of the Y register with a number as the operand upon coincidence therebetween to set the ZF, while the content of the Y register is not destroyed by the result of comparison. Thus, the number 9 is compared with the number E and, therefore, the ZF continues to be reset. By the next command BNZ,ST7 from the address No. 86, the instruction at the address No. 84 referred to by the operand ST7 is again executed, and the process repeats until the fact that the ZF is set is checked by the command from the address No. 86.

As the sequence of the instructions at the addresses No. 84 to No. 86 is recycled a number of times, when the content B of the accumulator is stored in the memory location MD, and the content of the Y register becomes E, the performance of the command CY,E from the address No. 85 sets the ZF. Therefore, the next command BNZ from the address No. 86 is followed by a command CAL, DISPLAY from the address No. 88 to call for the sequence of the instructions beginning at the address No. 14D labelled DISPLAY in the display date (DDATE) subroutine. As has been described in greater detail in connection with the DDATE subroutine, each of the contents of the memory locations M8 to MD, that is, the number B in base 16, is applied to the respective one of the read out devices 7Seg1 to 7Seg6, thereby a symbol corresponding to the number B in base 16 is displayed. This symbol can be represented in the form of " ⊐ " by exciting the three of the display segments of each device 7Seg. After the display subroutine has been completed, a command JMP,ST from the address 8A is carried out so that the sequence of the instructions beginning at the address No. B referred to by the label ST repeats. Thus, the detection of the out-of-range low brightness is indicated by the six identical symbols " ⊐ " by the display devices 7Seg1 to 7Seg6, and the presentation of display is recycled a number of times.

When the object brightness exceeds the upper limit of the dynamic range of exposure control, the light measuring circuit LMC produces a "1" output at the terminal HLT at which the transistor switch TS1 is turned on. Upon performance of the commands from the addresses No. 7D and No. 7E, therefore, the data [0010] is read into the accumulator. By the commands TB,1; BZ,ST9 from the addreses No. 7F and No. 80, the address No. 8C labelled ST9 is executed to carry out a command TB,2 for resetting the ZF. Then, a command BZ,ST11 from the address No. 8D is carried out to make a check of the resetting of the ZF. Then, a command LI,C from the address No. 8F is carried out to load the number C in base 16 into the accumulator. Then, by a command JMP,ST6 from the address No. 90, the sequence of the instructions at the addresses beginning with the address No. 83 labelled ST6 are carried out, thereby the number C is stored in each of the memory locations M8 to MD. Thus, a symbol " ⌊⌋ " corresponding to the number C in base 16 is represented by each of the display devices 7Seg1 to 7Seg6 according to the display subroutine. It is to be understood that when the brightness level is extremely low, or high, the programmed loop does not proceed farther from this step despite the shutter release actuation even to the second stroke.

Assuming that the object brightness lies within the dynamic range of exposure control, neighther the output terminal LLT, nor HLT of the light measuring circuit LMC takes "1" level, permitting the programmed loop to advance to the next sequence of instructions. In more detail, since the data stored in the accumulator by the commands from the addresses No. 7D and No. 7E was neither [0001], nor [0010], the ZF was not reset by the commands TB,1; TB,2 from the addresses No. 7F and No. 8C, and the setting of the ZF was checked by the command BZ from the addresses No. 80 and No. 8D. Therefore, the advance is made to the address No. 92 referred to by the operand ST11 in the address No. 8D.

A command OTIE,2 from the address No. 92 when carried out causes the MN-1400 to produce a "1" signal at the output terminal 2 of E-port at which the switches S7 to S10 are selected to provide information. When the switch S8 is ON, that is, when the release button is depressed to the second stroke, the content of the accumulator now is [(0 or 1)(0 or 1)11]. It is noted here that when the switch S8 remains OFF, the content of the accumulator is [(0 or 1)(0 or 1)01]. Then, a command BZ,ST3 from the address No. 95 is carried out to make a check to determine whether the ZF is set. If so, the process beginning with the instruction at the address No. 75 repeats. If not, as the second stroke has been effected, the next address No. 97 is executed to carry out a command OTIE,1, causing the MN-1400 to produce a "1" signal at the output terminal 1 of E-port at which the switches S0 to S3 are selected to provide information.

When the S3 is ON, or when a flash exposure is to be made, the information to be read-in to the accumulator is [1(0 or 1)(0 or 1)(0 or 1)]. Upon performance of the next command TB,8 from the address No. 99 followed by a command BZ,ST14 from the address No. 9A, therefore, the next address No. 9C is executed to carry out a command OTIE,8. When the switch S3 is OFF, the commands from the addresses No. 99 and No. 9A reads the next instruction at the address referred to by the operand ST14, that is, address No. A1 to carry out a command OTIE,1. Now assuming that the STROB0 switch S3 is OFF, then the command OTIE,1 from the address A1 is carried out to cause the production of a "1" signal at the output terminal 1 of E-port of MN-1400 at which the switches S0 to S3 are selected to provide information.

When the self-timer switch S1 is ON, the information to be read-in to the accumulator by the next command INA from the address No. A2 is [(0 or 1)(0 or 1)1(0 or 1)]. By the next command TB,2 from the address No. A3 followed by a command BZ,ST16 from the address No. A4, the ZF is reset, and this reset condition when checked causes the address No. 6A to be executed. With the camera set in self-timer mode, therefore, as the switch S1 is ON, a command LI,0 from the address No. A6 is carried out to load a number 0 into the accumulator. By the next command STD,3, the number 0 from the accumulator is stored in the memory location M3. After that, a command CAL,CAUTION from the address No. A8 is carried out. Thus, according to the above described caution subroutine, eight cycles of oscillation (WSG) operation are performed in a time interval of 0.5 second.

After eight seconds have passed, a command LY,4 from an address No. AA is carried out to load a number 4 into the Y register. Then, a command SCO from an address No. AB is carried out to cause the production of "1" signal at the output terminal 4 of C-port of MN-1400 which is then applied to the inverter IC10 whose output is "0" applied to the base of the transistor TR16, thereby the transistor TR16 is turned off to initiate an operation of the timing circuit SCC. At this time, the one-shot circuit ON1 is also actuated to energize the electromagnet Mg1. As the lever LB1 of FIG. 15 is driven to turn in the counterclockwise direction, releasing the front shutter blade FPS1 from the latching connection with the pin LBPL, the front blade FPS1 runs down, while the size of opening of the aperture defined by the orifices EA1 and EA2 is being increased from zero. It is noticed that when the self-timer switch S1 is OFF, the ZF is set by the command TB,2 from the address No. A3, and, therefore, the command BZ,ST16 from the address No. A4 reads the next instruction at the address referred to by the operand ST16, that is, address No. AA. Thus, the shutter starts to run down in synchronism with the release actuation to the second stroke, and the timing circuit SCC starts to operate simultaneously.

After the initiation of an exposure, a command OTIE,1 from an address No. AC is carried out to cause the production of a "1" signal at the output terminal 1 of E-port of MN-1400 at which the transistor switches TS0 to TS3 are selected to provide information which is to be read-in to the accumulator by the next command INB from the address AD. If the transistor switch TS3 is ON, the information is [1(0 or 1) (0 or 1)(0 or 1)] so that the ZF is reset by the next command TB,8. The reset condition is checked by a command BZ,ST20 from an address No. AF to execute the next address B1. If the switch TS3 is OFF, an address EC referred to by the operand labelled ST20. Since the switch ST3 is connected to the exposure termination responsive output terminal EXTT1 of the timing circuit SCC of FIG. 14, during the time when the exposure is under progress, no "1" output appears at the terminal EXTT1. Therefore, the switch ST3 remains OFF until the duration of the exposure time is terminated.

At the initiation of a taking of exposure, a command LY,5 from an address No. EC labelled ST20 is carried out to load a number 5 into the Y register. Then, the next command LI,0 from an address No. ED is carried out to load a number 0 into the accumulator. Therefore, the number from the accumulator is stored in the memory location M5 when the next command ST is carried out. After that, a command CAL,RDATE from the address No. EF is carried out to call for the above described read date subroutine. Thus, the time-data representing the most significant digit either of the last-two-figure number in year, or of the number in hour is stored in the memory location MD, and the one representing the least significant digit thereof in the memory location MC.

A sequence of instructions at addresses No. F1 to No. F4 are then executed to carry out comments LY,5; LI,1; ST; and CAL,RDATE, so that, since the number stored at this time in the memory location M5 is 1, either the month or the minute data is to be read out as the most and least significant digits are stored in the memory locations MB and MA respectively.

A sequence of instructions at addresses No. F6 to No. F9 are then executed to carry out commands LY,5 ; LI,2; ST; CAL,RDATE so that since the number stored in the memory location M5 is 2, either the day or the second data is to be read out as the most and least significant digits are stored in the memory locations M9 and M8 respectively. Thus, one cycle of data storing operation is completed by the instructions at the addresses No. EC to No. F9.

A command JMP,ST17 from an address No. FB is then carried out to repeat the process beginning with the instruction at the address No. AC. During the second cycle of reading operation, the new data are moved to the memory locations M8, M9 and MA to MD, destroying the data previously stored there. Such procedure repeats itself until the transistor switch TS3 is turned on.

When a proper exposure has been derived, the timing circuit SCC produces a "1" output at the terminal EXTT1 at which the switch ST3 is turned on, causing the address No. B1 to be executed. On the other hand, the output at the other terminal EXTT2 is changed to "0" simultaneously so that the electromagnet Mg2 is de-energized to initiate a closing operation of the shutter, as the lever LB2 is turned in the counterclockwise direction to disengage the pin LBP2 from the rear shutter blade, and the shutter blade is driven by the spring SSP2 to run down to the aperture closed position.

By the command OTIE,1 from the address No. B1, the MN-1400 is caused to produce "1" at the output terminal 1 of E-port at which the switches S0 to S3 are selected to provide information which is to be read-in to the accumulator by the next command INA from the address No. B2. If the STROB0 switch S3 is ON, the information in the accumulator is [1(0 or 1)(0 or 1)(0 or 1)], causing the ZF to be reset by the next command TB,8 from the address No. B3. Upon checking of the reset condition of the ZF, the command BZ,ST21 from the address No. B4 is followed by the command from the address No. B6. If the STROB0 switch S3 is OFF, a command CAL,BCHECK from an address No. B8 is carried out so that the above described battery check subroutine is performed. When the battery voltage is higher than the predetermined level, the status PS becomes "0", and when it is lower than the predetermined level, the status is set to "1". Then, the next command BP, WARN from the address No. BA makes a check to determine whether the PS is set to "1". If so, that is, when the battery voltage is lower than the predetermined level, the sequence of the instructions beginning at the address No. 52 labelled WARN are carried out as has been mentioned above to produce warning sound in a time interval of 0.5 seconds. If not, that is, when the battery voltage is sufficiently high, an address No. BC is executed by the command BP,WARN from the address No. BA to carry out a command OTIE,1, causing the MN-1400 to produce "1" at the output terminal 1 of E-port, at which the switch TS0 to TS3 are selected to provide information which is to be read-in to the accumulator by the next command INB from the address No. BD.

When the closing operation of the shutter is normal, the switch TS2 is in ON state where the information takes [(0 or 1)1(0 or 1)(0 or 1)], causing the ZF to be reset by a command RCO from the address No. BE followed by a command TB,4 from an address No. BF. Then, a command BZ,WARN from an address No. C0 is carried out to execute a sequence of instructions beginning at an address No. C2. In more detail, since the switch TS2 is connected to the output of the comparator IC11 of FIG. 1, when the comparator IC11 produces "1" output, the switch TS2 is turned on. When it produces "0" output, the TS2 is turned off. Again, when the magnetic winding Mg2 is deenergized and the iron armature constituting part of the lever LB2 is moved away from the magnetic winding M2, a hump-like wave-form resulting from the change in magnetic flux is induced for about 2 milliseconds in the magnetic winding. Therefore, a positive-going pulse ascribable to this hump-like wave-form appears at the output terminal of the comparator IC11. When the release of the closing shutter blade from the latching connection has been detected, the output of the comparator IC11 is changed to "1" at which the switch TS2 is turned on. After it has been proven that the film was correctly exposed, the performance of the aforesaid commands from the addresses No. BC to No. C0 results in the execution of the address No. C2. If the shutter is accidentally left open by some unknown cause, the address No. 52 is executed with the result that warning sound is produced by the oscillation plate WSG.

Assuming that the normal operation of the shutter has been performed, then a command OTIE,1 from the address No. C2 is carried out to cause the production of "1" at the output terminal 1 of E-port of MN-1400. By the next command INA from the address No. C3, the switches S0 to S3 are read-in to the accumulator. If the data printing control switch S0 is ON, the content of the accumulator now is [(0 or 1)(0 or 1) (0 or 1)1]. At this time, therefore, upon performance of the command TB,1 from an address No. C4, the ZF is reset. Then, the next command BZ,ST25 from the address C5 reads the instruction at an address No. C7 so that the display date subroutine is called for. Thus, the time-data stored in the memory locations M8, M9 and MA to MD by the above described RDATE subroutine are read out by the display devices 7Seg1 to 7Seg6 and printed out on the film by the optical system of FIG. 19. In more detail, when the closing shutter blade arrives at the terminal end of movement, a mirror DPM is brought to establish the optical system along with the lenses ln1 and ln2 and the prism PlS by which light from the dislay device assembly DSP is focused on the film Fl1 in the marginal portion thereof where the numbers either in year, month and day, or in hour, minute and second, are printed out. In the latter connection, it should be noted that the data storing operation had been repeated just before the exposure was terminated, the thus printed data are the latest ones for that picture frame exposure.

It is noted again that the period of energization of the display devices 7Seg1 to 7Seg6 is adjusted in accordance with the sensitivity of the used film so that the time-data are recorded in correct exposure. After the data printing operation has been performed, an address No. C9 is executed successively. The foregoing process has been described in respect to the switch S0 when ON. If the switch S0 is OFF, the performance of the command C4 results in setting the ZF. By the command BZ,ST25 from the address No. C5, therefore, the address No. C9 is executed. Thus, the data printing operation occurs only when the data printing control switch is set in ON state. Or otherwise, the termination of the exposure is followed by the transportation of the film.

A command LY,9 from the address No. C9 when carried out causes the number 9 to be loaded into the Y register. By the next command SCO from an address No. CA, the MN-1400 is caused to produce "1" at the output terminal 9 of C-port at which the transistors TR1 and TR2 are turned on to energize the electric motor M. Motion of the motor M is transmitted to the film winding mechanism (not shown) by which the film is advanced through the length of one frame, and the shutter mechanism is cocked. During this operation, a sequence of instructions at addresses No. CB to No. CE are executed, and the process repeats. In more detail, at the start of film transportation, a command OTIE,4 from the address No. CB is carried out to cause the production of "1" at the output terminal 4 of E-port at which the switches S11 to S14 are selected to provide information which is to be read-in to the accumulator by the next command INA from the address No. CC. If the switch S11 is ON, the information read-in to the accumulator is [(0 or 1)(0 or 1)(0 or 1)1], causing the ZF to be reset by the next command TB,1 from the address No. CD. Thus, an instruction at an address No. D0 is assigned by the command BZ,ST25 from the address No. CE. If the switch S11 is OFF, the sequence of the instructions at the addresses No. C9 to No. CE labelled ST25 is recycled until the switch S11 becomes ON. Since the switch S11 is arranged adjacent the shutter opening blade FPS1 of FIG. 15 upon completion of film winding and shutter charging operation in the illustrated position to be turned on, the instructions at the addresses No. C9 to No. CE are performed repeatedly until the film feed is completed. At the time of completion of the film feed, the next sequence starts to operate. In more detail, only when the completion of film feed is detected, a command RCO from the address No. D0 is carried out to cause change of the output "1" at the terminal 9 of C-port of MN-1400 to "0" level at which the transistors TR1 and TR2 are turned off to deenergize the motor M, thereby the film gets stopped.

When a fresh area of film has been fed, addresses No. D1 to D4 are executed in sequence to carry out commands LY,1; SCO;LY,0; and SCO with the result that two "1" signals are produced at the output terminals 1 and 0 of C-port of MN-1400, and are applied to the inputs MODE0 and MODE1 of the multi-plexer CMP(FIG. 2) of the watch chip CLT to produce a pulse at the frame count terminal FC thereof. Now suppose the first three film frames have been transported in vain, the flip-flops F16 and F17 constituting a 2-bit counter both produce outputs of "1" level which are applied to the AND gate G2-1 whose output is "1" level. This enables the AND gate G3-1 so that upon production of the pulse at the FC, the counter D13 of 10-scale advances one count for each cycle of exposure operation.

The number of film frames exposed is displayed as follows. After the counters D13 and D14 have counted the number of film frames transported, a command LY,8 from an address D5 is carried out to load a number 8 to the Y register. Then, a command SM,F from an addres No. D6 is carried out. This command SM is to take OR between the content of the prescribed memory location by the Y register and a number as the operand. Therefore, OR is taken between the content of the memory location M8 and the number F in base 16 so that the content of the memory location M8 becomes F. After the content of the memory location M8 has becomes F in such a manner, a command ICY from an address No. D7 is carried out to increment the content of the Y register by one. Since the number 8 was loaded in the Y register, the content of the Y register now is the number 9. After that, a command CY,E from an address No. D8 is carried out. Since the command CY is to set the ZF when the content of the Y register coincides with the number as the operand, upon comparison of the E with the number 9, the ZF is not set. Therefore, the next command BNZ,ST27 from an address No. D9 causes the address No. D6 labelled ST27 to be executed again. Until the ZF is set by the command CY,E from the address No. D8, therefore, the sequence of the instructions at the addresses No. D6 to No. D9 is carried out repeatedly so that the contents of the memory locations M8 to MD become F. After that, commands LY.1 and RCO from addresses No. DB and No. DC are carried out to reset the "1" at the output terminal of C-port of MN-1400. For this reason, applied to the only input MODE0 of the multi-plexer CMP of the watch chip CLT is "1" so that the content of the counter D14 of 10-scale of FIG. 2 is produced from the output terminal DATAOUT. The content of said counter D14 stores the data in the second place of the number in film frame, so that the data in the second plate of the number in flim frame is read out in application to the bases of the transistor switches TS5 to TS8 to determine the binary conditions of the switches TS5 to TS8 based on the data in the second place of the number in film frame. After that, a command OTIE,4 from an address No. DD followed by a command INB from an address No. DE are carried out to read the binary conditions of the switches TS5 to TS8, that is, the data in the second place of the number in film frame into the accumulator. After that, commands LY,B and ST from addresses No. DF and No. E0 are carried out to store the content of the accumulator in the memory location MB. Thus, the data in the second place of the number in film frame is read in the memory location MB. Then, commands LY,0; RCO; LY,1; and SCO at the addresses No. E1 to No. E4 are carried out to change the "1" output at the terminal 0 of C-port to "0" and the "0" output at the terminal 1 to "1". Therefore, as shown in FIG. 3, the "1" output is applied to the input MODE1 of the multiplexer CMP of FIG. 2, thereby the content of the counter D13 is allocated to the output terminals DATAOUT. Since the counter D13 stores the data in the first place of the number in film frame, the data appears at the output terminals DATAOUT and determines the binary conditions of the swtiches TS5 to TS8. After that, commands OTIE and INB at addresses No. E5 and No. E6 are carried out to read the switches TS5 to TS8 into the accumulator. Thus, the data in the first place of the number in film frame is loaded to the accumulator. After the data in the first place of the number in film frame has been loaded to the accumulator in such a manner, the content of the accumulator is stored in the memory location by commands LY,C and ST at the addresses No. E7 and No. E8. Therefore, the data in the first place of the number in film frame is stored in the memory location MC. After the number in film frame has been stored in the memory locations MB and MC, commands LI,0 and JMP,ST8 from addresses No. E9 and No. EA are carried out, thereby the content of the accumulator is changed to 0, and an address No. 88 labelled ST8 is executed. Therefore, as has been mentioned above, the contents of the memory locations MB and MC are displayed by the display devices and then the address No. B labelled ST is executed again. Thus, after the number in frame has been displayed, the instructions beginning with that at the address No. B are carried out again to complete the first cycle of exposure sequence, and to initiate a second cycle of exposure sequence, and the foregoing process repeats in ordinary mode.

(2) Auto-Focus Mode

Figure 20:
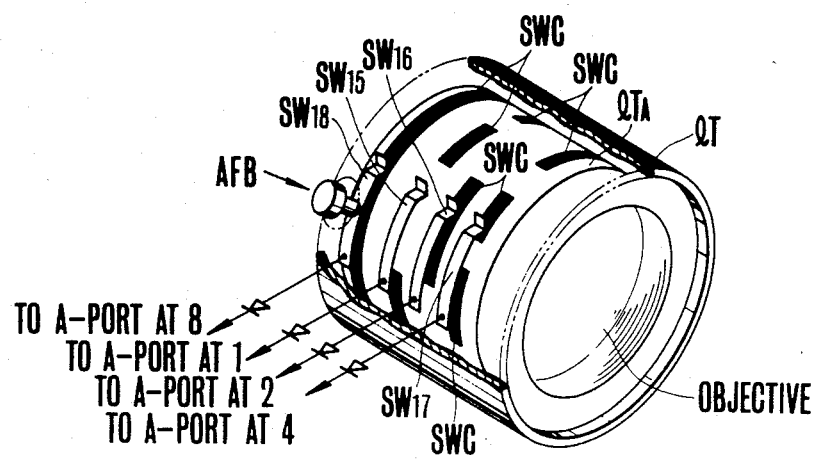
FIG. 20 is a perspective view showing the arrangement of the angular position sensing switches SW15 to SW18 of FIG. 13 in the lens barrel.

Even in this case, in a similar manner to that described in connection with the ordinary mode, when the main switch MS is depressed, the battery checking operation and other checking operations for the set switch, read switch and further AF switch are carried out in a similar manner to that described in connection with the ordinary mode. Now assuming that the set switch and read switch both are OFF, after the read switch checking operation, the commands from the addresses No. 2D to No. 2F are carried out to determine the set and reset conditions of the ZF depending upon the ON and OFF states of the AF switch S18. Since the auto-focus mode is selected, the operator needs to turn on the push button AFB provided on the lens barrel, as shown in FIG. 20, and then to rotate the distance adjusting ring. Therefore, the AF switch S18 is turned on to reset the ZF. By the command from the address No. 30, the sequence of instructions beginning at the address No. 32 labelled AF are carried out. The command TAY from the address No. 32 causes the content of the accumulator to be transferred to the Y register. The content of the accumulator was determined by the binary conditions of the switches S15 to S18 by the commands from the addresses 2D and 2E as has been mentioned in connection with the ordinary mode, so that the content of the switches S15 to S18 is closed to the Y register by the command TAY from the address No. 32. The first three switches S15 to S17 are arranged to be moved to their ON or OFF positions depending upon the angular position of the distance adjusting ring, that is, the value of object distance set in the distance adjusting ring. That is, the switches SW15 to SW17 are fixedly mounted on the back surface of the ring and arranged upon rotation of the ring to be brought into contact with respective contacts SWC provided on the stationary sleeve 1TA. Therefore, the combinations of the ON and OFF states of the switches SW15 to SW17 differ with different object distances. Therefore, by the command from the address No. 32, the distance information from the switches S15 to S17 and the ON information from the switch S18 are read-in to the Y register. That is, the most significant bit of the Y register takes the ON information of the AF switch AF, or "1", and the last three bits take the information from the switches S15 to S17. Thus, the content of the Y register now is [1(0 or 1)(0 or 1)(0 or 1)]. After that, command LI,8 and ST from the addresses No. 33 and No. 34 are carried out to load the number 8 to the accumulator and to store this number from the accumulator to the memory location prescribed by the Y register. As has been mentioned above, the content of the Y register is the sum of the distance information set by the distance adjusting ring and the ON information of the AF switch S18, that is, 8+distance information. Thus, the number 8 is stored in the prescribed memory location by the distance information. Now assuming that the distance adjusting ring is set in a position for an object distance of 10 meters, as shown in FIG. 9, the switch S16 is ON, so that the number 8 is stored in the memory location MA. After that, a command LY,8 from an address No. 35 is carried out to load the number 8 to the Y register, and the address labelled AF1 is executed. Thereby, the address No. 36 is executed. That is, a command LD,1 from an address No. 36 is carried out to transfer the content of the memory location M1 to the accumulator. By the next command STD,2, the content of the accumulator is transferred to the memory location M2. Thus, the content of the memory location M1 is transferred to the memory location M2. After that, a command LD,0 from an address No. 38 followed by a command STD,1 from an address No. 39 causes the content of the memory location M0 to be transferred to the memory location M1. It is noted here that since the memory is cleared up, the contents of the memory locations are 0's. After that, by a command LI,F from an address No. 3A, the number F in base 16 is loaded to the accumulator. By a command OTD from an address No. 3B, the F is read out of the D-port of MN-1400. Then, a command TYA from an address No. 3C is carried out to transfer the number 8 from the Y register to the accumulator. Then a command OTE is carried out to read out the number 8 of the E-port of MN-1400. Therefore, the decoder DC1 is caused to produce a "1" at the output terminal 1 thereof. And, at this time, the switch AF' is moved to the "b" position in response to the AF switch S18, so that upon production of the "1' output at the terminal 1 of the decoder DC1, the transistor TR9 is turned on to compare the output of the sensor element 21 with those of the sensor elements 11, 12 and 13 of the first sensor array, that is, to start a scanning operation. Now, assuming that the output of the sensor element 21 coincides with that of the sensor element 11, the comparator circuits IC1 and IC2 produce ("1")s, and the AND gate IC7 also produces a "1". When the outputs of the sensor elements 21 and 11 are not coincident with each other, the AND gate IC7 produces a "0". Otherwise when the output of the sensor element 21 coincides with that of the sensor element 12, the comparator circuits IC3 and IC4 produce ("1")s, and the AND gate IC8 produces a "1". Conversely when the output of the sensor element 21 is not coincident with that of the sensor element 12, the AND gate IC8 produces a "0". Otherwise when the output of the sensor element 21 coincides with that of the sensor element 13, the AND gate IC9 produces a "1" likewise. When not, it produces "0". Now assuming that the outputs of the sensor elements 11, 12 and 13 resulting from an object image formed thereon by the lens L1 of FIG. 4 are distributed as 1, 3 and 2 respectively as shown in FIG. 5, and coincide in this sense with those of the sensor elements 24, 25 and 26 resulting from another object image formed thereon by the lens L2, then when the sensor 21 is scanned, the gate IC7 produces "1", and the gates IC8 and IC9 produce "0". After the sensor element 21 has been scanned in such a manner, a command INB from an address No. 3E is carried out so that the data from the B-port of MN-1400 is read-in to the accumulator. Since, as has been mentioned above, the outputs of the IC7 to IC9 are determined by scanning the sensor element 21, the transistor switches TS9, TS10 and TS11 are turned on, or off, depending upon the outputs of the gates IC7, IC8 and IC9 respectively. Thus, the scanning result is read-in to the accumulator. In this case, the content of the accumulator now is [0001]. After that a command STD,0 from an address No. 3F is carried out to store the content of the accumulator, that is the scanning result from the sensor element 21 or [0001] in the memory location M0. After that, a command TB,4 from an address No. 40 is carried out. Since the content of the accumulator now is [0001], the ZF is set by the command TB,4. Therefore, a command BZ,AF6 from an address No. 41 reads a command L from an address No. 66 labelled AF6. Thereby, the content of the Y register, that is the number 8 causes the content of the memory location M8 to be transferred to the accumulator. Then, a command AI,8 from an address No. 67 is carried out to add the number 8 to the content of the accumulator, that is, the content of the memory location M8. Then, a command LI,C is carried out to load the number C in base 16 to the accumulator. Then, a command BC,AF8 from an address No. 69 is carried out. Since this command is to execute the address referred to by the operand when the carry flip-flop CF is set, and the content of the memory location is 0, so that the CF is not set even by the command AI,8 from the address No. 67, the execution of the address No. 65 is followed by the execution of an address No. 6B to carry out a command LI,F for loading the number F in base 16 to the accumulator. Then, a command OTD from an address No. 6C is carried out to cause the content F of the accumulator to be read out of the D-port of MN-1400. By the next command ICY from an address No. 6D, the content of the Y register is incremented by one, or from the number 8 to the number 9. Then, a command CY,F from an address No. 6E is carried out and is followed by a command BNZ from an address No. 6F so that the address No. 36 labelled AF1 is executed again. Therefore, the command LD,1 is carried out to load the data from the memory location M1 to the accumulator. Then a command STD,2 from the address No. 37 is carried out to store the data from the accumulator in the memory location M2. It is noted that at this time the memory locations M1 and M2 are cleared up to 0. After that, the command LD,0 from the address No. 38 is carried out to load the data from the memory location M0 to the accumulator. Since the scanning result from the sensor element 21 was stored in the memory location M0, the content of the accumulator now is [0001]. After that, by the command STD,1 from the address No. 39, the content of the accumulator is stored in the memory location M1. Therefore, the scanning result of the sensor element 21 or [0001] is stored in the memory location M1. Then the commands from the addresses No. 3A to No. 40 are carried out again. It is noted here that the content of the Y register now is the number 9, the decoder DC1 produces "1" at the output terminal 2, and therefore the transistor TR10 is turned on to start a second cycle of scanning operation by comparing the output of the sensor element 22 with those of the sensor elements 11, 12 and 13.

As has been mentioned above, since the outputs of the sensor elements 11 to 13 and 22 are related to each other as shown in FIG. 5, the scanning result from the sensor element 22 is the production of "1" at the output of the IC9, and ("0")s at the outputs of the IC7 and IC8. Therefore, in this case, the data stored in the memory location M0 is [0100], at which the ZF is reset by the command TB,4 from the address 40. Then, the address 43 labelled AF2 is executed to carry out a command LD,1, thereby the content of the memory location M1 is loaded to the accumulator. Then, commands TB,2 and BZ,AF6 from the addresses 44 and 45 are carried out. Since, as has been mentioned above, the data stored in the memory location M1 is the scanning result from the sensor element 21, that is, [0001], the performance of the command TB,2 results in the setting of BZ, and then a command from an address referred to by the operand labelled AF6 is carried out. Therefore, the commands at the addresses 66 to 69 are carried out again. In this case, however, since the content of the Y register is 9, the content of the memory location M9 and the number 8 in base 16 are added. Further, since the memory location M9 is cleared, the addition of the content of the memory M9 and the number 8 does not result in setting the CF. Likewise as the above, after the number F is loaded to the accumulator by the command LI,F from the address 6B, the commands from the addresses 6C to 6F are carried out with the result that the content of the Y register becomes A. Then, the address 36 referred to by the label AF1 is executed again. Thereby the content of the memory location M1 is stored in the memory location M2, and the content of the memory location M0 is stored in the memory location M1. Thus, the memory location M2 stores the scanning result from the sensor element 21, and the memory location M1 stores the scanning result from the sensor element 22. That is, the last but one scanning result of sensor is stored in the memory location M2, and the preceding scanning result of sensor in the memory location M1. After the transfer of the contents of the memory has been completed in such manner, the number F in base 16 is read out of the D-port of MN-1400, and the number A as the content of the Y register is read out of the E-port of MN-1400. Therefore, the decoder DC1 produces "1" at the output terminal 3 at which the transistor TR11 is turned on to start a scanning of the sensor element 23. As a result, the IC9 produces "1". Therefore, by the commands INB and STD,0 from the addresses 3E and 3F, the scanning result from the sensor element 23 is stored in the memory location M0 in the form of [0100]. That is, the scanning result from the presently scanned sensor element is stored in the memory location M0. After that, likewise as the above, the addresses 40 and 41 are executed, and likewise as in the case of the scanning result of the sensor element 22, the address 43 labelled AF2 is executed to carry out the command LD,1 followed by the commands TB,2 and BZ,AF6. During the performance of these commands, the content of the memory location M1 is taken AND of with [0010]. If the result is 0, the address labelled AF6 is executed, and, since the memory location M1 stores the scanning result of the sensor element 22, that is [0100], the performance of said command results in the execution of the address labelled AF6. Thereby the above-mentioned commands L, AI,8; LI,C; and BC,AF8 are carried out. Since the number A is loaded in the Y register, the adding operation is performed on the content of the memory location MA and the number 8. Since the memory location MA stores the number 8 as has been mentioned above, the addition of the content of the memory location MA and the number A results in setting the BC. Therefore, the command BC,AF8 is not followed by the command LI,F from the address 6B, but reads the commands OTD; ICY; CY,F; and BNZ,AF1 from the addresses beginning with 6C. Therefore, in this case, the number C in base 16 loaded to the accumulator by the command LI,C from the address 68 is read out of the D-port of MN-1400. Therefore, the number C in base 16 is applied to the device 7Seg6, while the DC1 produces "1" at the output terminal 3, thereby a symbol " |_| " corresponding to the number C in base 16 is represented by the display device 7Seg6. Since the sixth display device 7Seg6 is adapted for use with the object distance of 10 meters, and the symbol " |_| " implies an index for setting of the distance adjusting ring, the operator is informed of the fact that the distance adjusting ring is now set to a position for 10 meters. After that, the content of the Y register becomes B, and the address labelled AF1 is executed again. Thus, the foregoing procedure repeats itself while the scanning operation is shifted from the sensor element 24 to the sensor element 27 with the memory location M0 storing the scanning result from the presently scanned sensor element, the memory location M1 storeing the scanning result from the precedingly scanned sensor element, and the memory location M2 storing the scanning result from the last but one scanned sensor element. For example, during the scanning operation of the sensor element 26, the memory location M0 stores the scanning result from the sensor element 26, the memory location M1 stores the scanning result from the sensor element 25, and the memory location M2 stores the scanning result from the sensor element 24. Since the output of the sensor element 26 is 2 according to the table of FIG. 5, it is found that the output of the sensor element 13 coincides with that of the sensor element 26. Therefore, the performance of the scanning operation of the sensor element 26 results in that the IC9 produces "1", and the IC7 and IC8 produce "0", the memory location M0 stores the data [0100]. And, the performance of the scanning operation of the sensor element 25 results in that the IC8 produces "1", while the IC7 and IC9 produce "0", the memory location M1 storing the data [0010]. And, the performance of the scanning operation of the sensor element 24 results in that the output of the sensor element 24 is 1 according to the table of FIG. 5 and coincides with the output of the sensor element 11. Therefore, during the operation of the sensor element 24, the IC7 produces "1" while the IC8 and IC9 produce "0", the memory location M2 stores the data [0001]. Therefore, by the commands TB,4, and BZ,AF6 from the addresses 40 and 41 at the time of scanning of the sensor element 26, the content of the memory location M0 is taken AND of with [0100] and the commands LD,1; TB,2 and BZ,AF6 from the addresses beginning with 43 are carried out to take AND between the content of the memory location M1 and [0010]. As a result, the commands LD,2; TB,1; and BZ,AF6 from the addresses beginning with 47 are carried out to take AND between the content of the memory location M2 and [0001]. As a result, the commands at the addresses beginning with 48 are carried out. That is, in this case, since the 3rd bit of the memory location M0, the 2nd bit of the memory location M1 and the 1st bit of the memory location M2 are "1", the address labelled AF4 is executed for the first time. In other words, as has been mentioned above, the content of the memory location M2 becomes [0001] when the output of the sensor element 11 coincides with the output of the last but one scanned sensor element (in this instance, of the sensor element 24), the content of the memory location M1 becomes [0010] when the output of the sensor element 12 coincides with the output of the precedingly scanned sensor element (in this instance, the sensor element 25), and the content of the memory location M0 becomes [0100] when the output of the sensor element 13 coincides with the output of the presently scanned sensor element (in this instance, the sensor element 26). Thus, the image of the given object formed on the first sensor array is identified with that of the same object formed on the second sensor array, and the location of the object image on the second sensor element is recognized to permit the execution of the address labelled AF4. A command L from the address No. 4B labelled AF4 is then carried out to load the content of the prescribed memory location by the Y register to the accumulator. Now suppose the scanning of the sensor element 26 leads to check the identification of the object image on the second sensor array, the content of the Y register becomes D. Therefore, the content of the memory location MD is loaded to the accumulator. It is noted that the memory location MD is cleared, the number 0 is loaded to the accumulator. After that, a command TB,8 from an address No. 4C is carried out to take AND between the content of the accumulator and [1000] to determine the condition of the ZF. In this case, the content of the accumulator is 0, the performance of the command TB,8 results in setting the ZF. Therefore, by the next command BNZ,AF8 from the address 4D is followed by commands LI,B; and JMP,AF8 from the addresses 4F and 50 to load the number B in base 16 to the accumulator, and then to execute the address 6C referred to by the operand labelled AF8. Therefore, likewise as the above-described performance of the instructions beginning with that at the address labelled AF8, the content B of the accumulator is read out of the D-port of the MN-1400, and a symbol " ⊃ " corresponding to the number B in base 16 is represented by the third display device 7Seg3. That is, it is the sensor element 26 that is now scanned, the decoder DC1 produces "1" at the output terminal 6 at which only the third display device 7Seg3 is driven, while the three of the seven segments of the device 7Seg3 are excited to present the display of the symbol "  " serving as an index for the condition of in-focus. Since the display device 7Seg3 is adapted to a graduation for an object distance of 2 meters, the operator is informed of the fact that the given object is at the distance of 2 meters. Thus, the position of the displayed symbol "  " indicates where the distance adjusting ring is adjusted, and the position of the displayed symbol "  " indicates where the given object lies. After the scanning of all the sensor elements 21 to 27 has been completed, the content of the Y register becomes F. By commands CY,F; and BNZ,AF1 from addresses 6E and 6F, the ZF is set to execute the address 71 from which a command CAL,MC is carried out to clear up all the memory locations. Then, a command JMP,ST2 from the address 72 is carried out so that the address 2D referred to by the operand lablled ST2 is executed again. Thereby, the conditions of the switches S15 to S18 are checked again. If the switch S18 is ON, that is, if in the auto-focus mode, the instructions at the addresses 32 to 35 are carried out again, and then a second cycle of auto-focus scanning operation is carried out. Now suppose the distance adjusting ring is moved to a position for 2 meters by taking into account the result of the first cycle of focus scanning operation, the switching S17 and S15 are turned on. Before the performance of the focus scanning operation by the instructions at the addresses beginning with that labelled AF1, the commands from the addresses 2D and 2E cause the number 8 plus the distance information=8+5=D to be loaded to the accumulator. Then, the commands from the addresses 32, 33 and 34 labelled AF are carried out to select the memory location MD prescribed by the distance of 2 meters, and to load the number 8 to this memory location. Therefore, by the focus scanning operation whose code resides in the addresses beginning with that labelled AF1, the in-focus condition is detected as the sensor element 26 is scanned. Then the commands L; TB,8; and BNZ,AF8 from the addresses beginning with that labelled AF4 are carried out to load the content of the memory location MD to the accumulator and then to carry out the command TB,8. In this case, however, the memory location MD represents the distance of 2 meters, and therefore, the number 8 is stored therein, so that upon performance of the command TB,8, the ZF is reset. By the command BNZ, therefore, the commands from the addresses beginning with that labelled AF8, that is, the address 6C, the content of the accumulator is read out by the third display device 7Seg3 for representing the distance of 2 meters. As has been mentioned above, in this case, since the content of the accumulator is 8, the device 7Seg3 represents a symbol "  " for the sharp focus. Thus, the operator is informed of the fact that the so-set distance adjusting ring is in the condition of in-focus. After the detection of the in-focus condition has been indicated, the address labelled ST2 is executed again. So long as the AF switch S18 is ON, the abovedescribed focus scanning process repeats with repetitive presentation of the display of the symbol "  ". When the operator turns off the AF switch after the detection of the in-focus condition, the repetition of the focus scanning operation comes to end, as the commands from the addresses beginning with that labelled ST3 are carried out.

It will be appreciated from the foregoing that as the setting of the distance adjusting ring and the object distance sensed are simultaneously indicated, the operator is enabled to clearly distinguish the preset object distance from the actual object distance and therefore can perform rapid focusing operation smoothly. Another advantage arising from the utilization of the exposure value display device in indicating the detection of the condition of in-focus is that the complexity of the display device can be maintained to a minimum. Still another advantage is that the above-described focus detecting and displaying operation is not caused to be succeeded by the initiation of a making of exposure so long as the switch S18 is closed by the push button AFB as arranged on the distance adjusting ring, so that the accidental actuation of the shutter release button does not lead to initiate an exposure under the abnormal conditions. Thus, the camera of the invention is protected against faulty operation otherwise resulting from the erroneous operation of the release button or the like.

Explanation will next be given to the presetting operation of the watch data, that is, in year, month, day, hour, minute and second in the watch chip.

The pre-display of the numbers in year, month and day will first be described. In this case, the operator needs first to turn on the Date/Time selection switch CHSW. With the switch CHSW set ON, when the main switch MS is turned on likewise as in the ordinary mode, the sequential control is established according to the above-described program. In the course to the actuation of the shutter release button, the instructions at the addresses beginning with that labelled ST1, or address 10 and terminating at the address 78 are performed repeatedly. At a time during such operation, when the SET switch S10 is turned on, the ZF is reset by the commands from the addresses 10 to 15, and an address 17 referred to by the operand labelled DT is executed to perform a command SN,2 for taking OR between the content of the prescribed memory location by the Y register and the data as the operand with the result being transferred to the memory. Since the content of the Y register now is the number 6 as the result of the performance of the command LY,6 from the address 11, OR is taken between the content of the memory location M6 and the number 2, or [0010]. Further since the memory is cleared up by the above-described clear subroutine, the content of the M6 is the number 2. After that, a command L from an address 18 is carried out to load the content of the memory location M5, that is, the number 2 to the accumulator. Then, a command TB,1 from an address 19 is carried out to take AND between the content of the accumulator, or the number 2, or [0010] and a number 1, or [0001] as the operand. As a result, the ZF is set so that upon performance of the next command BNZ,DT7 from the address 1A, a command LY,5 from an address 10 referred to by the operand labelled DT1 is executed. Therefore, the number 5 is loaded to the Y register. Then, a command ICM from an address 1D is carried out to increment the content of the prescribed memory location by the Y register and to store the result in the same memory location. Therefore, the content of the memory location M5 is incremented by one. Since the content of the memory location at that time was the number 2, the content of the memory location M5 now is the number 3. Then, a command L from an address 1E is carried out to load the content of the memory location M5 to the accumulator, and is followed by commands CI,3 and BNZ,DT3 from addresses 1F and 20 and then by commands LI,0 and ST from addresses 22 and 23. Thereby the content of the accumulator becomes 0. This number from the accumulator is stored in the memory location M5 prescribed by the number 5 in the Y register, and the content of the memory location M5 becomes 0. After that, the address referred to by the operand labelled DT3 is executed to carry out a command CAL, RDATE. Therefore, the above-described read date subroutine is called for. As has been mentioned above, since the content of the memory location M5 is 0, the second significant digit of the number in year is stored in the memory location MD, and the least significant digit of the number in year is stored in the memory location MC. After the RDATE subroutine has been performed, a command CAL,DDATE from an address 26 is carried out. Therefore, the above-described DDATE subroutine is called for to display the number in year by the read out devices 7Seg5 and 7Seg6. After the DDATE subroutine has been performed in such manner, the command OTIE,2 from the address 28 is carried out to cause the production of "1" at the output terminal 2 of E-port of MN-1400. By the next command INA from the address 29, the switches S7 to S10 are read-in to the accumulator. Then, the command TB,C from the address 2A is carried out to take AND between the content of the accumulator and the number C. Since, as has been mentioned above, the content of the accumulator is determined by the combination of the binary conditions of the switches S7 to S10, if the switches S10 and S9 are simultaneously ON, the ZF is reset. If not, the ZF is set. Therefore, by the command BNZ,DT3 from the address 2B, if the switches S10 and S9 are simultaneously OFF, the address referred to by the operand labelled ST2 is executed. If other than that, the address referred to by the operand labelled DT3 is executed again. Therefore, until the SET switch is turned off, the display of the number in year is presented. When the SET switch is turned off at a time during the display operation of the number in year, the command from the address 2D referred to by the operand labelled ST2 is carried out. As has been mentioned above in detail in connection with the ordinary mode, so long as the release button is not actuated to the first stroke as yet, the address referred to by the operand labelled ST1 is executed. Therefore, the ON condition of the switch S10 is again checked. If the SET switch S10 is turned on again, the address 17 referred to by the operand labelled DT is executed. Therefore by the commands SM,2; L; TB,1; and BNZ,DT7 from the addresses 17 to 1A are carried out to execute the address referred to by the operand labelled DT1, or address 1C. Therefore, the commands LY,5; ICM; L; CI,3; and BNZ,DT3 are carried out again. As has been mentioned above, however, since the content of the memory location M5 is 0 at this time, the content of the memory location M5 is to be increased by 1 by the command ICM. Therefore, in this case, the ZF is reset by the command CI,3, and the address 24 referred to by the operand labelled DT3 is executed. Thereby, as has been mentioned above, the RDATE and DDATE subroutines are called for. Since the content of the memory location M5 now is 1, the number in month is stored in the memory locations MP and MA, and is displayed by the read out devices 7Seg3 and 7Seg4. In the course of display operation of the number in month, when the SET switch is turned off, the commands from the addresses 28 to 2B are carried out to execute the address referred to by the operand labelled ST2 again. Then, the commands from the addresses beginning with that labelled ST1 are carried out. Therefore, When the SET switch is turned on once more again, the sequences of instructions labelled DT and DT1 are carried out. Since the content of the memory location M5 is changed from 1 to 2 by the commands from the addresses beginning with that labelled DT1, the number in day is stored in the memory locations M9 and M8 by carrying out the commands from the addresses beginning with that labelled TD3, and is displayed by the read out devices 7Seg1 and 7Seg2. Thus, the numbers in year, month and day can be preset in such manner. After the presetting of the data has been completed, when the SET switch is turned off, the programmed loop is returned to the daylight exposure mode mentioned above. It is noted that in order to preset the data in hour, minute and second, the date/time selection switch CHSW must be turned off so that in the course operation of the RDATE subroutine, the numbers in hour, minute and second are stored in the memory locations, and the preset numbers are displayed by the read out devices.

(3) Flash mode

After the STROB0 switch S3 is turned on, and the main switch STMSW of the flash circuit is turned on, the operator has to turn on the main switch MS, thereby the central processing unit is rendered operative likewise as in the daylight mode. When the release button is depressed fully to the second stroke, addresses 97 to 9A are executed to check the condition of the STROB0 switch. If it is ON, an address 9C referred to by the label ST13 is executed. In flash mode, therefore, after the second stroke is effected, a command OTIE,8 from the address 9C is carried out to cause the production of "1" at the output terminal 8 of E-port of MN-1400 at which the transistor switches TS9 to TS12 are selected to provide information which is to be read-in by the next command INB from the address 9D. The switch TS12 is connected to a point on connection between the neon tube NE and the resistor R19, so that when the main condenser C4 is fully charged, the neon tube NE is rendered conducting. Until this, the transistor switch TS12 remains OFF where the information read-in to the accumulator is [0(0 or 1)(0 or 1)(0 or 1)]. Therefore, the BZ is set by the command TB,8 and BZ,ST from the addresses No. 9E and No. 9F to execute the address No. B referred to by the label ST again. Thus, before the flash photography is made possible, the sequence of the commands from the addresses No. B to No. 9E is carried out repeatedly to prevent the release of the shutter. At a time during the operation mentioned above, when the charging of the main condenser is completed, the transistor TS12 is turned on, causing the commands from the addresses No. 9E and No. 9F to execute the address No. A1. Therefore, after the flash photography is made possible, the shutter is actuated in a similar manner to that described above, and the timing circuit SCC is also actuated to count the flash exposure time. It is noted that in the flash mode, the light measuring circuit LMC is made cooperative with the resistor RF by means of the switch S3' of FIG. 14 in response to the closure of the STROB0 switch S3, thereby the timing circuit SCC is caused to produce "0" output at the output terminal EXTT2 and "1" at the terminal EXTT1 in a time interval dependent upon the resistance value of the resistor RF suited for flash photography. Therefore, the size of opening of the diaphragm aperture and the shutter time are automatically adjusted to effect a correct exposure even in flash mode. Thus, the flash exposure is to be taken with the diaphragm value and shutter time suited for flash photography, and the sequence of the commands at the addresses No. B1 to No. B4 labelled ST18 causes the performance of the commands from the addresses No. B6 and No. B7 labelled ST19 to be followed by the execution of the address No. B8 and those that follow as has been mentioned above in connection with the daylight mode. Therefore, when the shutter starts to close, the command LY,7 from the address No. B6 is carried out to load the number 7 to the Y register. By the next command SCO from the addresses No. B7, "1" is produced at the output terminal 7 of C-port of MN-1400 at which the thyristor SCR as the X-contact of the firing circuit is turned on to trigger the discharge tube Fl, thereby an intense flash light is emitted. Thus, the object is illuminated with the flash light. After the discharge tube is fired, the address No. B8 is executed to initiate the sequence of the instructions mentioned above.

It will be seen from the foregoing detailed description of the invention that the sequence control circuit of the camera has many great advantages that a large number of steps of operation are performed in sequence without causing the cross talk to occur and that a large number of functions can be imparted into the camera without causing any unduly increase in the complexity of structure.

What is claimed is:

1. A display device for camera comprising:
   (a) signal forming means for producing a signal representative of the set value of distance by a distance setting member;
   (b) distance detecting means for detecting the object distance, said means producing a signal corresponding to the detected object distance;
   (c) a digital display circuit responsive to the signals from said signal forming means and said distance detecting means for displaying the set value of distance, and the detected object distance value;
   (d) said digital circuit including a plurality of display elements, and means for activating the display elements which are prescribed by the said detected object distance signal and set distance value; and
   (e) said means for activating including a control circuit responsive to said distance detecting means for activating prescribed ones of said elements to form a first mark and responsive to said signal forming means for activating others of said display elements according to the set value to form a second mark different from the first mark.

2. A display device for camera according to claim 1, in which said display device includes transmission means for transmitting said set distance value signal and detecting object distance signal in sequence and repeatedly.

3. A camera having a display device comprising:
   (a) a focus detection circuit for detecting an object distance and producing an object distance signal representing a detected object distance;
   (b) signal forming means for producing a signal representing a distance set by a distance setting member;
   (c) a display device having a plurality of mark display means, each display means having a plurality of segments elements and being arranged in a row for respective display of different prescribed distances; and
   (d) a control circuit for responding to the object distance signal from the focus detection circuit and causing a prescribed one of said plurality of display means corresponding to the object distance to function in correspondence to the detected object distance and display a first mark, said control circuit being responsive to the signal from the signal forming means and selectingly driving the prescribed one of said plurality of display means according to the distance set for displaying a second mark different from first mark.

4. A camera having a display device according to claim 3, wherein the control circuit being arranged to produce an output when the object distance detected by the focus detection circuit and the distance set by the setting member coincide, and such display means corresponding to the detected object distance and the set distance indicated with a third mark being different from the first and second marks.

5. A camera having a display device comprising:
   (a) a focus detection circuit for detecting an object distance and producing an object distance signal representing a detected object distance;
   (b) signal forming means for producing a signal representing a distance set by a distance setting member;
   (c) a display device having a plurality of mark display means, each display means having a plurality of segment elements and being arranged in a row for display of a different prescribed distance respectively;
   (d) a control circuit for responding to the object distance signal from the focus detection circuit and having prescribed one of the display means corresponding to one of the object distance function in correspondence to the detected object distance and then display a first mark by the prescribed one of the display means, said control means being arranged for responding to the signal from the signal forming means and selectingly driving the one of the prescribed plurality of display means according to the set distance value for displaying a second mark different from the first mark; and
   (e) a photographic information signal forming circuit forming photographic information signals other than the information relating to the distance;
   the control circuit having a first display control mode and a second display control mode, and causing the display device to display the detected object distance and the set distance display with the first mark and the second mark in the first display control mode, and then transmitting the photographic information signal from the photographic signal forming circuit to the display device for effecting a numerical display of the photography information in the second display control mode.

6. A camera as in claim 5, wherein the photographic information signal forming circuit includes a counter circuit to count a number of film frames for transmitting information on the number of film frames to the display device, so as to produce a numerical display of a film frame number with the display device in the second mode.

7. A camera as in claim 5, wherein the photographing information signal forming circuit has an electronic timer circuit and transmits an output of said electronic timer circuit to the display device for forming a numerical display of the output of said electronic timer with the display device in the second mode.

8. A camera having display device comprising:
   (a) a focus detection circuit for detecting an object distance and producing an object distance signal representing a detected object distance;
   (b) a photographic information signal forming circuit forming photographic information signals other than information relating to the distance;
   (c) a display device having a plurality of numerical mark display means each with a plurality of segment elements; and
   (d) a control circuit to transmit the object distance signal from the focus detection circuit to the display device in a first mode for effecting an object distance display, and to transmit the photographic information signal from the photographic information signal forming circuit in a second mode as to effecting a numerical display of the photographing information.

9. A camera as in claim 8, wherein the photographing information signal forming circuit has an electronic timer circuit and transmits an output of said electronic timer circuit to the display device for forming a numerical display of the output of the electronic timer with the display device in the second mode.

10. A camera as in claim 9, wherein the photographic information signal forming circuit includes a counter circuit to count a number of film frames for transmitting information on the number of film frames to the display device, so as to produce a numerical display of a film frame number with the display device in the second mode.

* * * * *